(12) United States Patent
Nagaeda

(10) Patent No.: US 6,867,895 B2
(45) Date of Patent: Mar. 15, 2005

(54) FARADAY ROTATOR

(75) Inventor: Hiroshi Nagaeda, Hokkaido (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/702,457

(22) Filed: Nov. 7, 2003

(65) Prior Publication Data

US 2004/0105141 A1 Jun. 3, 2004

Related U.S. Application Data

(63) Continuation of application No. PCT/JP02/04341, filed on Apr. 30, 2002.

(30) Foreign Application Priority Data

| May 7, 2001 | (JP) | ................................ | 2001-135678 |
| Feb. 28, 2002 | (JP) | ................................ | 2002-054093 |

(51) Int. Cl.$^7$ ................................................. G02F 1/09
(52) U.S. Cl. ..................................................... 359/280
(58) Field of Search .......................... 359/280, 281, 359/282, 283, 324, 246, 484, 258; 372/27, 37

(56) References Cited

U.S. PATENT DOCUMENTS

| 5,844,710 A | 12/1998 | Fukushima |
| 6,018,411 A | 1/2000 | Fukushima et al. |
| 6,288,827 B1 | 9/2001 | Kawai et al. |
| 6,392,784 B1 * | 5/2002 | Ikeda et al. ................. 359/282 |

FOREIGN PATENT DOCUMENTS

| EP | 0940704 A2 | 9/1999 |

OTHER PUBLICATIONS

English Language Abstract Japanese Pub. No. 11–249095 published Sep. 17, 1999.
English Language Abstract Japanese Pub. No. 09–146058 published Jun. 6, 1997.
English Language Abstract Japanese Pub. No. 08–062646 published Mar. 8, 1996.
English Language Abstract Japanese Pub. No. 10–090639 published Apr. 10, 1998.
English Language Abstract Japanese Pub. No. 10–161076 published Jun. 19, 1998.
English Language Abstract Japanese Pub. No. 06–034924 published Feb. 10, 1994.
Japanese Pub. No. 63–144615 dated Sep. 22, 1998.
Japanese Application No. 55–123924 dated Sep. 3, 1980.
N. Mitamura, et al., "Flexibly Variable Spectrum Equalizer for Spectral Tilt Compensation," 2000 Optical Fiber Communiation Conference, 2000, vol. 2, pp 87–89.
Hirohiko Sonoda et al., "Magnetooptical Variable Optical Attenuator with Optical Shutter," The Institute of Electronics, Information and Communication Engineers, Sogo Taikai Koen Ronbunshu, Electronics 1, Mar. 7, 2000, Sogo Part 4, p. 297.
International Search Report mailed Aug. 2, 2002 for PCT/JP02/04341.

* cited by examiner

Primary Examiner—Hung Xuan Dang
Assistant Examiner—Tuyen Tra
(74) Attorney, Agent, or Firm—Staas & Halsey LLP

(57) ABSTRACT

A Faraday rotator which is improved in temperature-dependent Faraday rotation angle characteristic and thus in quality. Faraday rotation is caused by a first magnetic field applied to a magneto-optical crystal of the Faraday rotator, and the Faraday rotation angle is controlled by a second magnetic field over an entire variable strength range of the second magnetic field. The magneto-optical crystal is positioned in such a manner that the direction of a combined magnetic field of the first and second magnetic fields, except for the direction of the first magnetic field, is variable intermediately between easy and hard magnetization axes of the magneto-optical crystal.

16 Claims, 37 Drawing Sheets a: (001)   b: (-111)   c: (011)
d: (010)   e: (11-1)   f: (110)
g: (100)   h: (101)    i: (1-11)
CENTER: (111)

| | $R2 \to 0$ | $R2 = R1$ | $R2 \to \infty$ |
|---|---|---|---|
| $\|dIC/dT\|$ EXCITATION BY CONSTANT-VOLTAGE SOURCE | $(IC/R1)(dR1/dT)$ | $(IC/2R1)(dR1/dT)$ | 0 |
| EXCITATION BY CONSTANT-CURRENT SOURCE | $(IC/R1)(dR1/dT)$ | $(IC/2R1)(dR1/dT)$ | 0 |
| W EXCITATION BY CONSTANT-VOLTAGE SOURCE | $R1IC^2$ | $2R1IC^2$ | $\infty$ |
| EXCITATION BY CONSTANT-CURRENT SOURCE | $\infty$ | $2R1IC^2$ | $R1IC^2$ |

FIG. 21

FARADAY ROTATOR

This application is a continuing application, filed under 35 U.S.C. §111(a), of International Application PCT/JP02/04341, filed Apr. 30, 2002, it being further noted that priority is based upon Japanese Patent Application 2001-135678, filed May 7, 2001 and Japanese Patent Application 2002-054093, filed Feb. 28, 2002.

BACKGROUND OF THE INVENTION

1. Field of the Invention

The present invention relates to a Faraday rotator, and more particularly, to a Faraday rotator for use in a variable optical attenuator etc.

2. Description of the Related Art

Optical communication technology is a key to the formation of the basis of multimedia communications, and there has been a demand for further advanced services with wider coverage. Also, with the recent explosive spread of the Internet, advancement of optical networks capable of large-capacity transmission is demanded. Under the circumstances, communication techniques such as WDM (Wavelength Division Multiplexing) communication in which optical signals with different wavelengths are multiplexed for transmission are attracting attention and are under development.

Meanwhile, due to the tendency toward larger capacity of optical networks, optical devices are also rapidly diversifying and are required to have high functionality. Typical examples of optical devices include variable optical attenuator, optical shutter, variable optical equalizer, etc.

The variable optical attenuator (VOA) is a device for variably controlling the level of optical signal in order to properly set a level diagram despite fluctuations in optical level.

The optical shutter is a device for preventing high optical power amplified in the process of optical communication from damaging the human body in case of disengagement of a connector or the like. When disengagement of the connector is detected, the optical shutter shuts down the transmitting optical output.

The variable optical equalizer is a device for equalizing gain by controlling the sum of gains of an EDFA (Erbium-Doped Fiber Amplifier) to a fixed value, to thereby flatten the wavelength-dependent gain characteristic within the signal band. EDFA is an optical amplifier (having a wide amplifiable wavelength range and a nonnegligible wavelength characteristic) using, as a medium for amplification, an optical fiber doped with erbium ($Er^{3+}$) and is widely used in repeaters etc. for WDM transmission.

A Faraday rotator is used as a principal component part of optical devices such as a variable optical attenuator, optical shutter, variable optical equalizer and the like. The Faraday rotator uses a magneto-optical crystal having the property of causing rotation of the plane of polarization of transmitting light by magnetic field (this rotation is called Faraday rotation and the angle of rotation is called Faraday rotation angle) and substantially controls the transmittance of light by means of the Faraday rotation angle.

Usually, the Faraday rotator uses, as its magneto-optical crystal, a yttrium iron garnet (YIG) crystal (hereinafter referred to as garnet single crystal) or the like. Recently, a film of bismuth-substituted rare-earth iron garnet single crystal formed by liquid-phase epitaxy has also come to be used. The bismuth-substituted rare-earth iron garnet single crystal film is superior to the garnet single crystal in that it has a large Faraday rotation coefficient.

However, both of the garnet single crystal and the bismuth-substituted rare-earth iron garnet single crystal film have a common disadvantage that the Faraday rotation angle is highly temperature-dependent (The Faraday rotation angle fluctuates in response to changes in ambient environmental temperature).

Thus, the Faraday rotation angle of a Faraday rotator shows a temperature characteristic, which is given by the sum of the temperature dependency of the Faraday rotation angle itself and the temperature dependency of magnetic anisotropy.

The magneto-optical crystal has an axis along which the crystal can be easily magnetized (easy magnetization axis) and an axis along which it is hard to magnetize the crystal (hard magnetization axis), depending on its crystal axis. The phenomenon showing different magnetic properties in different directions is called magnetic anisotropy. The magnitude of magnetic anisotropy (magnitude of energy directing magnetization along the hard magnetization axis) increases with decreasing temperature (Faraday rotation is less liable to occur) and decreases with increasing temperature (Faraday rotation is more liable to occur).

Because of the temperature characteristic of the Faraday rotator, the temperature stability of the variable optical attenuator, optical shutter and variable optical equalizer is impaired. Accordingly, the temperature characteristic of the Faraday rotator needs to be improved, in order to enhance the operation stability of such optical devices against changes in environmental temperature.

To improve the temperature characteristic of the Faraday rotator, a method has conventionally been employed in which the magneto-optical crystal is disposed in a manner such that the sign of the temperature coefficient of the crystal itself is opposite to that of the temperature coefficient of the magnetic anisotropy, to offset (cancel out) the temperature dependency of the Faraday rotation angle itself by the temperature dependency of the magnetic anisotropy and thereby suppress the temperature characteristic of the Faraday rotator.

FIG. 32 illustrates Faraday rotation angles, wherein the temperature-dependent Faraday rotation angle characteristic is canceled out by the temperature-dependent magnetic anisotropy characteristic according to the conventional method. The vertical axis indicates Faraday rotation angle and the horizontal axis indicates current (driving current passed through the coil wound around the electromagnet constituting the Faraday rotator). FIG. 32 shows Faraday rotation angles measured at temperatures of 0° C. and 65° C.

In a range H within which the temperature characteristics are canceled out, the Faraday rotator shows a small temperature characteristic and thus the Faraday rotation angle is not dependent on temperature (Namely, in the range H, the Faraday rotation angle is almost the same at both 0° C. and 65° C.). Thus, according to the conventional technique, the temperature-dependent Faraday rotation angle characteristic is canceled out by the temperature-dependent magnetic anisotropy characteristic, to thereby suppress and improve the temperature characteristic of the Faraday rotator.

As seen from FIG. 32, with the conventional technique, the Faraday rotator shows a small temperature characteristic only in the vicinity of a specific Faraday rotation angle falling within the range H (This is because, while the temperature coefficient of the Faraday rotation angle of the magneto-optical crystal is independent of the Faraday rotation angle and is almost constant, the temperature coefficient of the magnetic anisotropy exerts an influence only within a narrow range of orientation restricted to the vicinity of the specific Faraday rotation angle).

Consequently, the conventional technique is associated with a problem that, although the temperature-dependent Faraday rotation angle characteristic can be suppressed within the narrow range corresponding to the range H, the temperature characteristic cannot be suppressed over a wide range of Faraday rotation angle beyond the range H.

Temperature-dependent fluctuation (fluctuation of the Faraday rotation angle dependent on temperature) of a conventional Faraday rotator will be now described with reference to specific numerical values. FIG. 33 illustrates temperature-dependent Faraday rotation angle characteristics of the conventional Faraday rotator, wherein the vertical axis indicates Faraday rotation angle (deg.) and the horizontal axis indicates current (mA). FIG. 33 shows Faraday rotation angles observed at environmental temperatures of 0° C. (solid line), 25° C. (thick solid line) and 65° C. (dotted line), respectively.

FIG. 34 shows temperature-dependent fluctuation of the Faraday rotation angle of the conventional Faraday rotator. FIG. 34 illustrates a differential angle of the Faraday rotation angles shown in FIG. 33 (difference between maximum and minimum values among the three rotation angles at 0° C., 25° C. and 65° C.) within a range of current from 20 mA to 100 mA. The vertical axis indicates temperature-dependent rotation angle fluctuation (deg.), which is the differential angle, and the horizontal axis indicates current (mA).

In cases where the Faraday rotator is applied to a variable optical attenuator or variable optical equalizer, it is necessary that the temperature characteristic should be of a satisfactory level at and below a Faraday rotation angle of about 40 degrees. As shown in FIG. 33, however, the Faraday rotation angle exhibits a temperature characteristic even at a Faraday rotation angle of about 40 degrees within the temperature range of 0° C. to 65° C. (Namely, at a Faraday rotation angle around 40 degrees, the temperature characteristic curves in the graph are separated from one another and do not coincide to form a single line).

To confirm this with reference to FIG. 34, it is clearly shown that the Faraday rotation angle undergoes a temperature-dependent fluctuation of about 1.5 degrees within the range of the driving current from 20 mA to 100 mA, the driving current being supplied to the electromagnet constituting the Faraday rotator. Such large temperature-dependent fluctuation is not allowable for optical devices including a Faraday rotator as a component part.

The following describes problems with various optical devices using the conventional Faraday rotator. FIG. 35 illustrates temperature-dependent fluctuation of a variable optical attenuator using the conventional Faraday rotator. The vertical axis indicates attenuation deviation (dB) and the horizontal axis indicates current value (mA), the temperature range being from 0° C. to 65° C.

As shown in FIG. 35, a fluctuation of approximately 3 dB is observed within the range of the driving current value from 0 mA to 100 mA. A temperature-dependent fluctuation of 3 dB is not allowable in the case of setting the optical level for optical communications.

FIG. 36 illustrates temperature characteristics of an optical shutter using the conventional Faraday rotator. The vertical axis indicates amount of attenuation (dB) and the horizontal axis indicates current (mA). As shown in FIG. 36, the attenuation-to-current characteristics show significant temperature characteristics in a region where the amount of attenuation is large.

For example, where the driving current is 50 mA, an attenuation of 45 dB is obtained at 65° C., but the attenuation decreases to 28 dB at a temperature of 25° C. and drops further to 25 dB at a temperature of 0° C.

Thus, with the optical shutter using the conventional Faraday rotator, the amount of attenuation at the time of shut-down greatly varies depending on the environmental temperature, even if the current value is the same. Conventionally, therefore, a feedback control circuit must be separately provided for supplying the optical shutter with a suitable current value corresponding to the detected environmental temperature to set the amount of attenuation for the shut-down, but this leads to an increase in the cost of the optical shutter.

FIG. 37 illustrates temperature characteristics and temperature-dependent equalization deviation of a variable optical equalizer using the conventional Faraday rotator. The left-hand vertical axis indicates amount of attenuation (dB), the right-hand vertical axis indicates temperature-dependent equalization deviation (dB), and the horizontal axis indicates wavelength (nm).

From the data showing the temperature-dependent equalization deviation (gain equalization level dependent on temperature fluctuations), it is apparent that the temperature-dependent equalization deviation of the variable optical equalizer using the conventional Faraday rotator is as high as 0.7 dB in a wavelength range of input light from 1520 nm to 1560 nm.

Let us consider an optical communication system such as a WDM system having n stages (n is a positive integer) of repeaters with random characteristics. If the equalization deviation caused in one stage is 0.7 dB, an equalization deviation of $n^{1/2} \times 0.7$ dB is caused for n stages (e.g., about 2 dB for 10 stages, and 7 dB for 100 stages). It is difficult to apply variable optical equalizers having such characteristics to WDM systems.

SUMMRY OF THE INVENTION

The present invention was created in view of the above circumstances, and an object thereof is to provide a Faraday rotator whose temperature characteristic is not affected by magnetic anisotropy and which is improved in temperature-dependent Faraday rotation angle characteristic and thus in quality.

To achieve the object, the present invention provides a Faraday rotator for rotating a polarization plane of light transmitting therethrough by a magnetic field, wherein Faraday rotation is caused by a first magnetic field applied to a magneto-optical crystal of the Faraday rotator, a Faraday rotation angle is controlled by a second magnetic field over an entire variable strength range of the second magnetic field, and the magneto-optical crystal is positioned in such a manner that a direction of a combined magnetic field of the first and second magnetic fields, except for a direction of the first magnetic field, is variable intermediately between an easy magnetization axis and hard magnetization axis of the magneto-optical crystal. In the Faraday rotator, the Faraday rotation is caused by the first magnetic field applied to the magneto-optical crystal, the Faraday rotation angle is controlled by the second magnetic field over an entire variable strength range of the second magnetic field, and the magneto-optical crystal is positioned in such a manner that the direction of the combined magnetic field of the first and second magnetic fields, except for the direction of the first magnetic field, is variable intermediately between the easy and hard magnetization axes of the magneto-optical crystal.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 21 is a table collectively showing a temperature coefficient of coil current and consumption of electric power with respect to changes in series resistance or parallel resistance of the driving circuit;

DESCRIPTION OF THE PREFERRED EMBODIMENTS

Figure 1:
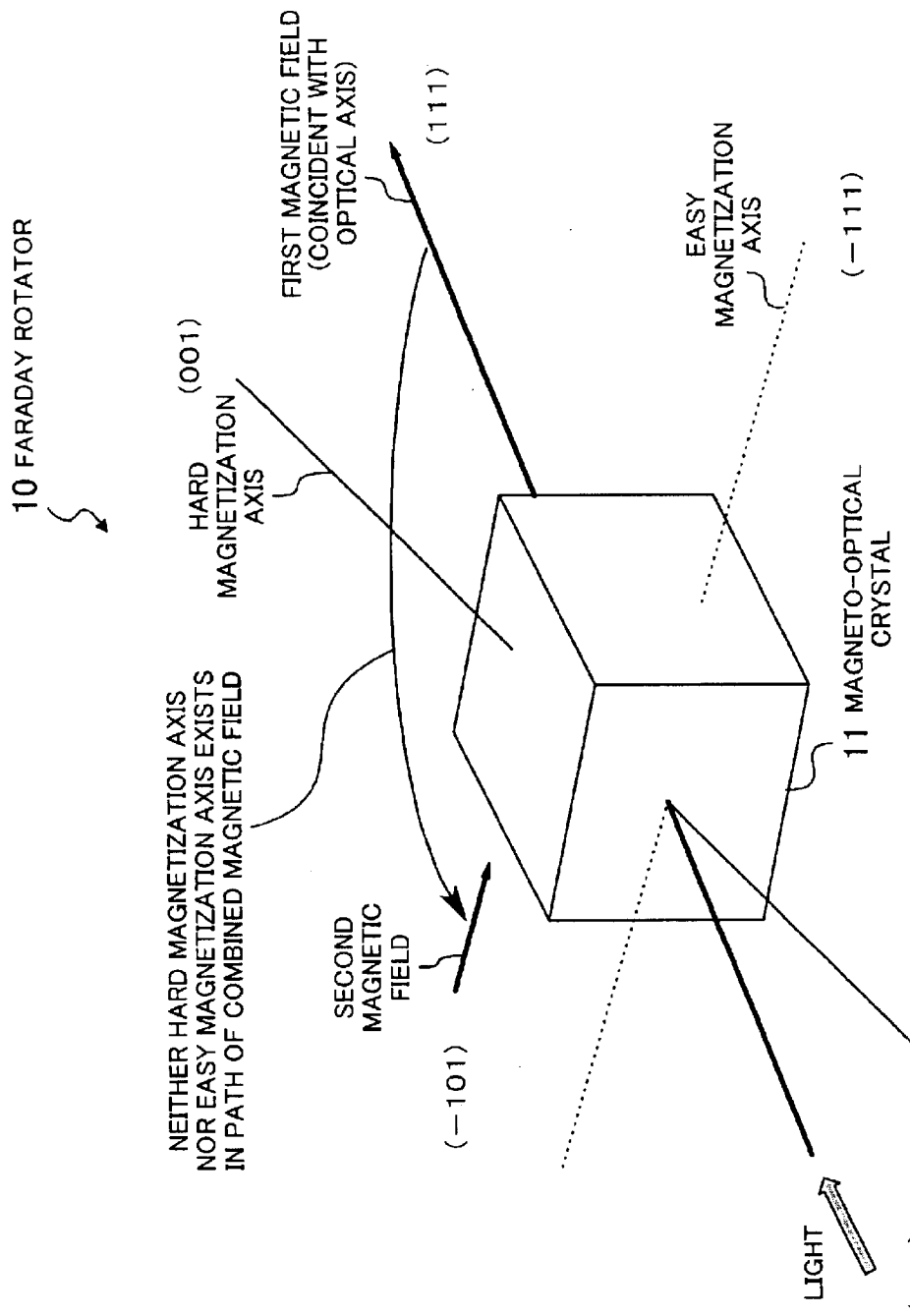
FIG. 1 is a diagram illustrating the principle of a Faraday rotator according to the present invention.

Embodiments of the present invention will be hereinafter described with reference to the drawings. FIG. 1 illustrates the principle of a Faraday rotator according to the present invention. The Faraday rotator 10 is a variable Faraday rotator wherein Faraday rotation is caused by a first magnetic field (magnetic field of fixed strength in a direction identical with or opposite to the direction of light) applied to a magneto-optical crystal 11 and the angle of Faraday rotation is controlled by a second magnetic field (magnetic field of variable strength in a direction perpendicular to the first magnetic field) over an entire variable strength range of the second magnetic field.

In the Faraday rotator 10 according to the present invention, the magneto-optical crystal 11 is positioned in such a manner that the direction of a combined magnetic field of the first and second magnetic fields, except for the direction of the first magnetic field, is variable intermediately between an easy magnetization axis and hard magnetization axis of the magneto-optical crystal 11 (movable within a range not including the easy or hard magnetization axis).

Specifically, as the strength of the second magnetic field is increased, the combined magnetic field changes its direction from the direction of the first magnetic field toward the direction of the second magnetic field. According to the present invention, the magneto-optical crystal 11 is positioned such that the combined magnetic field does not coincide with the hard and easy magnetization axes that impart magnetic anisotropy. Numerical values of (hkl) appearing in FIG. 1 will be explained later.

Figure 2:
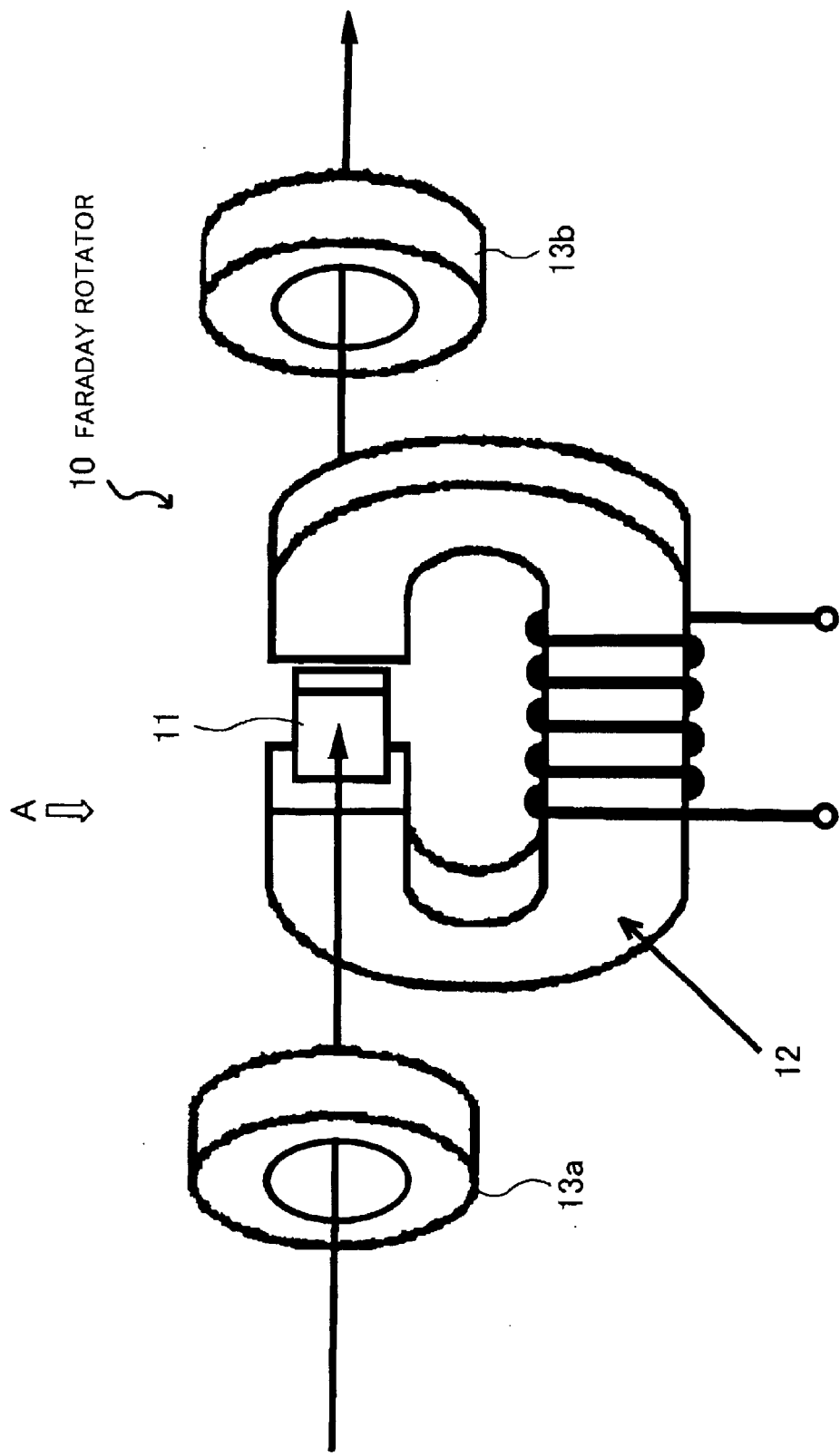
FIG. 2 is a diagram illustrating an arrangement of the Faraday rotator according to the present invention.

FIG. 2 illustrates the arrangement of the Faraday rotator 10 of the present invention. The Faraday rotator 10 is constituted by the magneto-optical crystal (also called Faraday element) 11, a pair of permanent magnets. 13a and 13b for applying a fixed magnetic field (corresponding to the first magnetic field) to the Faraday element 11, and an electromagnet 12 for applying a variable magnetic field (corresponding to the second magnetic field) to the Faraday element 11. A driving circuit (including the electromagnet 12 as a component part thereof) for passing an electric current through the coil to energize the same is not illustrated in FIG. 2 and will be explained later.

The direction of the magnetic field generated by the permanent magnets 13a and 13b is made to coincide with the direction of the optical axis of input light, and the variable magnetic field is applied by the electromagnet 12 in a direction perpendicular to the direction of the magnetic field generated by the permanent magnets 13a and 13b. The strength of the fixed magnetic field applied to the Faraday element 11 by the permanent magnets 13a and 13b is set to a magnetic field strength at which magnetization of the Faraday element 11 is saturated.

Because of the magnetic field applied by the permanent magnets 13a and 13b, magnetization of the Faraday element 11 is saturated, and therefore, the strength of magnetization of the magneto-optical crystal by means of the combined magnetic field including the magnetic field generated by the permanent magnets 13a and 13b and the magnetic field generated by the electromagnet 12 is equal to the strength of the magnetic field generated by the permanent magnets 13a and 13b only. Also, since the direction of the combined magnetic field varies depending on the strength of the magnetic field generated by the electromagnet 12, the direction of magnetization of the Faraday element 11 also changes.

Accordingly, a component of magnetization (combined magnetic field) of the Faraday element 11 in the direction of the optical axis varies depending on the strength of the magnetic field applied by the electromagnet 12, whereby the Faraday rotation angle to be given to the input light can be controlled.

Figure 3:
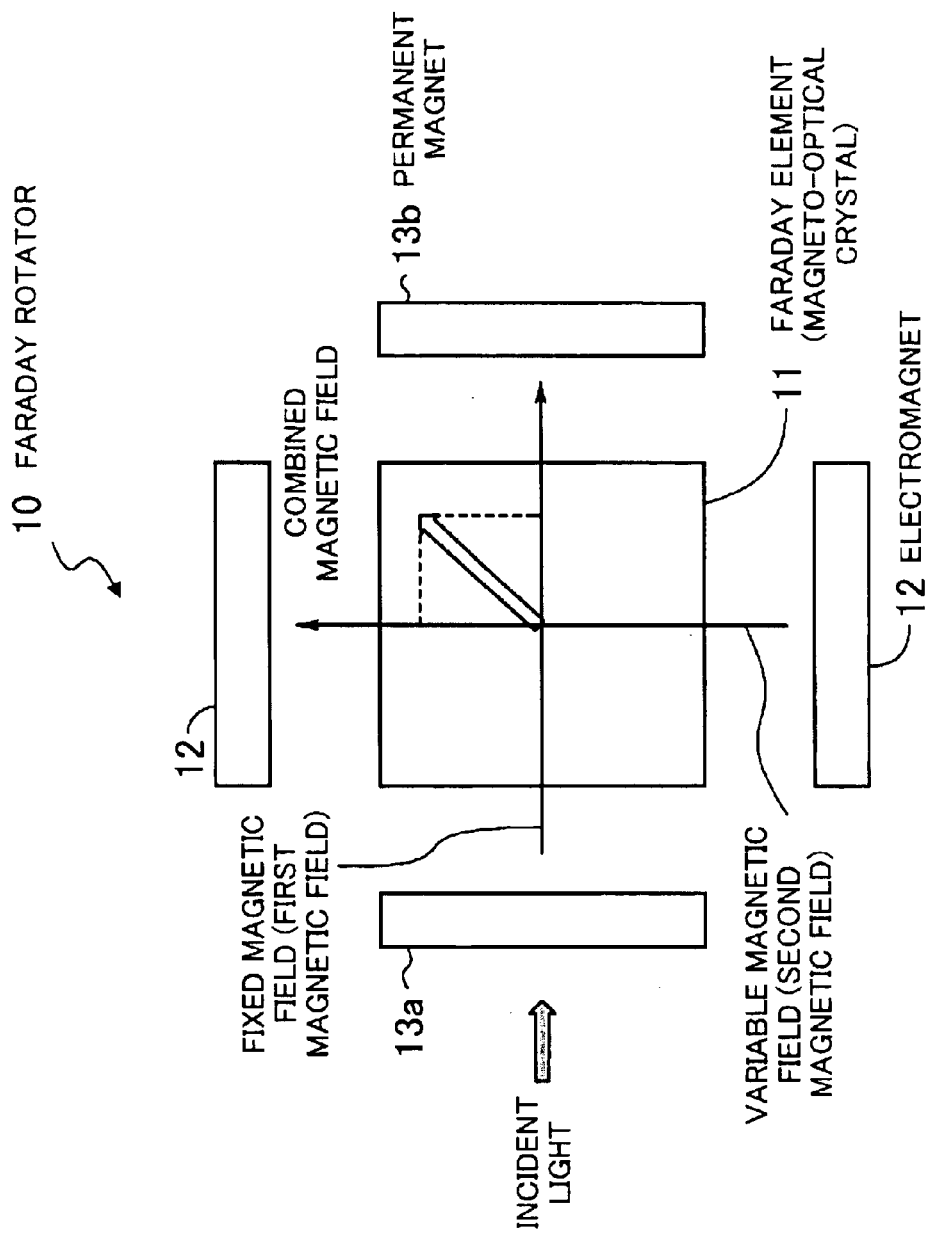
FIG. 3 is a diagram showing the Faraday rotator of FIG. 2 as viewed from direction A.
Figure 4:
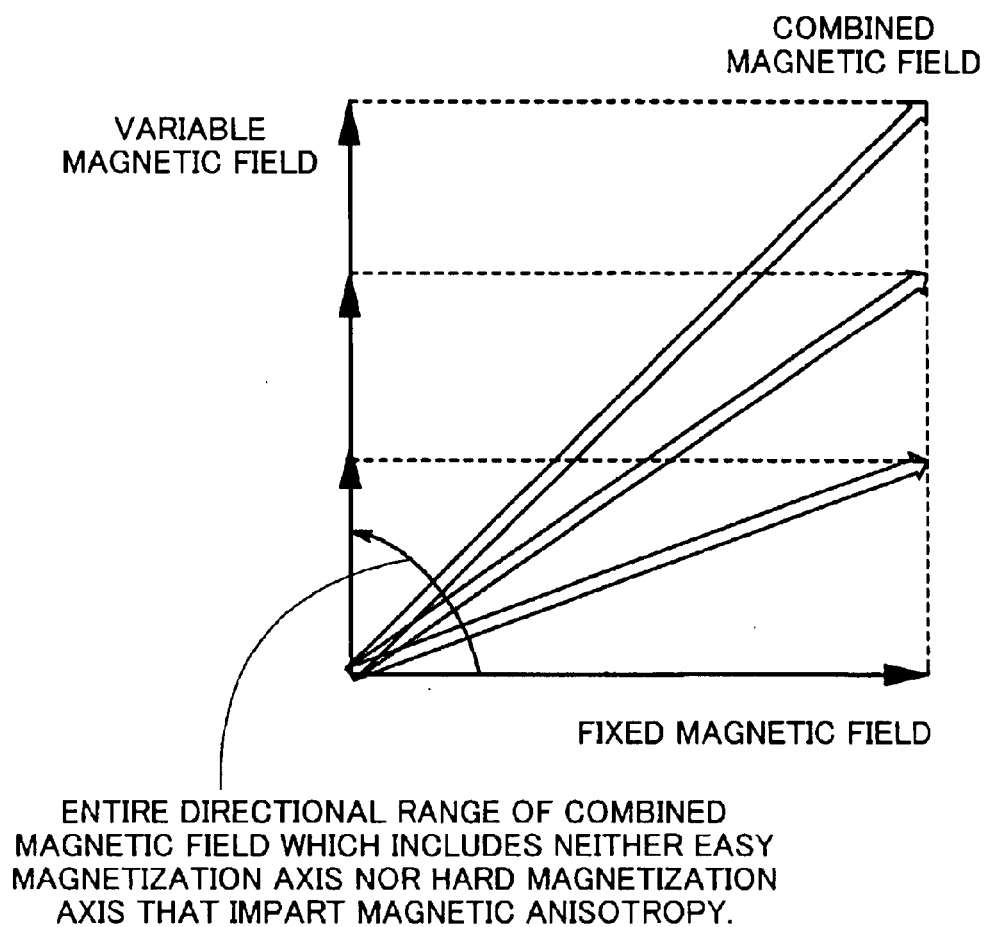
FIG. 4 is a diagram illustrating vectors of a combined magnetic field.

FIG. 3 illustrates the Faraday rotator 10 of FIG. 2 as viewed from direction A, and FIG. 4 illustrates vectors of the combined magnetic field. The fixed magnetic field is applied to the magneto-optical crystal 11 in the direction of incident light by the permanent magnets 13a and 13b, and the variable magnetic field is applied by the electromagnet 12 in a direction perpendicular to the fixed magnetic field, whereby the combined magnetic field is produced by the fixed magnetic field and the variable magnetic field.

The combined magnetic field changes its direction depending on the strength of the variable magnetic field, but according to the present invention, the directional change of the combined magnetic field is so set by positioning the Faraday element 11 that the combined magnetic field passes neither the easy magnetization axis nor the hard magnetization axis of the Faraday element 11 (except for the fixed magnetic field, or the combined magnetic field when the variable magnetic field strength is "0").

The present invention will be now described in more detail with reference to a stereographic projection diagram of FIG. 5. In the illustrated stereographic projection diagram, the center corresponds to the (111) plane of a garnet single crystal as the magneto-optical crystal 11.

The stereographic projection diagram is used to describe the angular relationship of lattice planes and orientations of a crystal, wherein a sphere having its center coinciding with a point in the crystal is considered, and points and lines indicated on the sphere are projected onto a plane.

A lattice plane of the crystal is represented by Miller indices. Where the crystal axes of space lattice are selected as coordinate axes X, Y and Z, respectively, and the coordinates of a point at which a lattice plane intersect these axes are A, B and C, the Miller indices of the lattice plane are given as three integers h, k and l in $$X/|A|:Y/|B|:Z/|C|=1/h:1/k:1/l \qquad (1)$$

Figure 6:
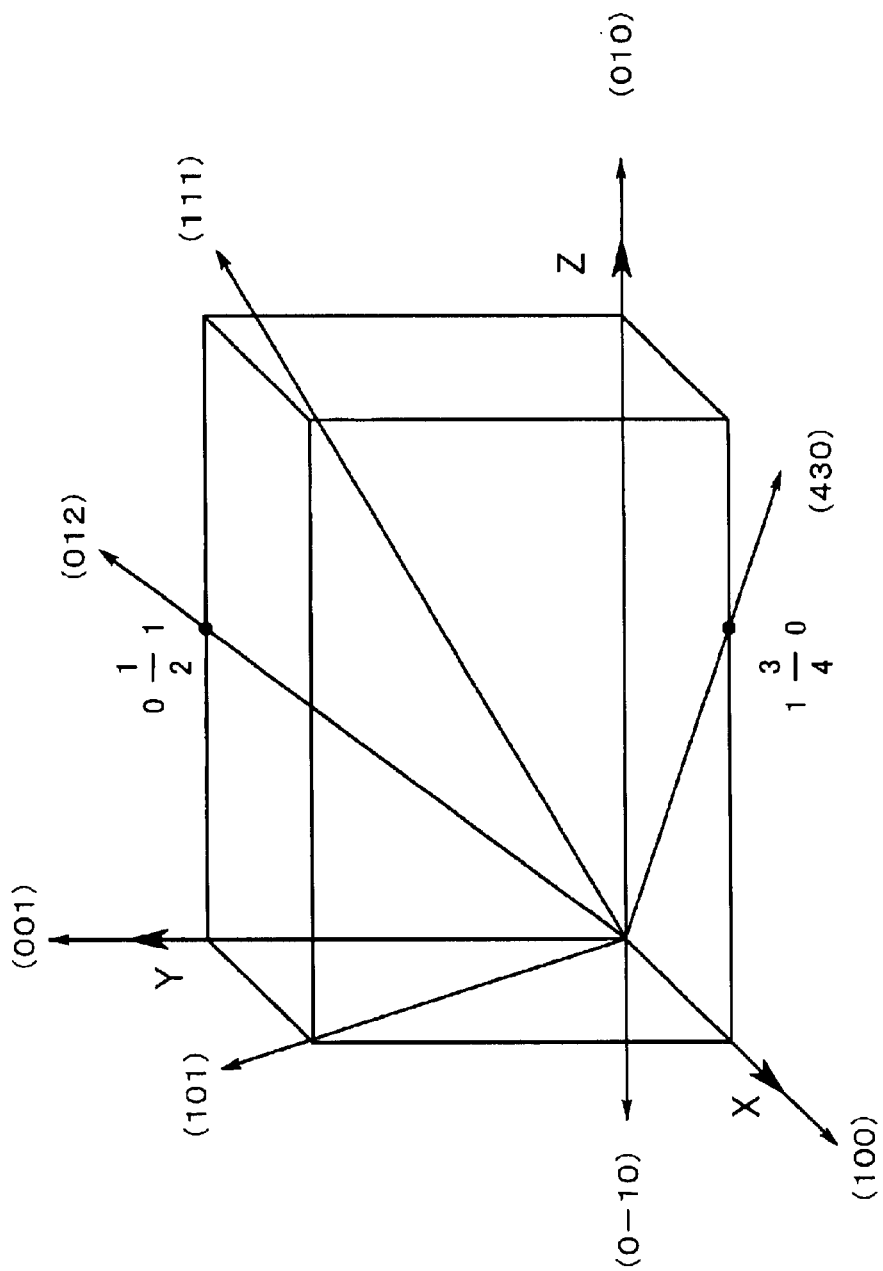
FIG. 6 is a diagram showing examples of direction indices.

A lattice plane parallel with a certain coordinate axis is expressed using the integer "0." For example, (0kl) represents a lattice plane parallel with the X axis. A lattice plane intersecting the negative side of an axis is expressed using a bar above the corresponding index (In the specification, however, the bar is indicated instead by the sign "-" because of printing restrictions). Also, the direction (normal) perpendicular to an (hkl) plane is called direction index, examples of which are shown in FIG. 6.

Figure 5:
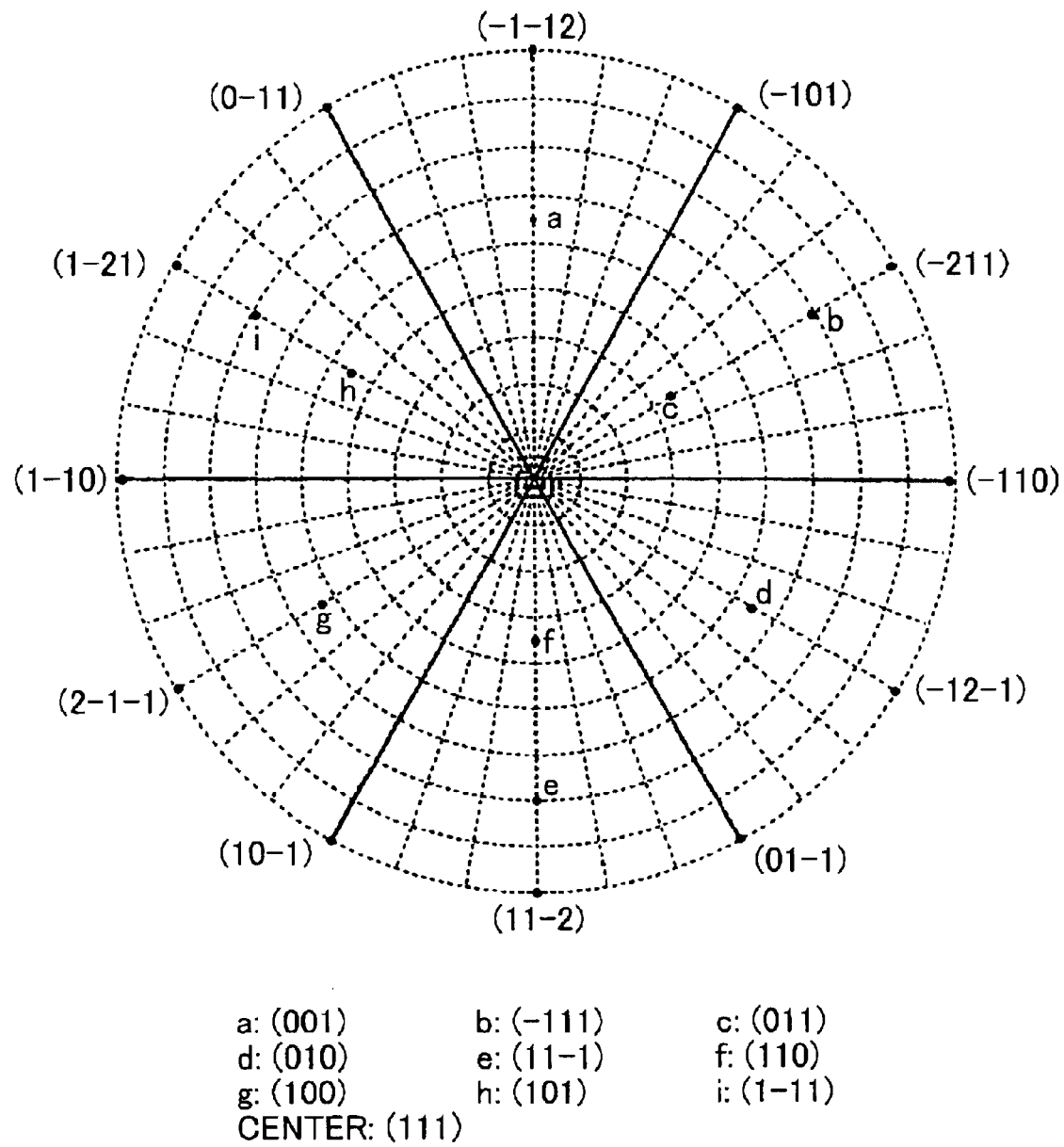
FIG. 5 is a stereographic projection diagram illustrating the present invention.

In the stereographic projection diagram of FIG. 5, the center represents the (111) plane, adjacent concentric circles represent planes with a difference of 10 degrees, and adjacent straight lines in the radius direction represent planes with a difference of 10 degrees. In this way, any plane of the garnet single crystal can be expressed as a point in the stereographic projection diagram.

In the case of a garnet single crystal having magnetic anisotropy, the easy magnetization axis coincides with an orientation (e.g., (-111), (11-1), etc.) symmetrical with and equivalent to the (111) orientation, and the hard magnetization axis coincides with an orientation (e.g., (001), (010), etc.) symmetrical with and equivalent to the (100) orientation (The orientations of the easy and hard magnetization axes are determined by the structure of the garnet single crystal).

If, in FIG. 5, the variable magnetic field is applied by the electromagnet from the (111) orientation to the (-1-12) orientation (that is, if the variable magnetic field is applied from the center point (111) toward the point (-1-12)), there exists a hard magnetization axis (001)a which is 55 degrees from the (111) orientation. Accordingly, magnetization of the garnet single crystal is less liable to be directed in the (001) orientation a of the hard magnetization axis, and the Faraday rotation angle exhibits a temperature characteristic under the influence of the magnetic anisotropy.

On the other hand, if the magnetic field is applied by the electromagnet from the (111) orientation to the (-211) orientation (that is, if the variable magnetic field is applied from the center point (111) toward the point (-211)), there exists an easy magnetization axis (-111)b which is 70 degrees from the (111) orientation. Accordingly, magnetization of the garnet single crystal is more liable to be directed in the (-111) orientation b of the easy magnetization axis, and also in this case, the Faraday rotation angle exhibits a temperature characteristic under the influence of the magnetic anisotropy.

In the case where the variable magnetic field is applied by the electromagnet in the (-101) orientation (that is, the variable magnetic field is applied from the center point (111) toward the point (-101)), the direction of the combined magnetic field coincides with neither the hard magnetization axis nor the easy magnetization axis in the process of movement. Also, the plane of the varying combined magnetic field is directed such that the (001) orientation a of the hard magnetization axis and the (-111) orientation b of the easy magnetization axis, which are closest in direction to the combined magnetic field, are located almost symmetrical with respect to the orientation of the combined magnetic field (that is, the (-101) orientation is farthest from both the (001) orientation a of the hard magnetization axis and the (-111) orientation b of the easy magnetization axis).

Consequently, in the case where the variable magnetic field is applied in the (-101) orientation, the magnetic anisotropy exerts almost no influence upon the temperature-dependent Faraday rotation angle characteristic of the garnet single crystal.

Accordingly, the temperature characteristic of the Faraday rotator is determined solely by the temperature-dependent Faraday rotation angle characteristic of the garnet single crystal itself, and in this case, the temperature coefficient takes a nearly constant negative value.

Because of the symmetric property of the crystal, there are (010) orientation d and (100) orientation g of the hard magnetization axes, which are in the (-12-1) and (2-1-1) orientations, respectively, separated from the (-1-12) orientation by 120 degrees. Also in cases where the variable magnetic field is applied in these orientations, a temperature-dependent Faraday rotation angle characteristic is caused.

Also, there are (11-1) orientation e and (1-11) orientation i of the easy magnetization axes, which are in the (11-2) and (1-21) orientations, respectively, separated from the (-211) orientation by 120 degrees. Also in cases where the variable magnetic field is applied in these orientations, a temperature-dependent Faraday rotation angle characteristic is caused.

Accordingly, if the variable magnetic field is applied in any of the (-110), (01-1), (10-1), (1-10) and (0-11) orientations, which are located successively at intervals of 60 degrees from the (-101) orientation, no influence is exerted by the magnetic anisotropy. These orientations are orientations permitting the direction of the combined magnetic field to vary intermediately between the orientations of the easy and hard magnetization axes of the magneto-optical crystal 11.

Thus, in the present invention, the magneto-optical crystal 11 is positioned such that the combined magnetic field is directed in one of these orientations, whereby the combined magnetic field passes neither the easy magnetization axis nor the hard magnetization axis and can be caused to rotate within a plane with respect to which the easy and hard magnetization axes are nearly symmetrical, making it possible to eliminate the influence of the magnetic anisotropy on the temperature characteristic.

Figure 7:
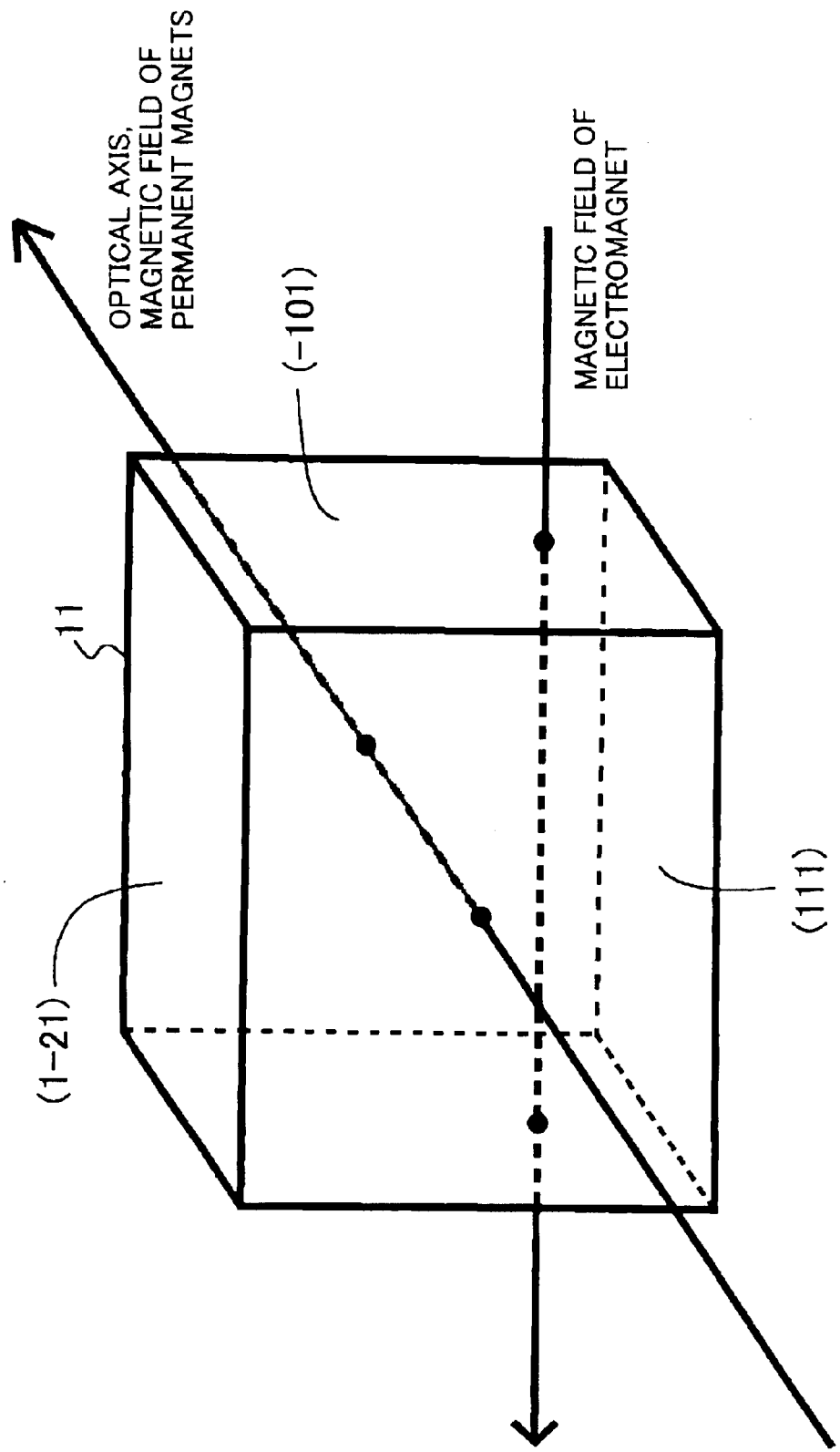
FIG. 7 is a diagram showing an example of how a Faraday element is positioned.

FIG. 7 shows an example of how the Faraday element is positioned. In the example shown in FIG. 7, the Faraday element 11 is formed by cutting the magneto-optical crystal 11 at planes perpendicular to the (111), (-101) and (1-21) orientations, respectively. Light is made to be incident on the (111) plane, the fixed magnetic field is applied by the permanent magnets 13a and 13b in the same direction as the direction of the optical axis, and the variable magnetic field is applied by the electromagnet 12 from the (-101) plane.

As explained above, in the Faraday rotator 10 of the present invention, the magneto-optical crystal 11 is positioned such that the direction of the combined magnetic field of the fixed and variable magnetic fields is variable intermediately between the easy and hard magnetization axes of the magneto-optical crystal 11, to thereby eliminate the influence of the magnetic anisotropy and utilize only the temperature-dependent Faraday rotation characteristic of the Faraday element.

According to the present invention, a Faraday element 11 could be obtained of which the temperature coefficient of the Faraday rotation angle was about −0.0025 (degrees/° C.) per degree of Faraday rotation angle in a low Faraday rotation angle region, that is, in the region of 0 degrees to 40 degrees, and was independent of the magnetic anisotropy.

In the foregoing description, the fixed magnetic field is applied by the permanent magnets 13a and 13b, and the variable magnetic field is applied by the electromagnet 12. Alternatively, the fixed magnetic field may be applied by the electromagnet 12 and the variable magnetic field may be obtained by shielding part of the fixed magnetic field generated by the permanent magnets 13a and 13b. Also, a plurality of crystals like the one explained above may be stacked one upon another in identical orientations.

Figure 8:
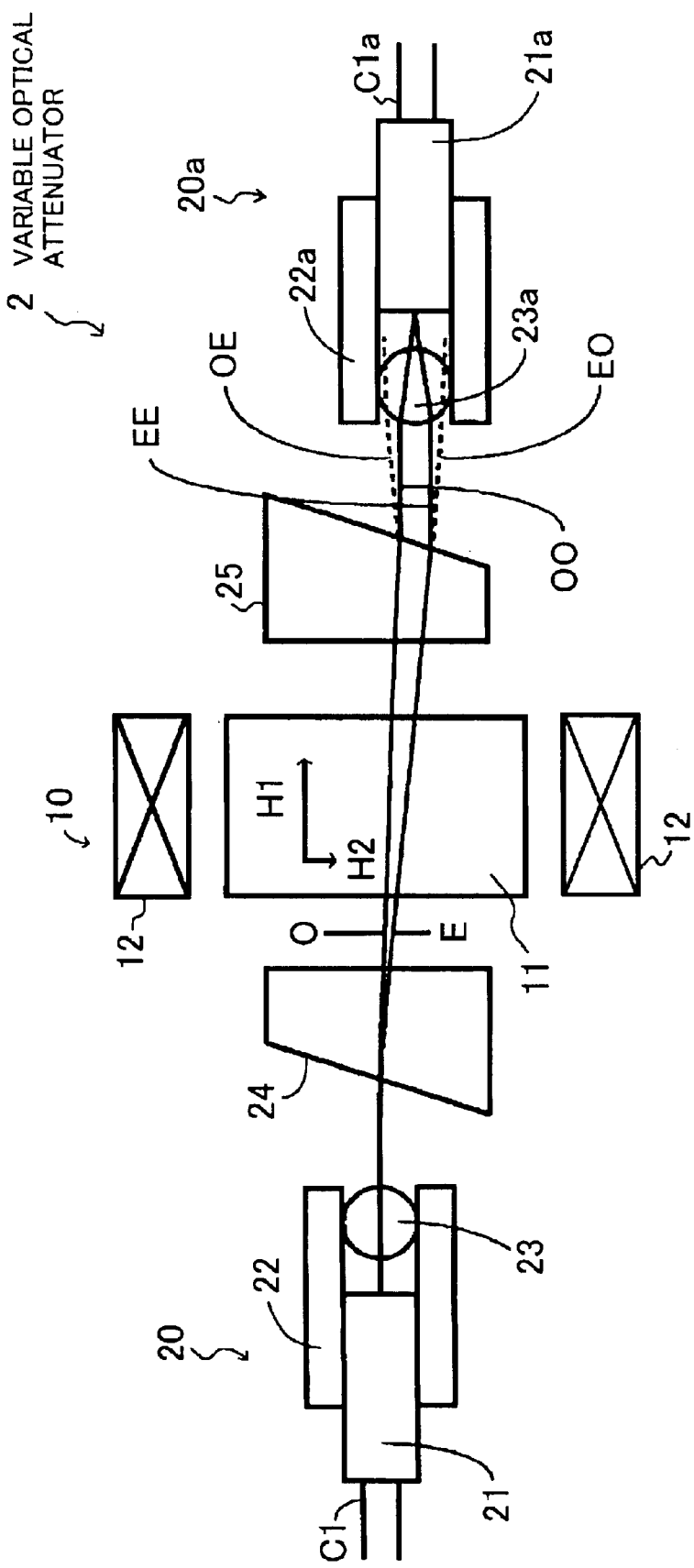
FIG. 8 is a diagram illustrating an arrangement of a variable optical attenuator.

A variable optical attenuator using the Faraday rotator 10 according to the present invention will be now described. FIG. 8 illustrates the arrangement of the variable optical attenuator. In the variable optical attenuator 2, an input optical fiber C1 is an optical fiber for introducing input light. A collimator system 20 includes a ferrule 21, a collimating lens 23 and a lens holder 22, and turns the input optical signal into a parallel beam.

The input optical fiber C1 is securely bonded to the ferrule 21, and the collimating lens 23 turns the light from the input optical fiber C1 into a parallel beam. The lens holder 22 firmly holds the collimating lens 23. The lens holder 22 is welded to the ferrule 21 after the distance between the input optical fiber C1 and the collimating lens 23 is adjusted to the focal distance of the collimating lens 23.

A polarizer 24 is made of, for example, a wedge-shaped birefringent crystal such as rutile, and separates the input light into ordinary light O and extraordinary light E having directions of polarization perpendicular to each other.

The Faraday rotator 10 has the arrangement of FIG. 2 explained above, and therefore, description thereof is omitted (the permanent magnets are omitted from FIG. 8 to avoid complexity of illustration). The Faraday rotator 10 changes the magnetic field strength in the propagation direction of light by means of the magnetic field generated by the electromagnet 12, to thereby change the Faraday rotation angle of the ordinary light O and the extraordinary light E.

An analyzer 25, which is made of a wedge-shaped birefringent crystal such as rutile, for example, separates the ordinary light O further into ordinary light OO and extraordinary light OE and also separates the extraordinary light E further into ordinary light EO and extraordinary light EE.

A collimator system 20a includes a ferrule 21a, a collimating lens 23a, and a lens holder 22a for firmly holding the collimating lens 23a, and couples the light emitted from the analyzer 25 to an output optical fiber C1a.

The relationship between the output optical fiber C1a and the ferrule 21a and between the lens holder 22a holding the collimating lens 23a and the ferrule 21a is identical with that between the corresponding elements of the collimator system 20.

The following describes the operation of the variable optical attenuator 2 when the birefringent crystals constituting the polarizer 24 and the analyzer 25 are arranged such that their optical axes are perpendicular to each other. The input light from the input optical fiber C1 is turned into a parallel beam by the collimating lens 23 and then separated into ordinary light O and extraordinary light E by the polarizer 24. The directions of polarization of the ordinary light O and extraordinary light E are at right angles to each other.

While the ordinary light O and the extraordinary light E pass through the Faraday rotator 10, their polarization directions are rotated in accordance with the strength of the combined magnetic field in a direction parallel to the propagation direction of the light. The ordinary light O whose polarization direction has thus been rotated is separated further into ordinary light OO and extraordinary light OE by the analyzer 25. Also, the extraordinary light E of which the polarization direction has been rotated is separated further into ordinary light EO and extraordinary light EE by the analyzer 25.

The ordinary light OO and extraordinary light EE emitted from the analyzer 25 are parallel to each other and are coupled to the core of the output optical fiber C1a through the collimating lens 23a. On the other hand, the ordinary light EO and extraordinary light OE emitted from the analyzer 25 are not parallel to each other but spread; therefore, they are less likely to be coupled to the core of the output optical fiber C1a even if passed through the collimating lens 23a.

When the strength of the magnetic field generated by the electromagnet 12 of the Faraday rotator 10 is "0," the Faraday rotation angle of the Faraday element 11 is 90 degrees, and the ordinary light O emitted from the Faraday rotator 10 turns in its entirety into the ordinary light OO in the analyzer 25.

The extraordinary light E emitted from the Faraday rotator 10 turns in its entirety into the extraordinary light EE in the analyzer 25. In this case, therefore, all of the input light is coupled to the core of the output optical fiber C1a and the loss thereof is ideally "0."

On the other hand, when the strength of the magnetic field generated by the electromagnet 12 of the Faraday rotator 10 is sufficiently high, the Faraday rotation angle of the Faraday element 11 approaches 0 degrees, and the ordinary light O emitted from the Faraday rotator 10 turns into the extraordinary light OE in the analyzer 25.

The extraordinary light E emitted from the Faraday rotator 10 turns into the ordinary light EO in the analyzer 25. In this case, therefore, the input light is much less likely to be coupled to the core of the output optical fiber C1a and the loss thereof is at a maximum. When the Faraday rotation angle is intermediate between 0 degrees and 90 degrees, the loss takes an intermediate value.

As explained above, the Faraday rotation angle of the Faraday element 11 varies within the range of 90 degrees to 0 degrees in accordance with the strength of the magnetic field generated by the electromagnet 12 of the Faraday rotator 10. Since the amount of light coupled to the core of the output optical fiber C1a changes in accordance with the Faraday rotation angle, the variable optical attenuation function can be achieved with the arrangement shown in FIG. 8.

An optical shutter is a device to which the variable optical attenuator 2 is applied. Specifically, the electric current supplied to the electromagnet 12 is switched between a current at which the attenuation of the variable optical attenuator 2 becomes minimum and a current at which the attenuation becomes maximum, thereby obtaining an optical shutter capable of switching between the minimum attenuation and the maximum attenuation (Usually, a variable optical attenuator capable of producing a difference of about 30 dB between the maximum attenuation and the minimum attenuation is used as an optical shutter).

In the above description, the variable optical attenuator 2 and the optical shutter are each constituted using a polarizer, a Faraday rotator and an analyzer. It is also possible to use a reflector element to constitute the variable optical attenuator and the optical shutter.

Specifically, making use of non-reciprocity of the Faraday rotator 10 constituted by the magneto-optical crystal 11, a polarizer and a reflector element are arranged on incoming and outgoing sides, respectively, of an optical signal, and the Faraday rotator 10 is arranged between the polarizer and the reflector element, thereby obtaining a reflection type variable optical attenuator or reflection type optical shutter.

Figure 9:
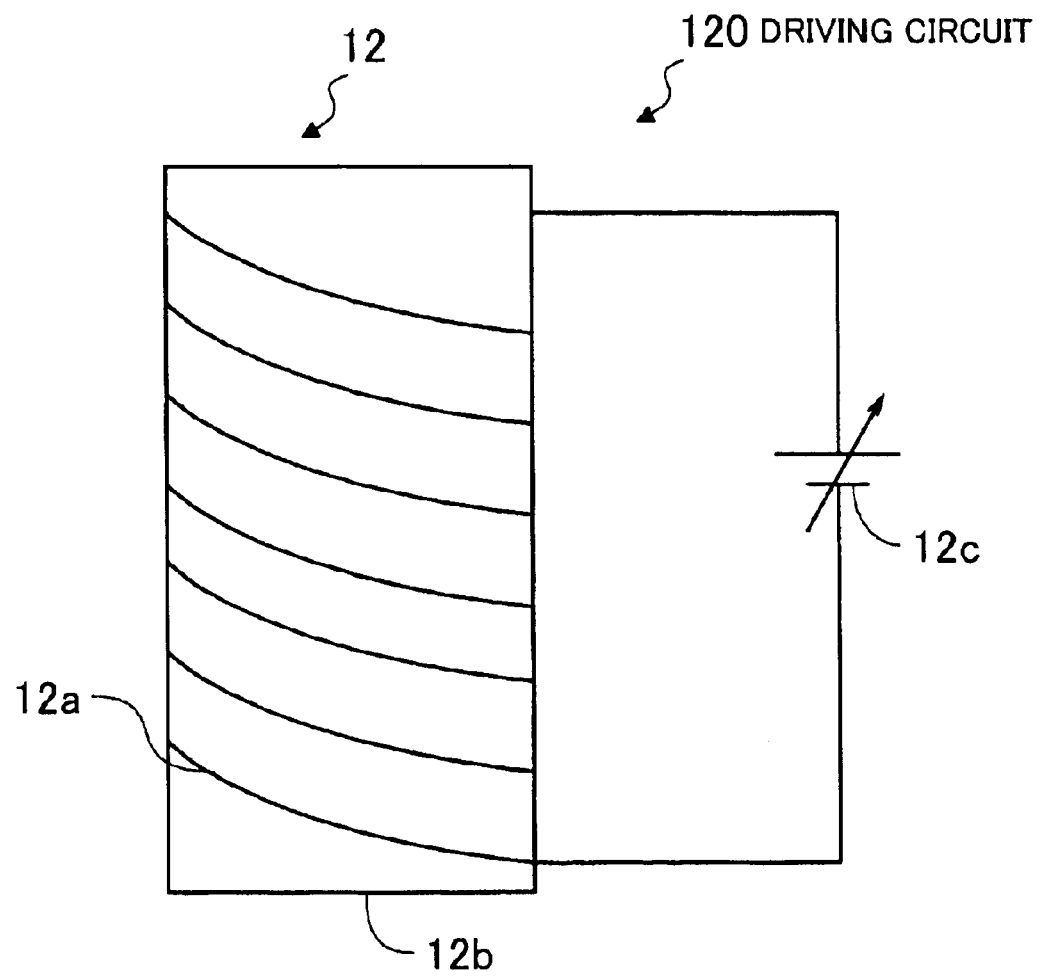
FIG. 9 is a diagram illustrating a driving circuit for an electromagnet of a Faraday rotator applied to the variable optical attenuator.

FIG. 9 illustrates a driving circuit for the Faraday rotator 10 applied to the variable optical attenuator 2. The driving circuit 120 comprises a coil 12a, a magnetic core 12b, and a variable voltage source 12c (of which the output voltage has no temperature coefficient) (The coil 12a and the magnetic core 12b constitute the electromagnet 12).

In the case where an enamel-coated copper wire is used as the coil 12a, for example, the coil 12a has an electric resistance of about 50 Ω and the electric resistance has a positive temperature coefficient of about +0.2 Ω/° C.

Electric resistance having a positive temperature coefficient shows low resistance at low temperatures and high resistance at high temperatures. Accordingly, a voltage value at a certain temperature may be set in the voltage source 12c, whereby the electric resistance lowers as the temperature decreases from that temperature, so that the current flowing through the coil 12a automatically increases. As the temperature rises, the electric resistance increases, so that the current flowing through the coil 12a automatically decreases.

Figure 36:
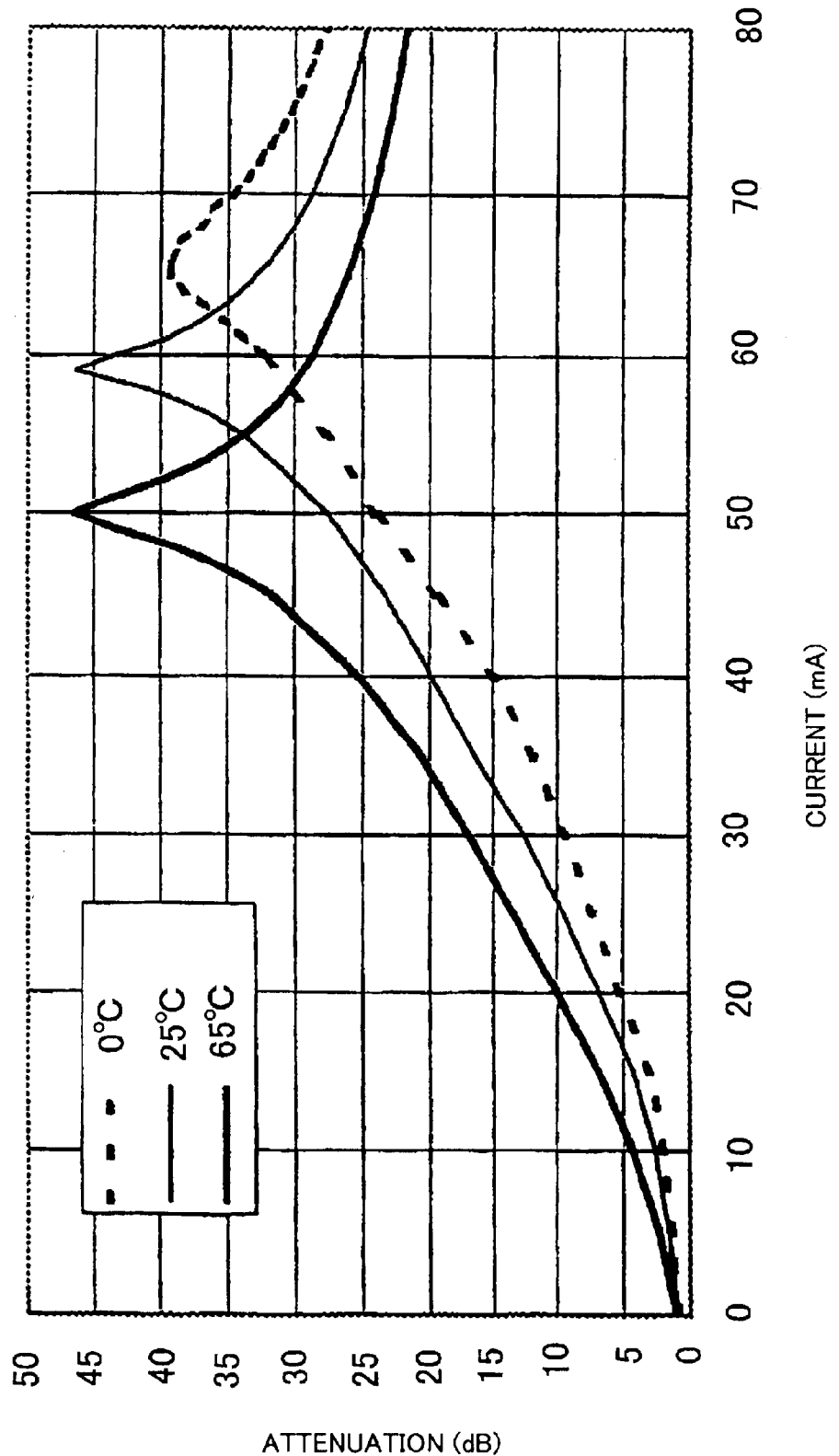
FIG. 36 is a graph showing temperature characteristics of an optical shutter to which the conventional Faraday rotator is applied.
Figure 37:
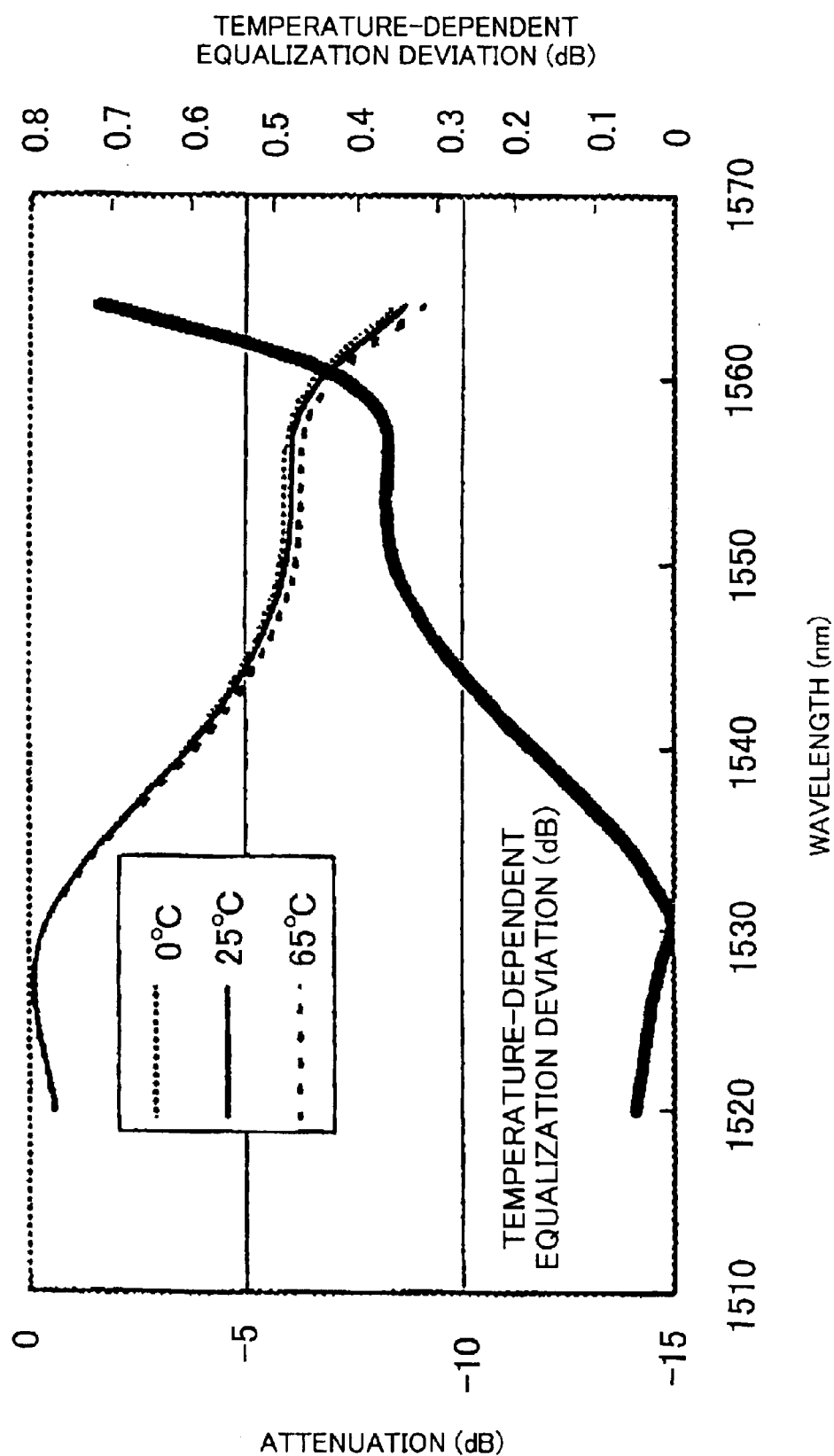
FIG. 37 is a graph showing temperature characteristics and temperature-dependent equalization deviation of a variable optical equalizer to which the conventional Faraday rotator is applied.

This will be explained with reference to FIG. 36 showing the temperature characteristics (although FIG. 36 illustrates the temperature characteristics of an optical shutter, it applies to a variable optical attenuator as well). Where the driving circuit 120 of the present invention is used, the attenuation peaks at 0° C., 25° C. and 65° C. shift such that the current increases as the temperature falls and decreases as the temperature rises, showing such forms as to follow the peaks (In consequence, the temperature-dependent attenuation fluctuation can be decreased).

Since the electric resistance of the coil 12a has a positive temperature coefficient, the driving current supplied to the coil 12a of the electromagnet 12 has a negative temperature coefficient and the strength of the magnetic field generated by the electromagnet 12 also has a negative temperature coefficient. Accordingly, the magnetic field strength in the optical-axis direction of the combined magnetic field generated by the permanent magnets 13a and 13b and the electromagnet 12 has a positive temperature coefficient, and thus the Faraday rotation angle dependent on the temperature coefficient of the resistance of the driving circuit 120 has a positive temperature coefficient.

Also, as mentioned above with reference to FIGS. 1 through 7, the Faraday rotation angle of the Faraday element of the Faraday rotator 10 according to the present invention has a temperature coefficient of about −0.0025 (degrees/° C.) per degree of Faraday rotation angle. Thus, the Faraday rotation angle of the Faraday element 11 itself has a negative temperature coefficient.

Accordingly, the negative temperature coefficient of the Faraday rotation angle of the Faraday element 11 itself can be canceled out by the positive temperature coefficient of the Faraday rotation angle dependent on the temperature coefficient of the resistance of the driving circuit 120, whereby the temperature-dependent Faraday rotation angle characteristic of the Faraday rotator 10 can be further improved.

In the case where the Faraday rotation angle of the Faraday element 11 has a positive temperature coefficient, a resistor having a negative temperature coefficient may be used for the coil 12a. A resistor having a negative temperature coefficient can be easily formed by thin film technology. Specifically, a ceramic cylinder having a thin-film resistor formed thereon may be fitted around the magnetic core 12b and a current may be supplied to the thin-film resistor from the voltage source 12c (This technique is equally applicable to modifications of the driving circuit described later).

The voltage source 12c whose output voltage has no temperature coefficient may be implemented by a means in which the temperature characteristic of a transistor constituting the voltage source is compensated for by an element having a temperature characteristic, such as a diode or thermistor.

Thus, in the driving circuit 120 of the present invention, the positive temperature coefficient is controlled by the voltage so that the current flowing through the coil 12a may also vary in response to change in temperature, whereby the temperature-dependent attenuation fluctuation can be reduced. In addition, the negative temperature coefficient of the Faraday rotation angle of the Faraday element 11 itself can be canceled out by the positive temperature coefficient of the Faraday rotation angle dependent on the temperature coefficient of the resistance of the driving circuit 120, and accordingly, the temperature-dependent Faraday rotation angle characteristic can be further improved.

Figure 10:
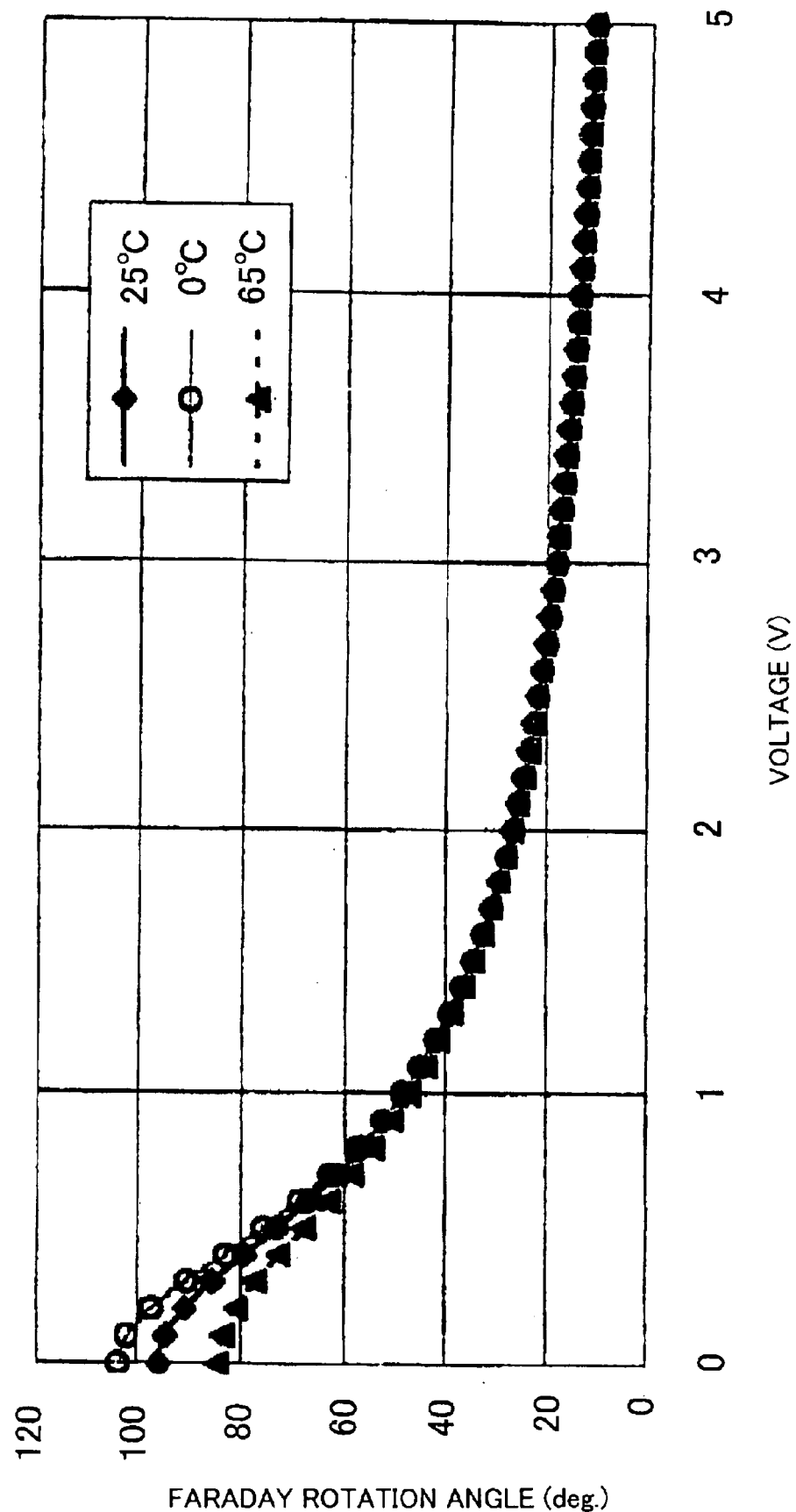
FIG. 10 is a graph showing temperature-dependent Faraday rotation angle characteristics of the Faraday rotator.

Various characteristics which are indicative of the effect of using the driving circuit 120 will be now described with reference to FIGS. 10 to 13. FIG. 10 illustrates temperature-dependent Faraday rotation angle characteristics of the Faraday rotator 10, or more specifically, the temperature dependency observed in the case where the driving circuit 120 is applied. The vertical axis indicates Faraday rotation angle (deg.), the horizontal axis indicates voltage (V), and the characteristics measured at temperatures of 25° C., 0° C. and 65° C. are plotted.

As shown in FIG. 10, when the Faraday rotation angle is 40 degrees or below, the Faraday rotation angle shows almost no temperature characteristic (For a Faraday rotation angle of 40 degrees or less, the characteristic curves of the respective temperatures are not separate but are coincident, forming a single curve).

Figure 11:
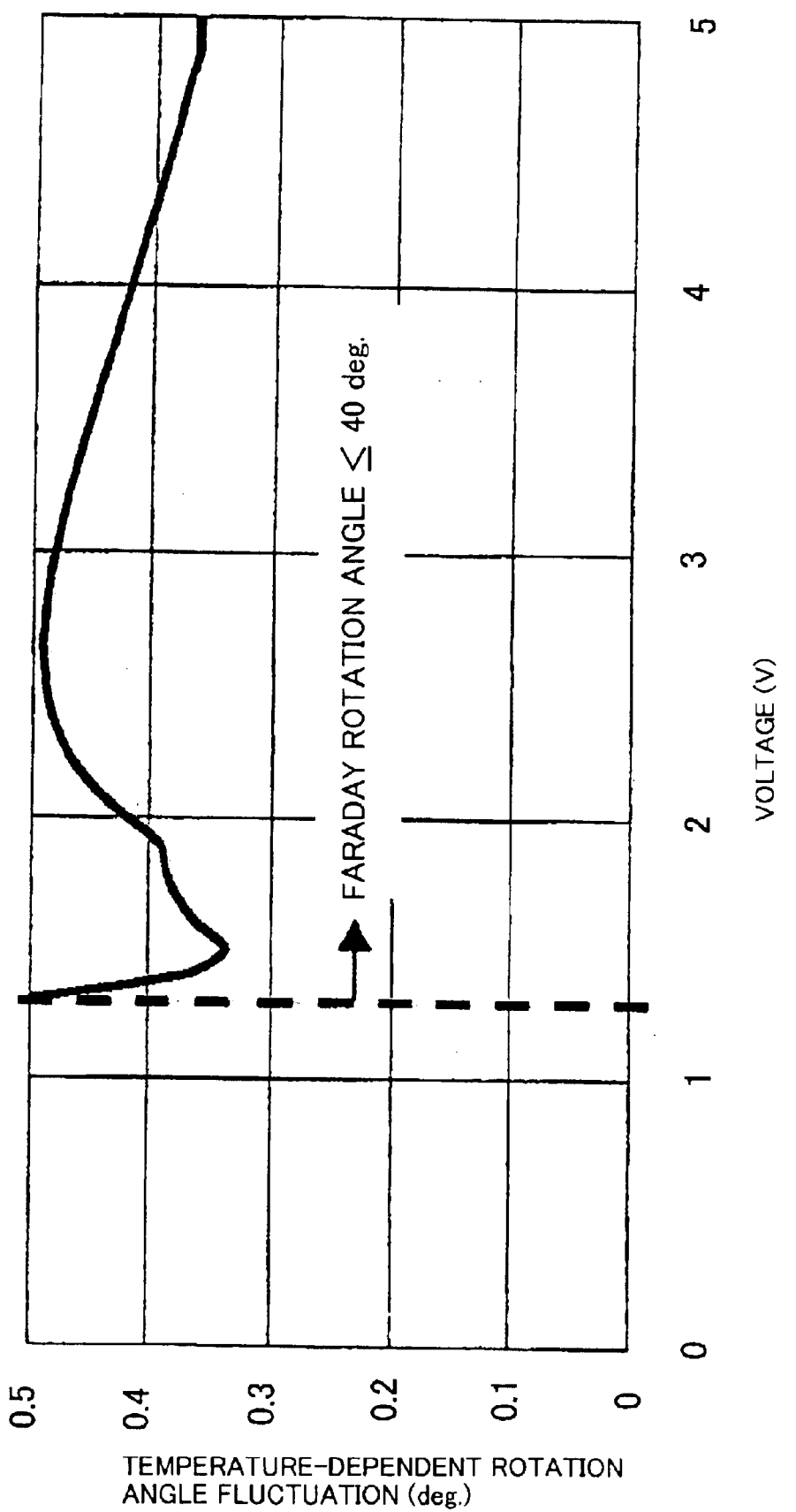
FIG. 11 is a graph showing temperature-dependent fluctuation of the Faraday rotation angle of the Faraday rotator.

FIG. 11 illustrates a temperature-dependent fluctuation of the Faraday rotation angle of the Faraday rotator 10, wherein a maximum fluctuation value among those measured within the temperature range of 0° C. to 65° C. is plotted and the illustrated data was obtained using the Faraday rotator to which the driving circuit 120 was applied. The vertical axis indicates temperature-dependent Faraday rotation angle fluctuation (deg.) and the horizontal axis indicates voltage (V).

Figure 34:
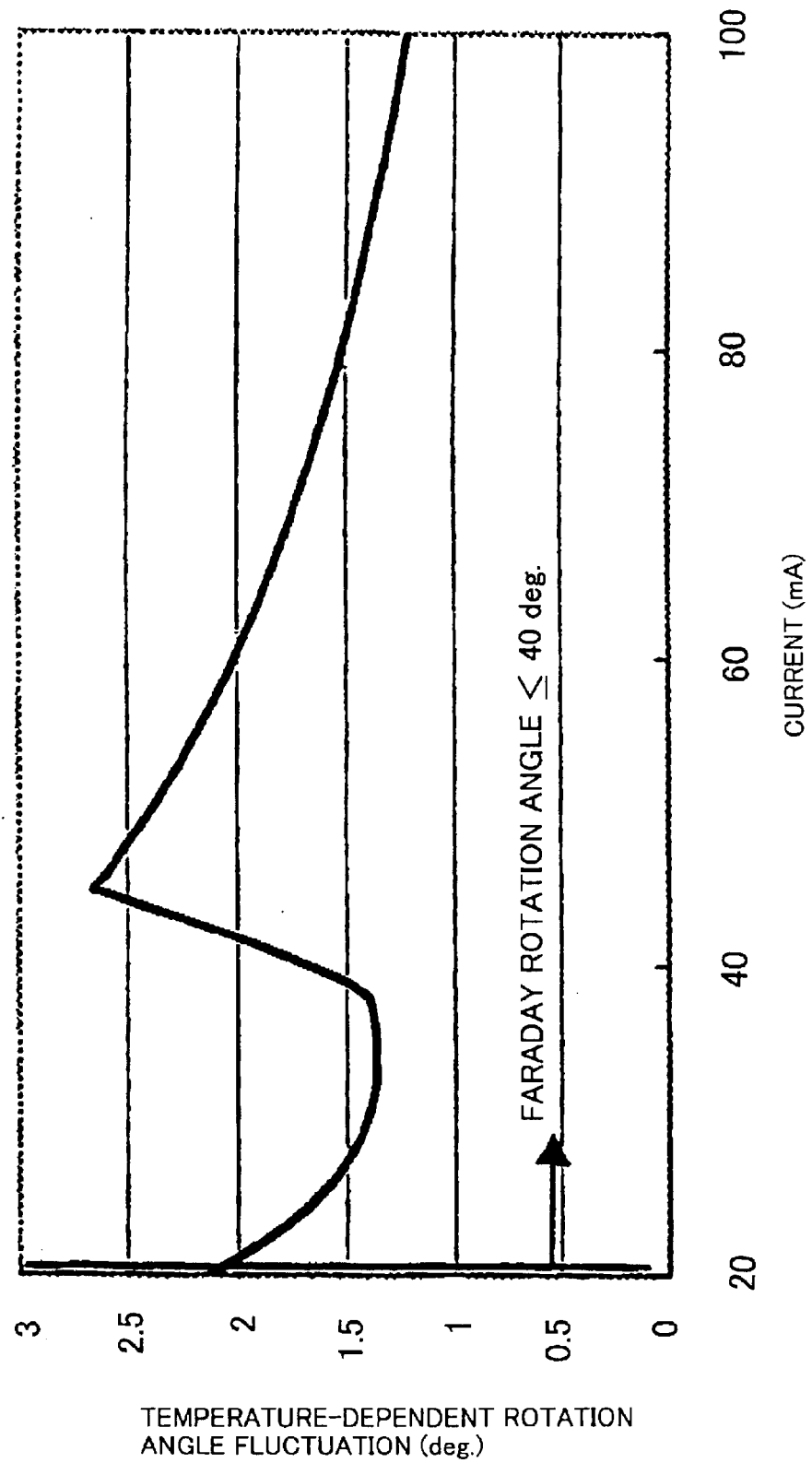
FIG. 34 is a graph showing temperature-dependent fluctuation of the Faraday rotation angle of the conventional Faraday rotator.

As shown in FIG. 11, for a Faraday rotation angle of 40 degrees or less within the temperature range of 0° C. to 65° C., the maximum fluctuation value is 0.5 degrees or less. Compared with the conventional Faraday rotator, the temperature-dependent Faraday rotation angle fluctuation value is greatly improved (the conventional Faraday rotator described above with reference to FIG. 34 has a temperature-dependent fluctuation of 1.5 degrees).

Figure 12:
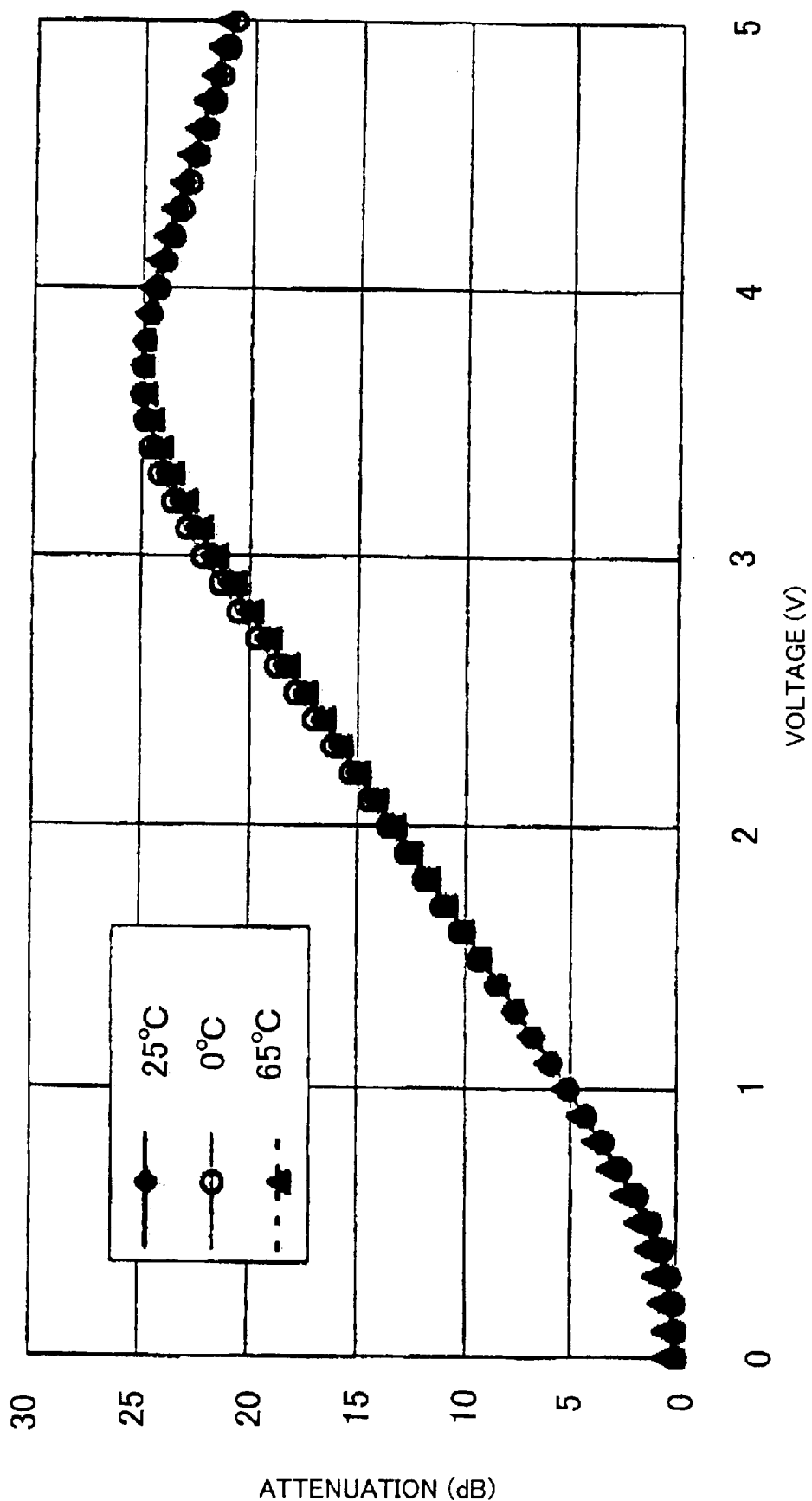
FIG. 12 is a graph showing temperature characteristics of the variable optical attenuator to which the Faraday rotator is applied.

FIG. 12 illustrates temperature characteristics of the variable optical attenuator 2 to which the Faraday rotator 10 was applied. Specifically, the temperature characteristics were measured with the driving circuit 120 applied to the Faraday rotator 10 of the variable optical attenuator 2. The vertical axis indicates amount of attenuation (dB) of the variable optical attenuator 2, and the horizontal axis indicates voltage (V) applied to energize the electromagnet 12 of the Faraday rotator 10. The temperature characteristics were measured at 25° C., 0° C. and 65° C. As shown in FIG. 12, where the attenuation is represented in divisions of 5 dB, the attenuation shows almost no temperature characteristic.

Figure 13:
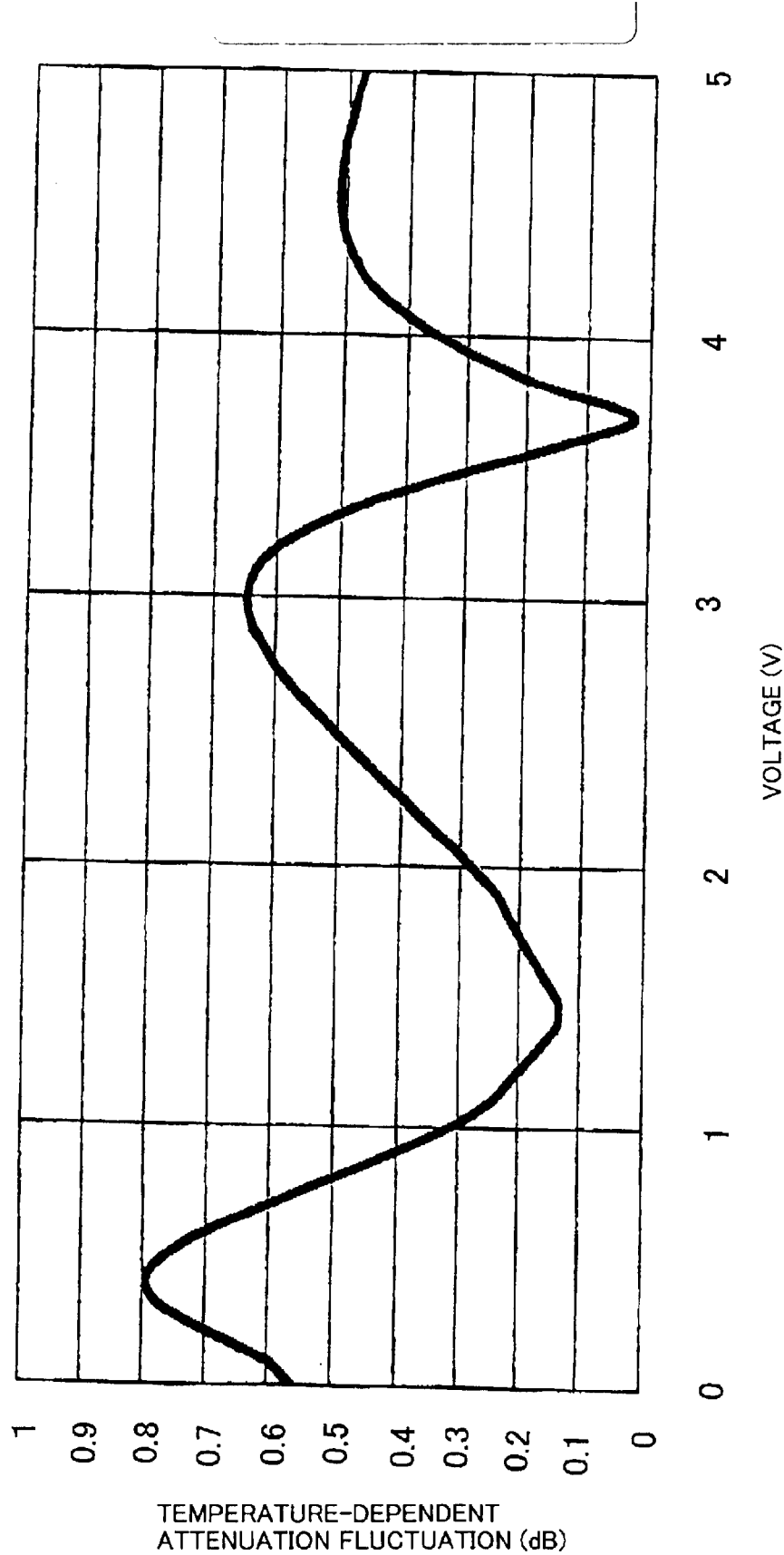
FIG. 13 is a graph showing temperature-dependent fluctuation of the variable optical attenuator to which the Faraday rotator is applied.

FIG. 13 illustrates temperature-dependent fluctuation of the variable optical attenuator 2 to which the Faraday rotator 10 was applied. In FIG. 13, a maximum fluctuation value among those measured in the temperature range of 0° C. to 65° C. is plotted, and the illustrated data was obtained using the variable optical attenuator to which the driving circuit 120 was applied. The vertical axis indicates temperature-dependent attenuation fluctuation (dB) of the variable optical attenuator 2, and the horizontal axis indicates voltage (V).

As shown in FIG. 13, the maximum fluctuation value within the temperature range from 0° C. to 65° C. is 0.8 dB or less. Compared with the variable optical attenuator to which the conventional Faraday rotator is applied, the maximum fluctuation value is significantly improved (the conventional variable optical attenuator described above with reference to FIG. 35 has a temperature-dependent fluctuation of 3 dB).

Figure 14:
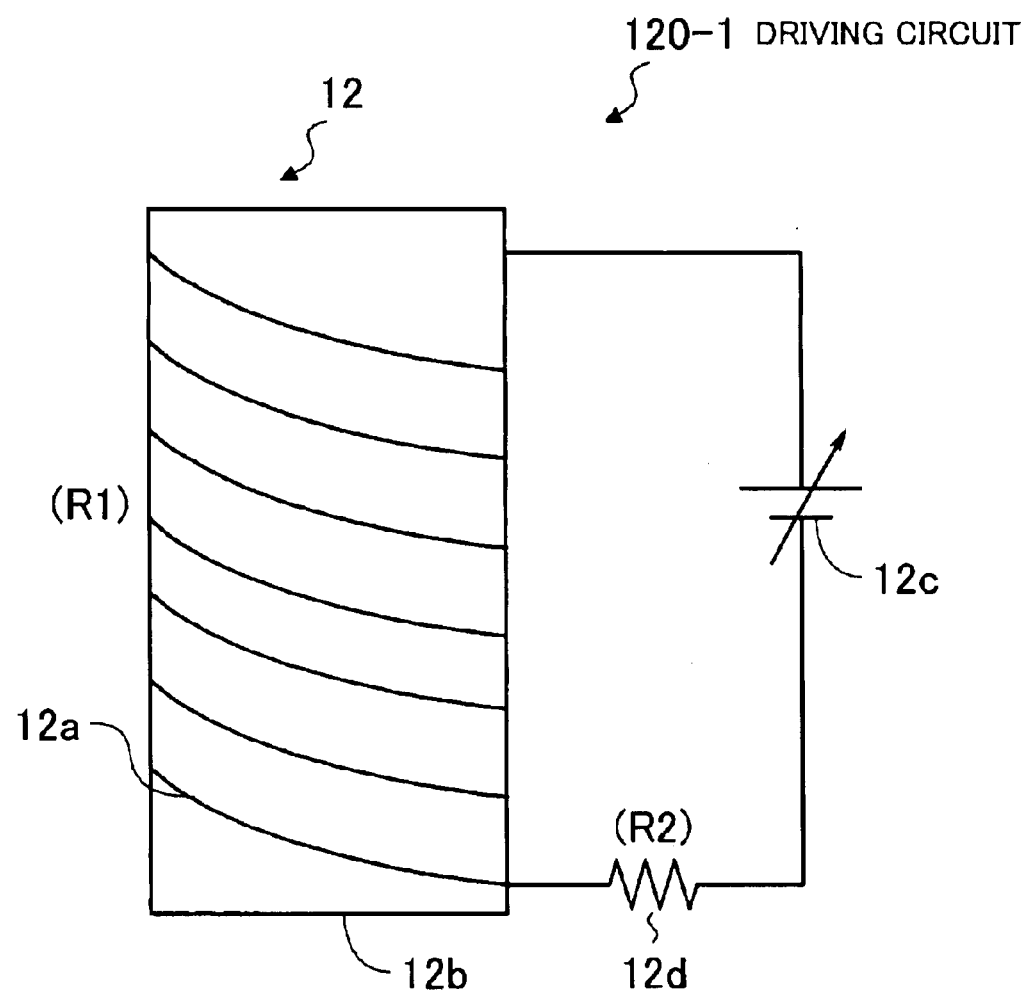
FIG. 14 is a diagram illustrating a driving circuit for a Faraday rotator applicable to the variable optical attenuator.

A first modification of the driving circuit 120 will be now described. FIG. 14 illustrates a driving circuit for the Faraday rotator 10 applicable to the variable optical attenuator 2.

The driving circuit 120-1, which is the first modification, comprises a coil 12a, a magnetic core 12b, a variable voltage source 12c (of which the output voltage has no temperature characteristic), and a series resistor 12d connected in series with an output terminal of the voltage source 12c.

In the case where the driving circuit is applied to the Faraday element 11 whose Faraday rotation angle has a relatively small temperature coefficient of −0.0025 (degrees/° C.) per degree of Faraday rotation angle, for example, and the driving circuit is designed such that the coil 12a has an electric resistance of about 50 Ω and that the electric resistance has a temperature coefficient of about +0.2 Ω/° C., a resistor of Nichrome is series-connected as the series resistor 12d to obtain a total resistance of 70 Ω.

The temperature coefficient of a Nichrome resistor is approximately 1/50 of that of copper. Thus, by connecting a Nichrome resistor in series, it is possible to reduce the temperature coefficient of the total resistance and thereby to make the temperature coefficient of the Faraday rotation angle of the Faraday element 11 matched with that of the driving circuit 120-1. In the case where the Faraday rotation angle of the Faraday element 11 has a large temperature coefficient, a resistor with a larger temperature coefficient than copper may be used as the series resistor.

Figure 15:
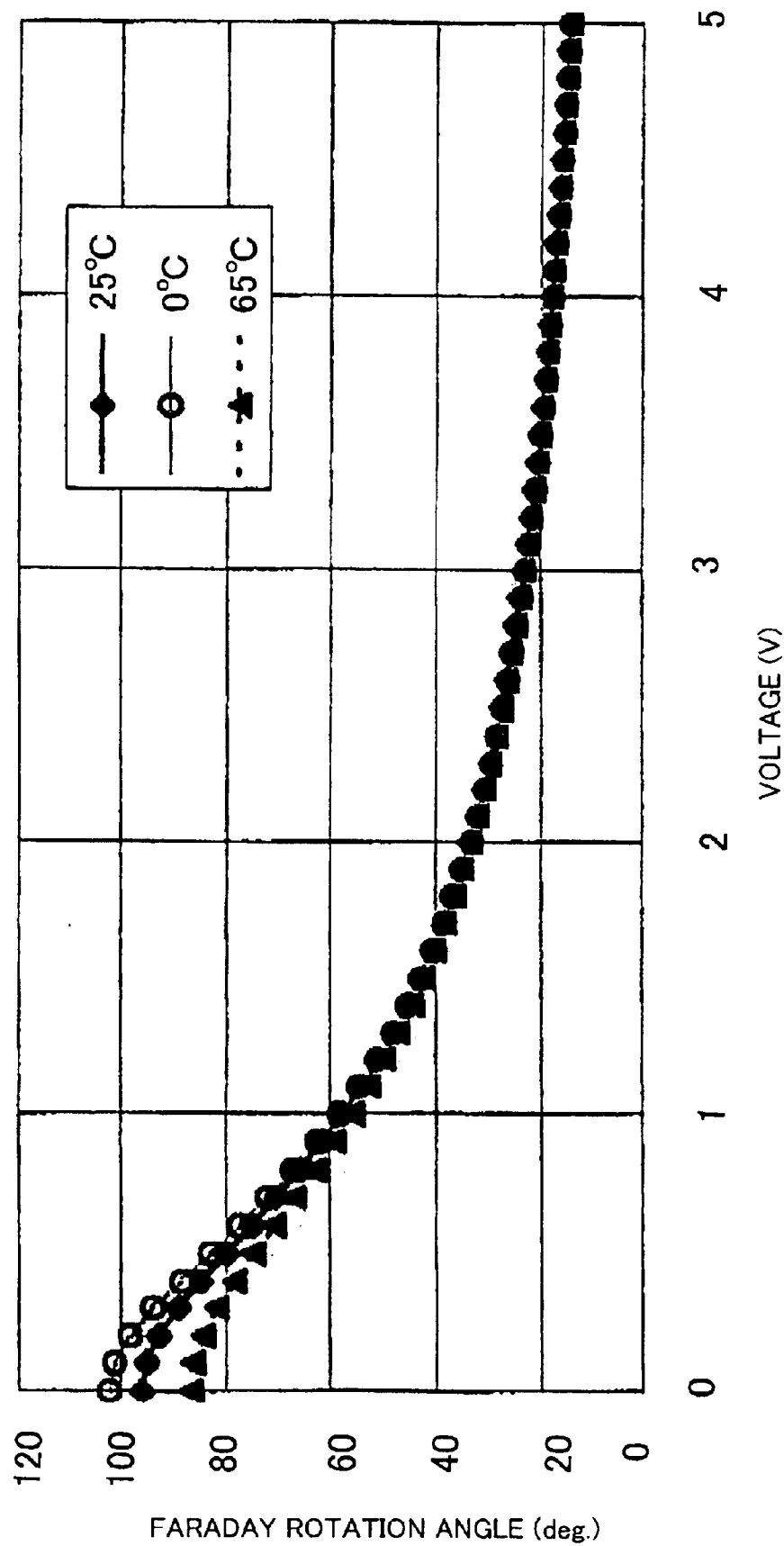
FIG. 15 is a graph showing temperature-dependent Faraday rotation angle characteristics of the Faraday rotator.

Various characteristics which are indicative of the effect of using the driving circuit 120-1 will be now described with reference to FIGS. 15 to 18. FIG. 15 illustrates temperature-dependent Faraday rotation angle characteristics of the Faraday rotator 10, that is, the temperature dependency observed in the case where the driving circuit 120-1 was applied. The vertical axis indicates Faraday rotation angle (deg.), the horizontal axis indicates voltage (V), and the characteristics measured at 25° C., 0° C. and 65° C. are plotted. As shown in FIG. 15, when the Faraday rotation angle is 40 degrees or below, the Faraday rotation angle shows almost no temperature characteristic.

Figure 16:
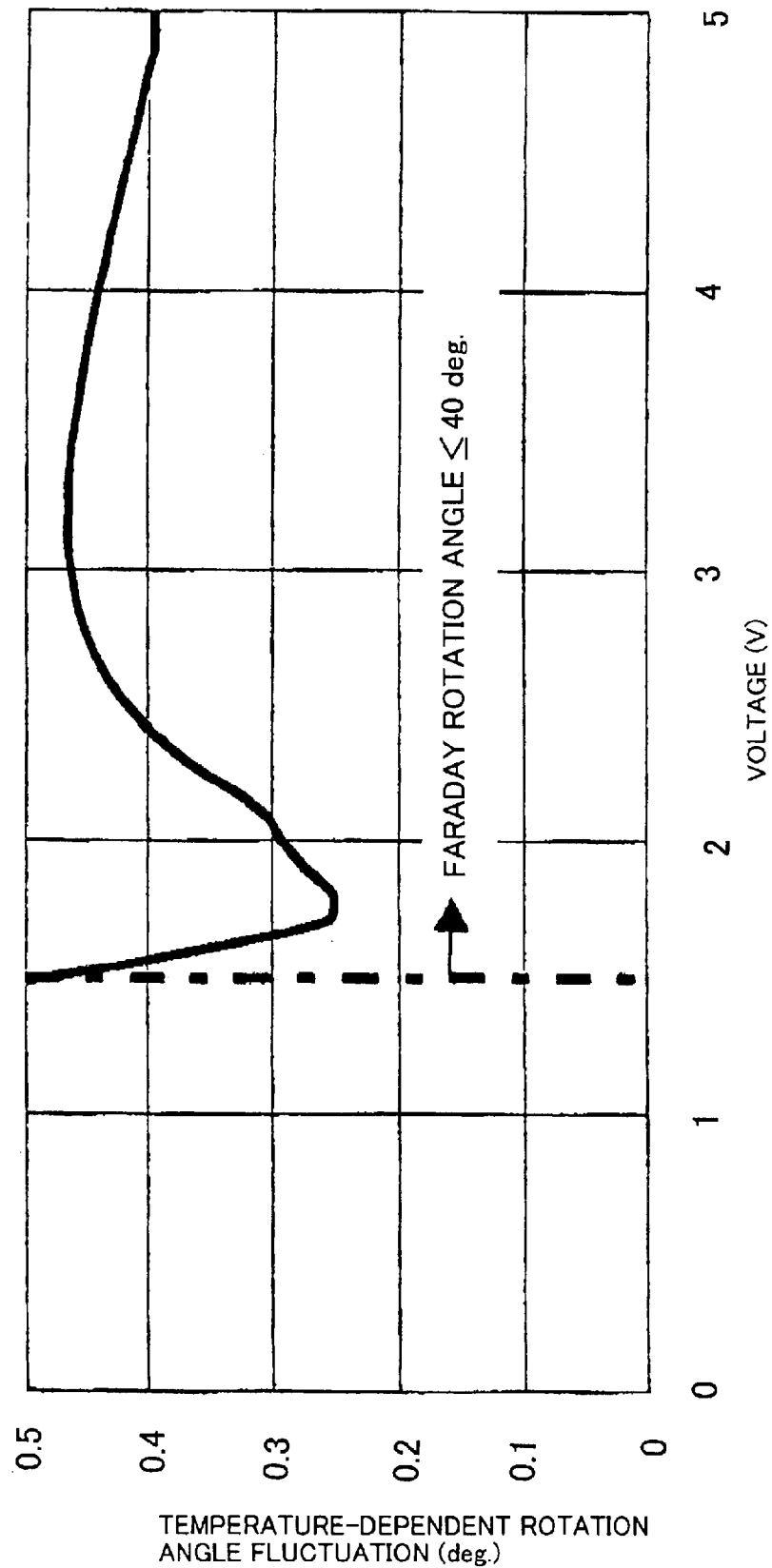
FIG. 16 is a graph showing temperature-dependent fluctuation of the Faraday rotation angle of the Faraday rotator.

FIG. 16 illustrates temperature-dependent Faraday rotation angle fluctuation of the Faraday rotator 10, wherein a maximum fluctuation value among those measured within the temperature range of 0° C. to 65° C. is plotted and the illustrated data was obtained using the Faraday rotator to which the driving circuit 120-1 was applied. The vertical axis indicates temperature-dependent Faraday rotation angle fluctuation (deg.) and the horizontal axis indicates voltage (V).

As shown in FIG. 16, for a Faraday rotation angle of 40 degrees or less within the temperature range of 0° C. to 65° C., the maximum fluctuation value is 0.5 degrees or less. Compared with the conventional Faraday rotator, the temperature-dependent Faraday rotation angle fluctuation value is greatly improved.

Figure 17:
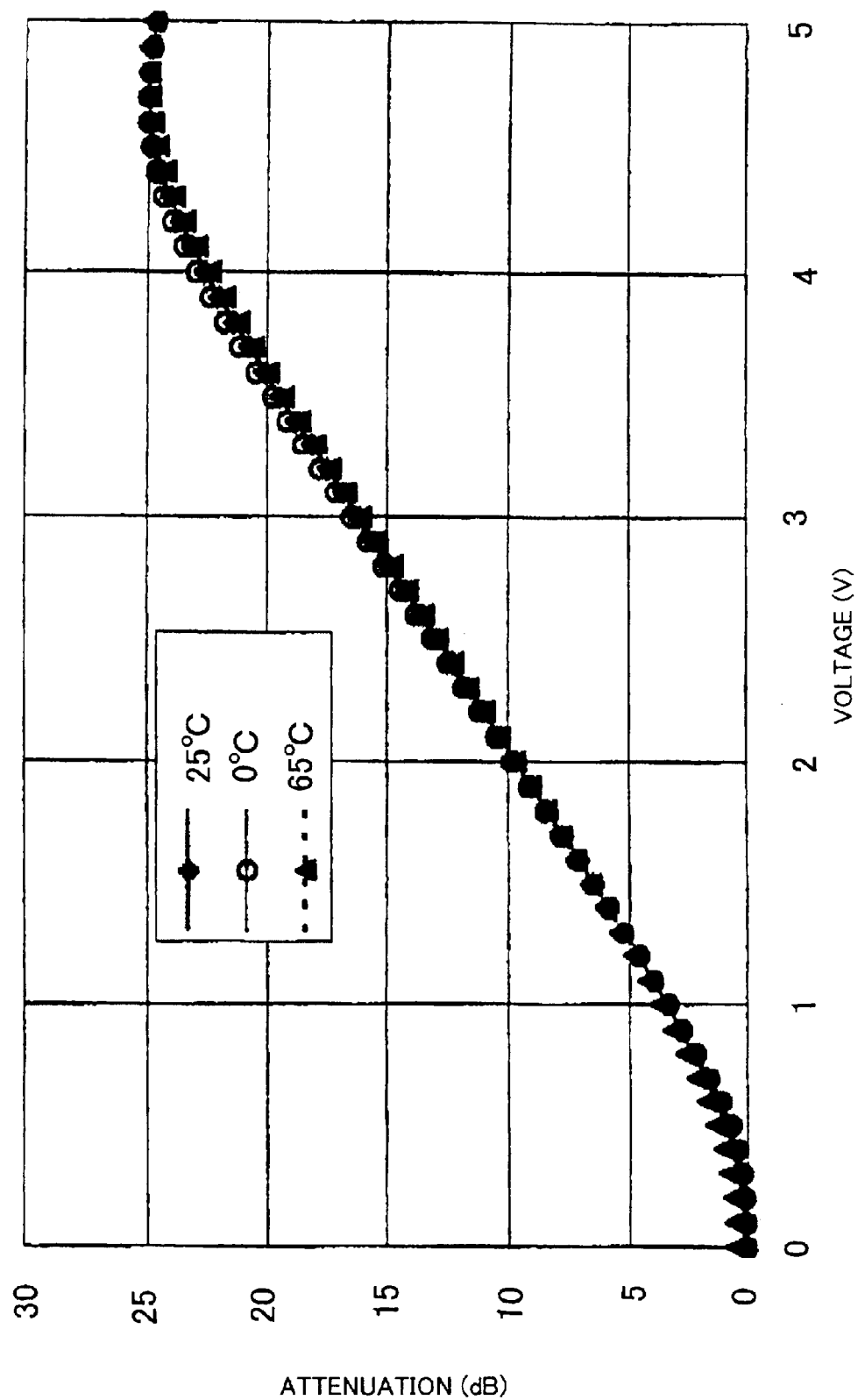
FIG. 17 is a graph showing temperature characteristics of the variable optical attenuator to which the Faraday rotator is applied.

FIG. 17 illustrates temperature characteristics of the variable optical attenuator 2 to which the Faraday rotator 10 was applied. Specifically, the temperature characteristics were measured with the driving circuit 120-1 applied to the Faraday rotator 10 of the variable optical attenuator 2. The vertical axis indicates amount of attenuation (dB) of the variable optical attenuator 2, and the horizontal axis indicates voltage (V) of the voltage source 12c for energizing the electromagnet 12 of the Faraday rotator 10. The characteristics were measured at 25° C., 0° C. and 65° C. As shown in FIG. 17, where the attenuation is represented in divisions of 5 dB, the attenuation shows almost no temperature characteristic.

Figure 18:
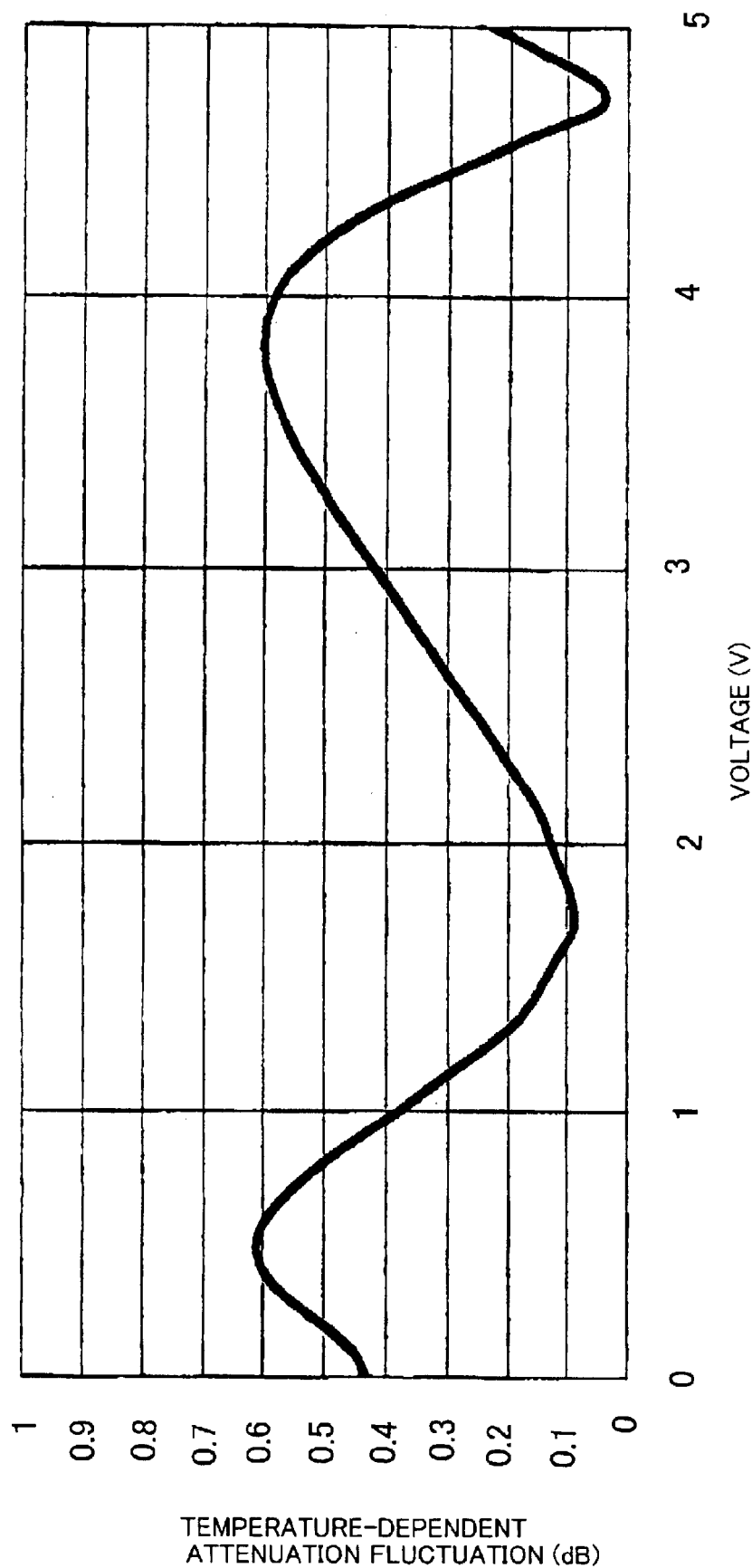
FIG. 18 is a graph showing temperature-dependent fluctuation of the variable optical attenuator to which the Faraday rotator is applied.

FIG. 18 illustrates temperature-dependent fluctuation of the variable optical attenuator 2 to which the Faraday rotator 10 was applied. In the figure, a maximum fluctuation value among those measured in the temperature range of 0° C. to 65° C. is plotted, and the illustrated data was obtained using the variable optical attenuator to which the driving circuit 120-1 was applied. The vertical axis indicates temperature-dependent attenuation fluctuation (dB) of the variable optical attenuator 2, and the horizontal axis indicates voltage (V).

As shown in FIG. 18, the maximum fluctuation value within the temperature range from 0° C. to 65° C. is 0.6 dB or less. Compared with the variable optical attenuator to which the conventional Faraday rotator is applied, the maximum fluctuation value is significantly improved.

Figure 19:
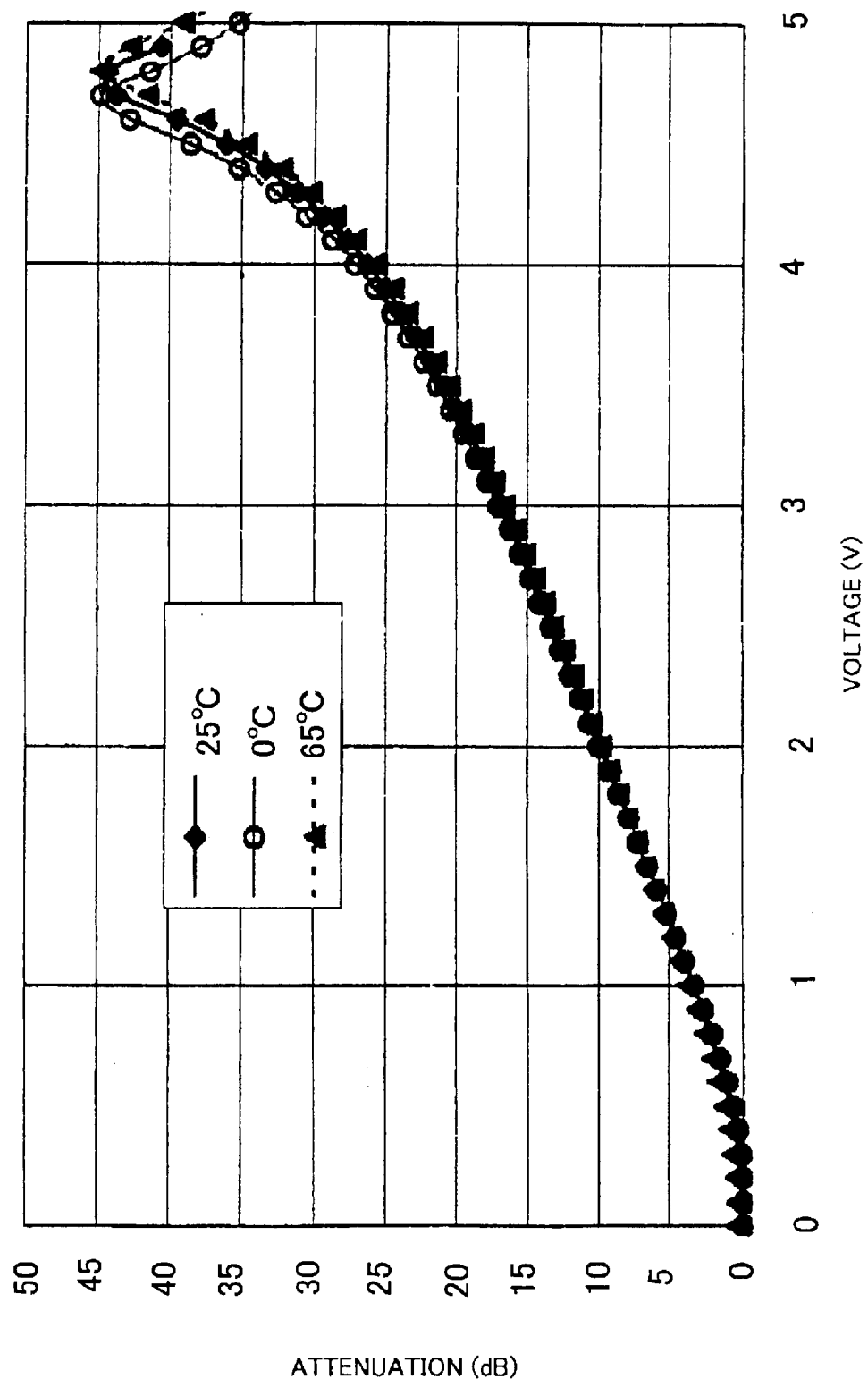
FIG. 19 is a graph showing temperature characteristics of an optical shutter to which the Faraday rotator is applied.

Characteristic of an optical shutter according to the present invention will be now described. FIG. 19 illustrates temperature characteristics of an optical shutter to which the Faraday rotator 10 was applied, wherein the driving circuit for the electromagnet 12 of the Faraday rotator 10 of the optical shutter had a basic arrangement shown in FIG. 9 and the voltage output therefrom was switched between a voltage at which the attenuation became minimum and a voltage at which the attenuation became maximum. The vertical axis indicates amount of attenuation (dB) of the optical shutter, and the horizontal axis indicates voltage (V) of the voltage source 12c of the driving circuit for the electromagnet 12 of the Faraday rotator 10.

Comparison between the characteristics shown in FIG. 19 and those of the conventional optical shutter shown in FIG. 36 clearly shows that the temperature characteristics are significantly improved. If the voltage at which the attenuation is at a minimum is set to 0 volts while the voltage at which the attenuation is at a maximum is set to 4.7 volts and the output voltage is switched between the set voltages, then an optical shutter is obtained which is capable of stably achieving a shut-down attenuation of about 40 dB over the temperature range from 0° C. to 65° C.

Accordingly, unlike the conventional optical shutter, it is unnecessary to carry out control such that the amount of attenuation for the shut-down remains constant, by varying the current value for the shut-down in accordance with information on the detected attenuation or the detected temperature, whereby the cost of the optical shutter can be cut down.

It was confirmed that the driving circuit serves to substantially improve the temperature-dependent Faraday rotation angle characteristic, the temperature characteristic of the variable optical attenuator 2 and the temperature characteristic of the optical shutter, regardless of whether the driving circuit used has the arrangement shown in FIG. 9 or the arrangement shown in FIG. 14. Where the two arrangements are compared with each other, the driving circuit 120 shown in FIG. 9 can be regarded as a special case of the driving circuit 120-1 of FIG. 14 in which the series resistor 12d has a resistance value of "0."

Specifically, in the case where electric current is supplied to the coil 12a from the voltage source 12c having the series resistor 12d, "0" is an allowable value as the resistance of the series resistor 12d. Mathematically, infinity is also an allowable value as the resistance of the series resistor 12d. However, in practical-level application wherein current is passed through the coil 12a to cause Faraday rotation, infinity is not an allowable value because, with such an infinite resistance value of the series resistor 12d, current cannot be made to flow through the coil 12a.

Also, in the arrangement of the driving circuit 120-1, it is assumed that the series resistor 12d is a fixed resistor, but it may alternatively be a variable resistor. Where a variable resistor is used for the resistor 12d connected in series with the voltage source 12c, the series resistor 12d permits variable adjustment of its resistance value when the temperature-dependent Faraday rotation angle characteristic of the Faraday rotator 10 cannot be accurately compensated for at the stage of design by the resistance values of the coil 12a and series resistor 12d and the temperature coefficients thereof, thus providing an advantage that the temperature-dependent Faraday rotation angle characteristic can be compensated for with accuracy.

Figure 20:
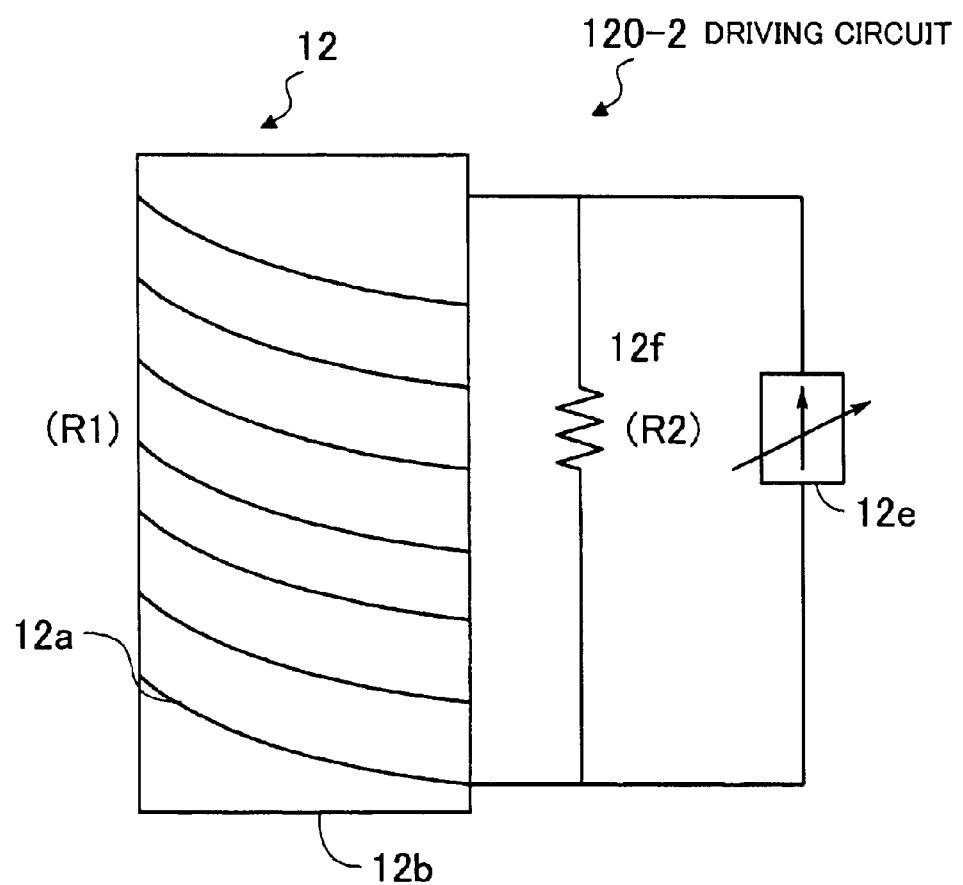
FIG. 20 is a diagram illustrating a driving circuit for an electromagnet of a Faraday rotator applicable to the variable optical attenuator.

A second modification of the driving circuit 120 will be now described. FIG. 20 illustrates a driving circuit for the Faraday rotator 10 applicable to the variable optical attenuator 2. The driving circuit 120-2, which is the second modification, comprises a coil 12a, a magnetic core 12b, a current source 12e (of which the output current has no temperature coefficient), and a parallel resistor 12f connected to output terminals of the current source 12e in parallel therewith.

The current source 12e whose output current has no temperature coefficient may be implemented by a means in which the temperature characteristic of a transistor constituting the current source is compensated for by an element having a temperature characteristic, such as a diode or thermistor.

With regard to the driving circuits 120-1 and 120-2, the temperature coefficient of the coil current and the consumption of electric power will be now analytically explained in detail. The temperature coefficient of the magneto-optical crystal 11 per degree of Faraday rotation angle is, typically, −0.0025 degrees/° C. or thereabout. Magneto-optical crystals on the market were examined as to the temperature coefficient and it was found that the temperature coefficient varied in the range of approximately from −0.0012 degrees/° C. to −0.0030 degrees/° C.

In the case where a magneto-optical crystal having a temperature coefficient of about −0.0015 degrees/° C. is used, the current flowing through the coil 12a has a temperature coefficient of about −0.07 mA/° C. The resistance value of the coil 12a is 48 Ω at 25° C. and has a temperature coefficient of 0.18 Ω/° C.

An optimum configuration under these conditions is such that the parallel resistor 12f in the arrangement shown in FIG. 20 is constituted by a thin-film resistor of tantalum having a resistance of 77 Ω and a temperature coefficient of 0.03 Ω/° C., and that electric current is supplied to the coil 12a from the current source 12e whose output current has no temperature characteristic.

The "optimum configuration" is so judged on condition that the temperature coefficient of the Faraday rotation angle can be satisfactorily suppressed and that the electric power consumed by the coil 12a and the externally connected resistor is small.

In the driving circuit 120-1 configured as shown in FIG. 14 in which current is supplied by the voltage source having a series resistor, provided the resistance value of the coil 12a is R1, the resistance value of the series resistor 12d is R2, the output voltage of the voltage source 12c is V and the current flowing through the coil 12a is IC, then IC is obtained as $$IC=V/(R1+R2) \qquad (2)$$

Assuming a probable case where the resistance values R1 and R2 each have a temperature characteristic while the output voltage V has no temperature characteristic, the temperature coefficient (dIC/dT) of the current IC is obtained as $$dIC/dT=-V(dR1/dT+dR2/dT)/(R1+R2)^2 \qquad (3)$$

Let us now consider a more practical case, that is, the case where the temperature coefficient of the resistance value R2 is significantly smaller than the temperature coefficient of the resistance value R1, then $$dIC/dT = -V(dR1/dT)/(R1+R2)^2 \qquad (4)$$
$$= -(IC/(R1+R2))\times(dR1/dT)$$

In the driving circuit 120-1 configured as shown in FIG. 14, provided the consumption of electric power is W, then $$W=IC^2 \times (R1+R2) \qquad (5)$$

On the other hand, in the driving circuit 120-2 configured as shown in FIG. 20 in which electric current is supplied by the current source 12e whose output current has no temperature coefficient, provided the resistance value of the coil 12a is R1, the resistance value of the parallel resistor 12f is R2, the output current of the current source 12e is I and the current flowing through the coil 12a is IC, then IC is obtained as $$IC=I\cdot R2/(R1+R2) \qquad (6)$$

Assuming a probable case where the resistance values R1 and R2 each have a temperature characteristic while the output current I has no temperature characteristic, the temperature coefficient of the current IC is obtained as $$dIC/dT = (I/(R1+R2)^2)\times[(dR2/dt)(R1+R2) - \qquad (7)$$
$$R2(dR1/dt+dR2/dt)]$$

Let us now consider a more practical case, that is, the case where the temperature coefficient of the resistance value R2 is significantly smaller than the temperature coefficient of the resistance value R1. Then, the same result as that derived with respect to the aforementioned case where current is supplied by the voltage source 12c having the series resistor 12d is obtained. Namely, the equation (4) is obtained.

In the driving circuit 120-2 configured as shown in FIG. 20, the power consumption W is given by $$W=IC^2 R1(R1+R2)/R2 \qquad (8)$$

FIG. 21 collectively shows the temperature coefficients of the coil currents and the power consumption values with respect to change in the series resistance 12d of the driving circuit 120-1 or in the parallel resistance 12f of the driving circuit 120-2. When the series resistor 12d and the parallel resistor 12f are referred to without distinction, the term "external resistor" is used.

As mentioned above, the temperature coefficient of the resistance value R2 of the external resistor is set significantly smaller than that of the resistance value R1 of the coil resistor. Accordingly, in both cases of the voltage excitation shown in FIG. 14 and the current excitation shown in FIG. 20, the absolute values of the temperature coefficients of the coil currents take the same value with respect to change in the resistance value R2 and, mathematically, become "0" when R2 is infinitely large. Thus, the absolute value of the temperature coefficient of the coil current is the same regardless of whether the coil is excited by voltage or current.

In the case of the voltage excitation by means of the driving circuit 120-1, if R2 is infinitely large, the current flowing to the coil is "0," and since no Faraday rotation is caused, the Faraday rotator is of no practical use. Accordingly, in cases where the resistance value R2 of the resistor 12d connected in series with the voltage source 12c needs to be increased, the output voltage V of the voltage source 12c must be increased, so that the power consumption increases and becomes infinitely large in an extreme situation where R2 is infinitely large.

Also, in the case of the current excitation by means of the driving circuit 120-2, if R2 is "0," no current flows to the coil, and since no Faraday rotation occurs, the Faraday rotator is of no practical use. Accordingly, in cases where the resistance value R2 of the resistor 12f connected in parallel with the current source 12e needs to be decreased, the output current I of the current source 12e must be increased, so that the power consumption becomes infinitely large in an extreme situation where R2 is "0."

Consequently, the circuitry should preferably be designed on condition that the temperature coefficient of the coil current can be set to the required value while the power consumption is small within the range in which the Faraday rotation occurs. Thus, where identical Faraday rotators are used in the arrangements of FIGS. 14 and 20 to compensate for temperature, there arises a slight difference of the temperature characteristic between the arrangements of FIGS. 14 and 20, because the parameter of power consumption is taken into account when designing the circuitry.

In the case of using Faraday rotators with different temperature coefficients in the arrangements of FIGS. 14 and 20 to compensate for temperature, the temperature coefficients originally required of the coil current differs from each other. Naturally, therefore, there is a difference of the temperature characteristic between the arrangements of FIGS. 14 and 20.

Data showing the temperature-dependent Faraday rotation angle characteristic of the Faraday rotator 10, to which was applied the driving circuit 120-2 with the arrangement shown in FIG. 20, the temperature coefficient of the attenuation of the variable optical attenuator 2, and the temperature coefficient of the attenuation of the optical shutter will be now described with reference to FIGS. 22 to 26.

Figure 22:
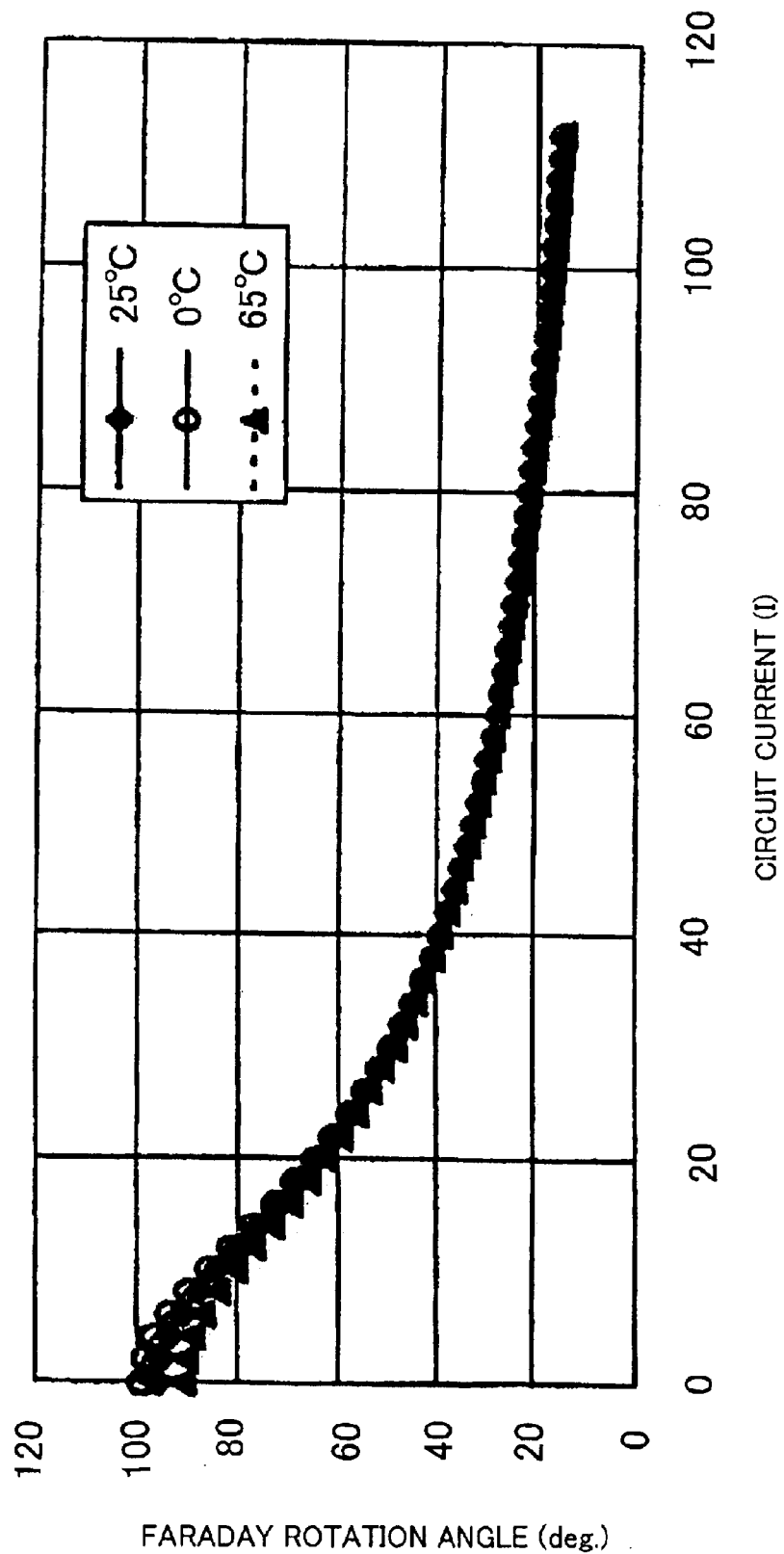
FIG. 22 is a graph showing temperature-dependent Faraday rotation angle characteristics of the Faraday rotator.
Figure 23:
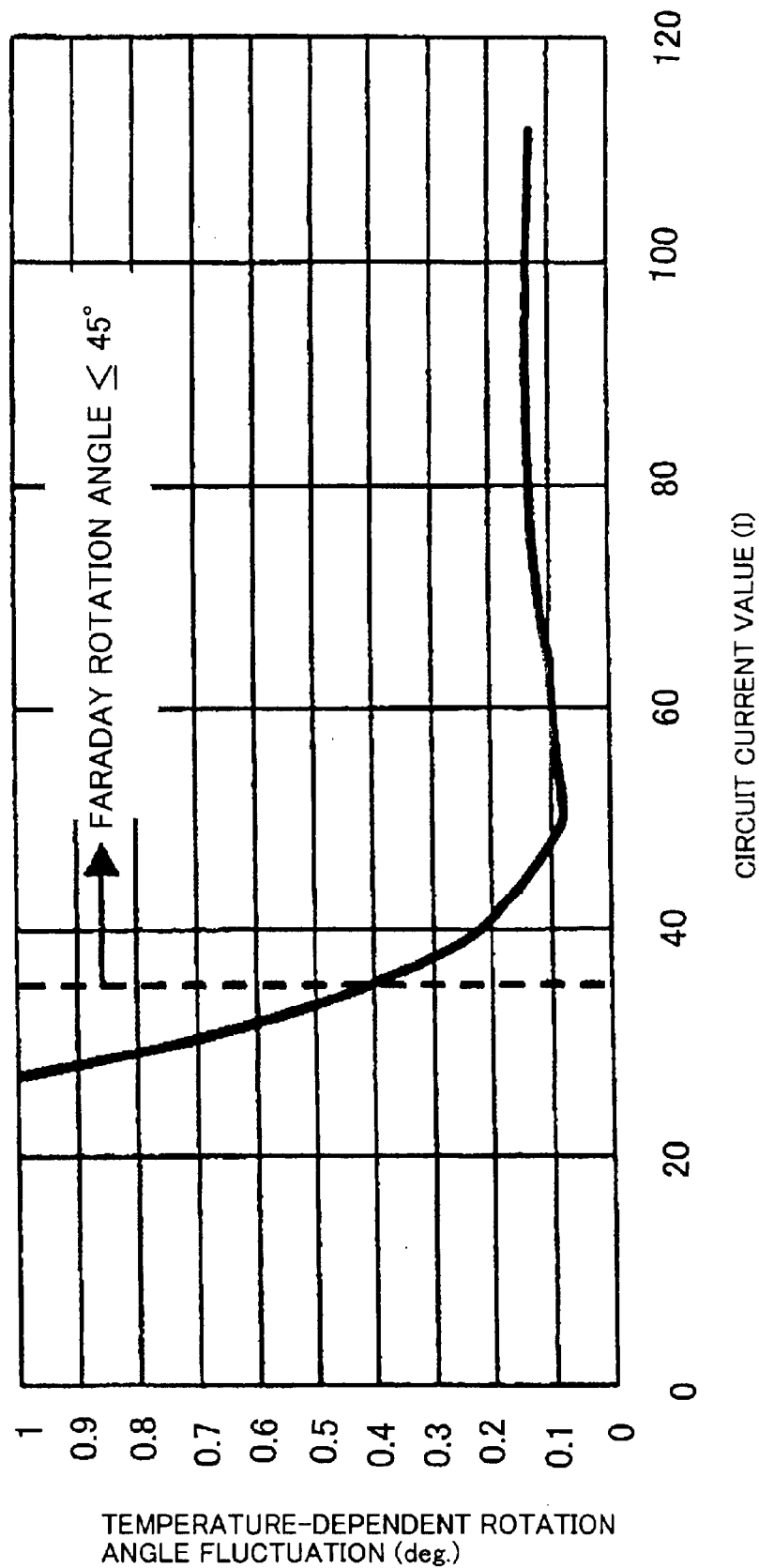
FIG. 23 is a graph showing temperature-dependent fluctuation of the Faraday rotation angle of the Faraday rotator.

FIG. 22 illustrates temperature-dependent Faraday rotation angle characteristics of the Faraday rotator 10, wherein the vertical axis indicates Faraday rotation angle (deg.) and the horizontal axis indicates current. FIG. 23 illustrates temperature-dependent fluctuation of the Faraday rotation angle of the Faraday rotator 10, wherein the vertical axis indicates temperature-dependent rotation angle fluctuation (deg.) and the horizontal axis indicates current.

It is apparent from FIG. 22 that the temperature characteristics are improved over the temperature range of 0° C. to 65° C., compared with the temperature characteristics of the conventional Faraday rotator. This is more evident from FIG. 23 showing temperature-dependent fluctuation values with respect to the current value.

Figure 24:
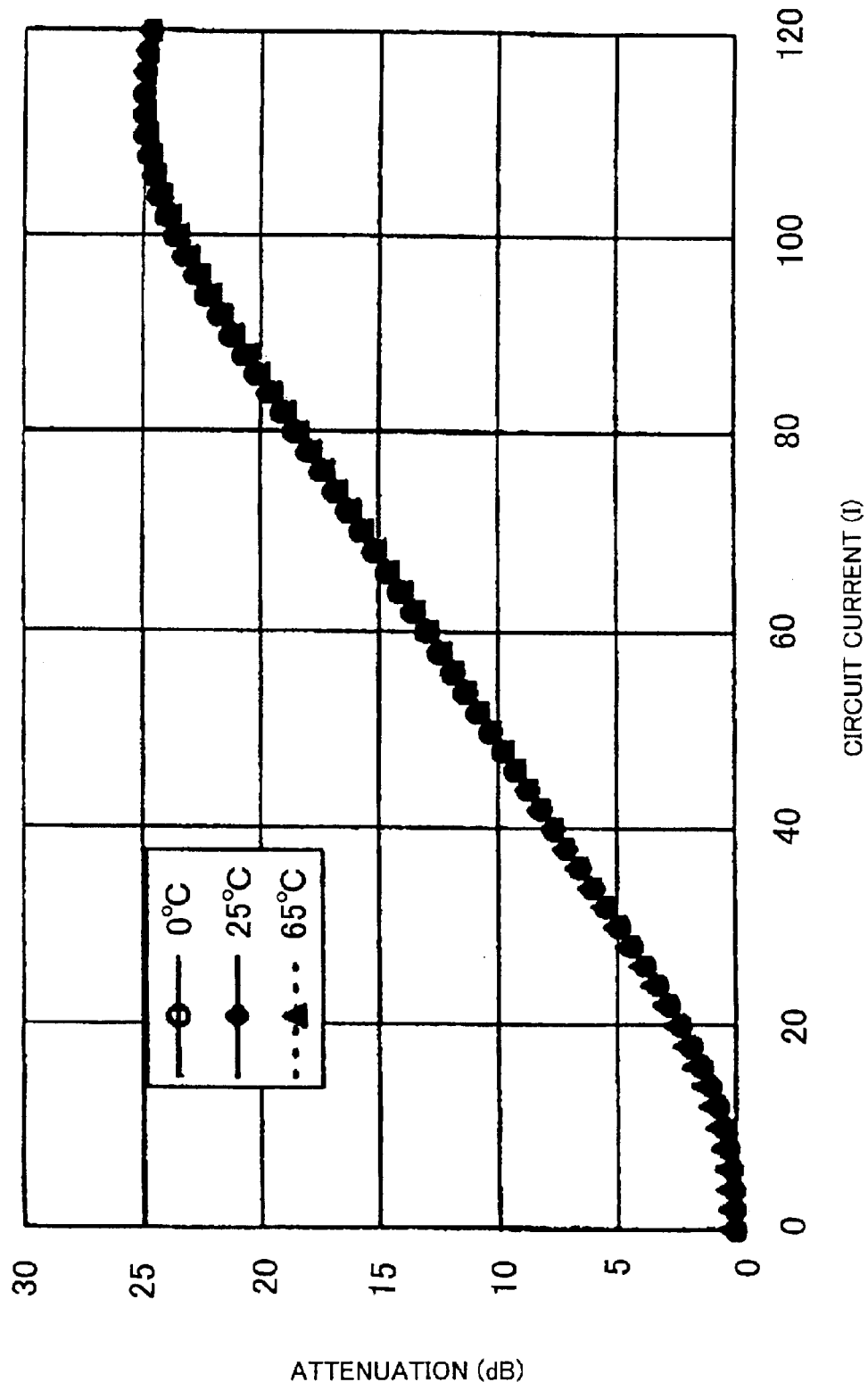
FIG. 24 is a graph showing temperature characteristics of the variable optical attenuator to which the Faraday rotator is applied.
Figure 25:
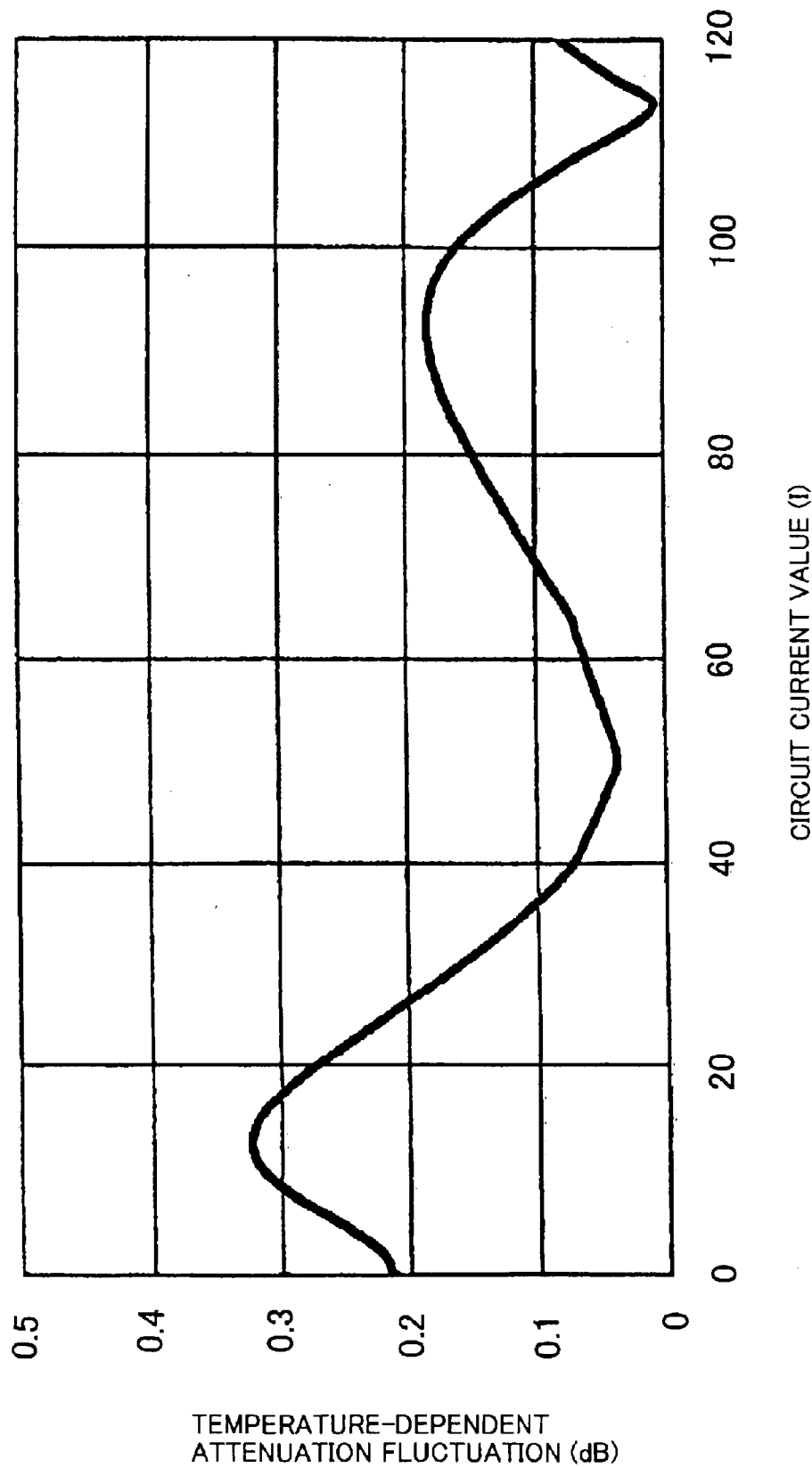
FIG. 25 is a graph showing temperature-dependent fluctuation of the variable optical attenuator to which the Faraday rotator is applied.
Figure 35:
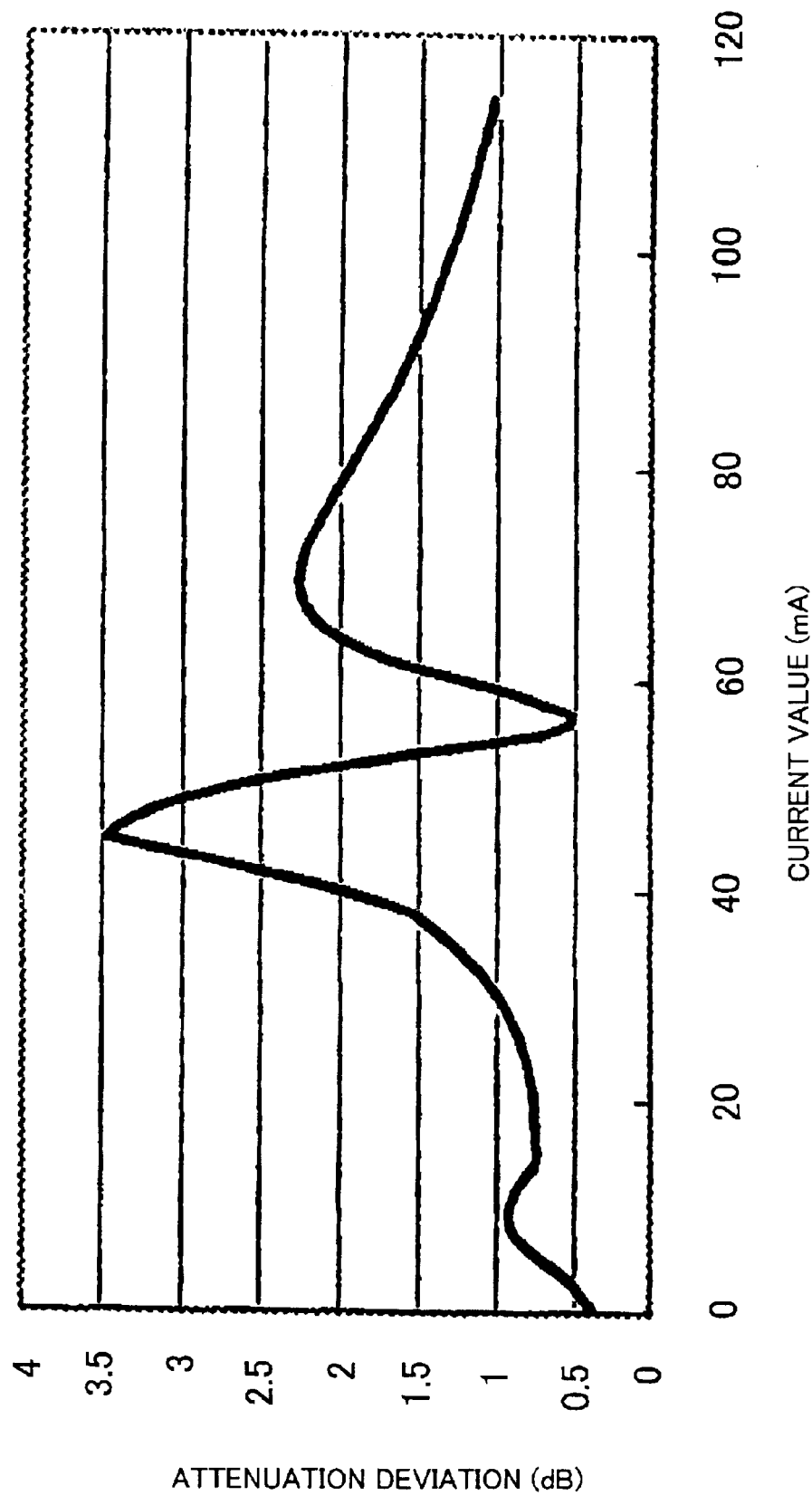
FIG. 35 is a graph showing temperature-dependent fluctuation of a variable optical attenuator to which the conventional Faraday rotator is applied.

FIG. 24 illustrates temperature characteristics of the variable optical attenuator 2 to which the Faraday rotator 10 was applied, wherein the vertical axis indicates amount of attenuation (dB) and the horizontal axis indicates current. FIG. 25 illustrates temperature-dependent fluctuation of the variable optical attenuator 2 to which the Faraday rotator 10 was applied, wherein the vertical axis indicates temperature-dependent attenuation fluctuation (dB) and the horizontal axis indicates current. FIG. 25 shows the results of temperature compensation of the coil current by means of the driving circuit 120-2. Comparison between FIG. 25 and FIG. 35 showing the results obtained using the conventional variable optical attenuator reveals that the variable optical attenuator 2 of the present invention is drastically improved in the temperature-dependent attenuation characteristic.

Figure 26:
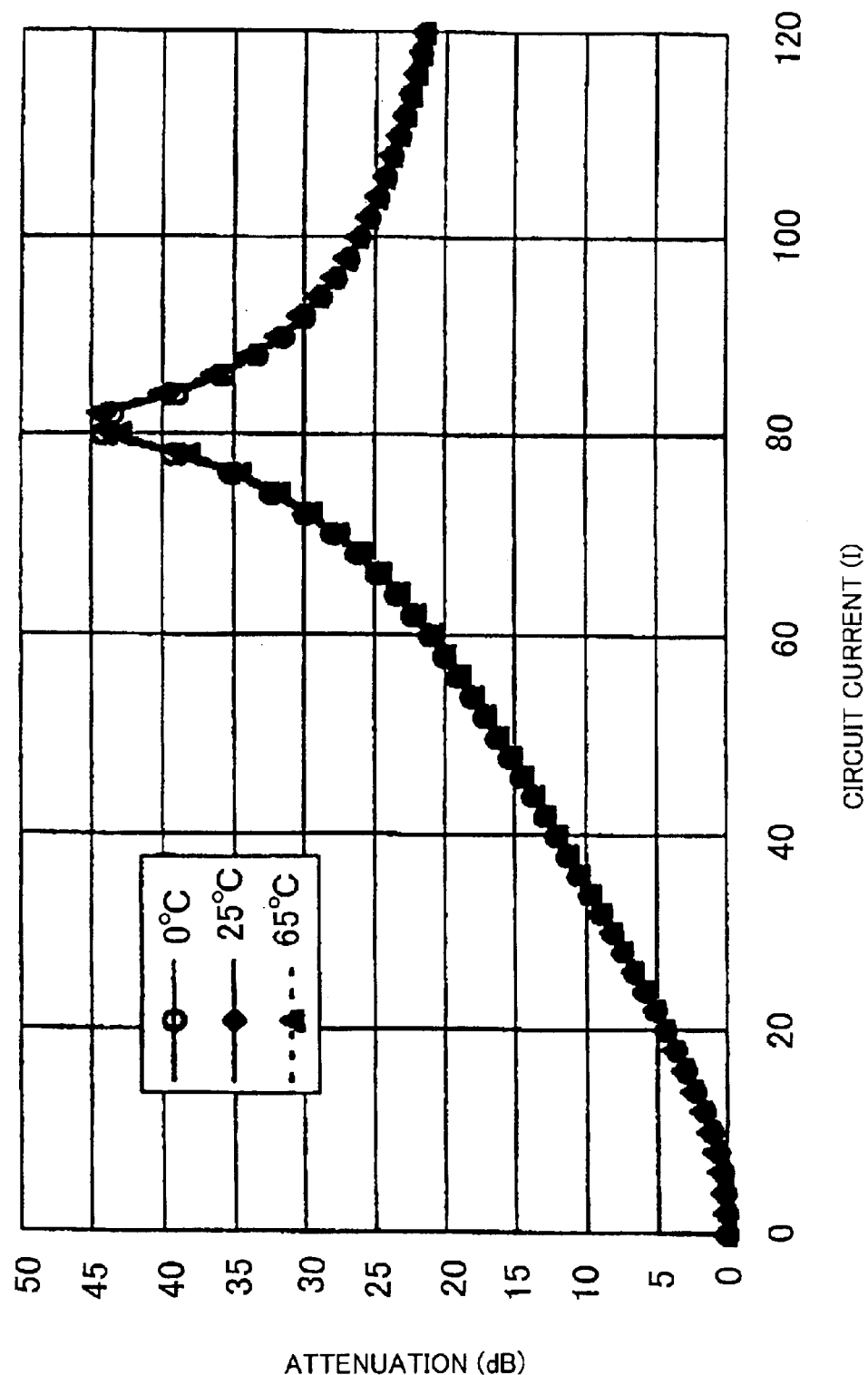
FIG. 26 is a graph showing temperature characteristics of an optical shutter to which the Faraday rotator is applied.

FIG. 26 illustrates temperature characteristics of the optical shutter to which the Faraday rotator 10 was applied, wherein the vertical axis indicates amount of attenuation (dB) and the horizontal axis indicates current. FIG. 26 shows the results of temperature compensation of the coil current with the use of the driving circuit 120-2. Comparison between FIGS. 26 and 36 reveals that the optical shutter of the present invention is drastically improved in the temperature-dependent attenuation characteristics.

As explained above, also with the arrangement in which electric current is supplied to the coil wound on the electromagnet 12 of the Faraday rotator 10 from the current source 12e having the parallel resistor 12f, it is possible to properly control the temperature coefficient of the coil current and to significantly improve the temperature characteristics of the Faraday rotator 10, variable optical attenuator 2 and optical shutter.

It is to be noted that the arrangement shown in FIG. 20 is only a generalized one. In the arrangement of FIG. 20, the resistance of the parallel resistor 12f can be infinitely large, and this is analogous with the case where, in the arrangement of FIG. 14, the resistance of the series resistor 12d can be "0."

Figure 27:
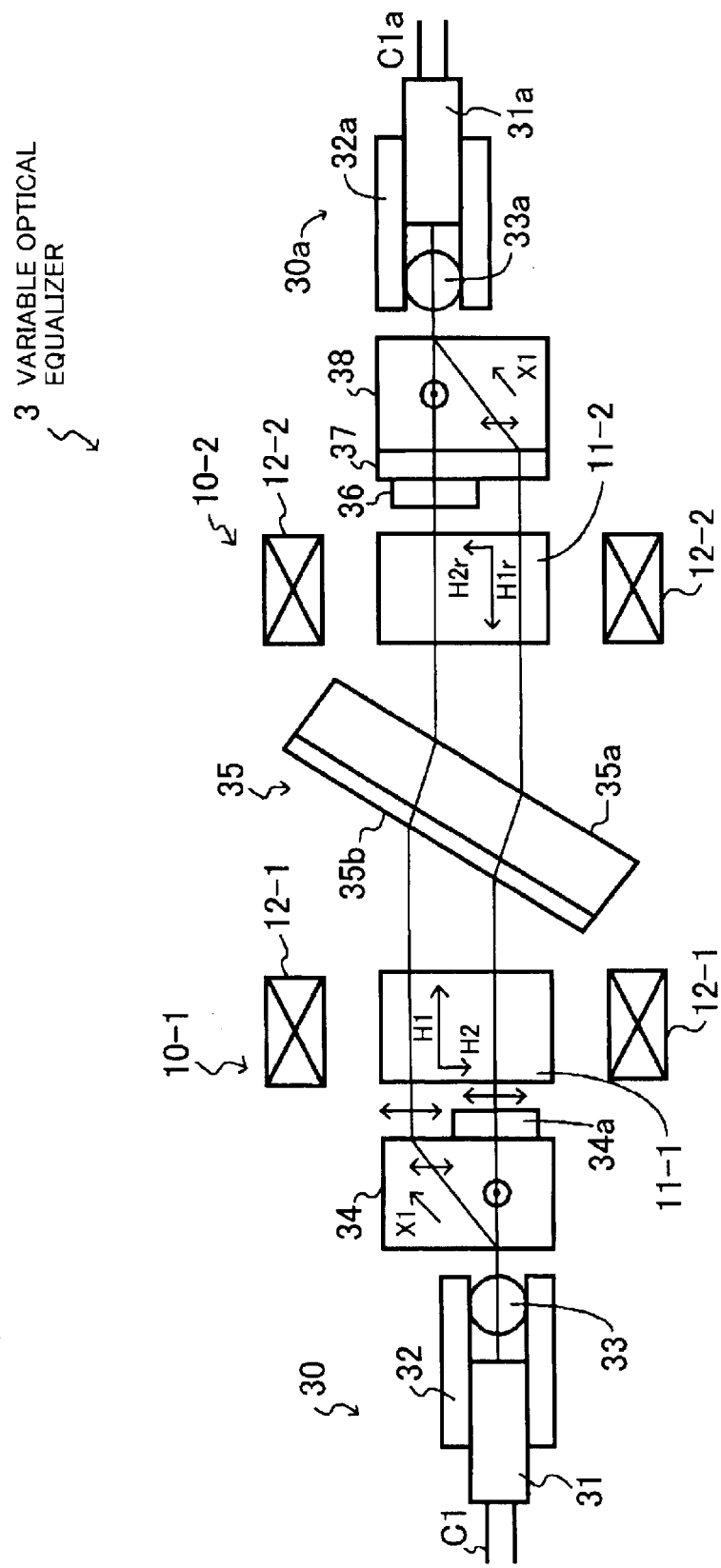
FIG. 27 is a diagram illustrating an arrangement of a variable optical equalizer.

A variable optical equalizer according to the present invention will be now described. FIG. 27 illustrates the arrangement of a variable optical equalizer. In the variable optical equalizer 3, an input optical fiber C1 is an optical fiber for receiving an input optical signal. A collimator system 30 includes a ferrule 31 to which the input optical fiber C1 is securely bonded, a collimating lens 33 for producing a parallel beam from the light emitted from the input optical fiber C1, and a lens holder 32 for firmly holding the collimating lens 33. Thus, the input optical signal is turned into a parallel beam by the collimator system.

A polarization separator element 34 separates polarized light of the input optical signal which is arbitrarily polarized, for example, linearly polarized, circularly polarized or elliptically polarized, when entering the element 34. A typical example of the polarization separator element 34 is a parallel rutile plate.

In the case where the polarization separator element 34 has a crystal axis X1 parallel with the paper surface and the input optical signal in an arbitrarily polarized state is incident on the polarization separator element 34, the arbitrarily polarized incident light is separated into ordinary light whose vibration direction is perpendicular to a plane containing the crystal axis X1 and extraordinary light whose vibration direction is parallel with the plane containing the crystal axis X1.

The ordinary light enters straight into the polarization separator element 34 without being refracted at the incidence plane, and also is emitted straight from the element 34 without being refracted at the emission plane parallel with the incidence plane. On the other hand, the extraordinary light is refracted at the incidence plane, then travels straight inside the polarization separator element 34, and is emitted in a direction parallel with the incident light after being again refracted at the emission plane parallel with the incidence plane. Accordingly, by making arbitrarily polarized light incident on the polarization separator element 34, it is possible to obtain ordinary light and extraordinary light parallel with each other.

A polarization plane coincidence control element 34a comprises a half-wave plate for causing the vibration directions of the ordinary light and extraordinary light, separated by the polarization separator element 34, to coincide with each other. The polarization plane coincidence control element 34a may be inserted either on the ordinary light side or on the extraordinary light side. FIG. 27 illustrates an exemplary case where the polarization plane coincidence control element 34a is inserted on the ordinary light side.

When light having two polarization components perpendicular to each other is incident on a wave plate, the wave plate causes a change of relative phase of the two polarization components corresponding to its thickness. Among such wave plates, a half-wave plate changes the relative phase of the two polarization components by half the wavelength. Since the phase of one polarization component is shifted by half the wavelength with reference to the other polarization component, the vibration direction of light obtained by combining the two polarization components is rotated by 90 degrees, compared with the case where the two polarization components are not passed through the half-wave plate.

Thus, by allowing the ordinary light emitted from the polarization separator element 34 to pass through the half-wave plate, it is possible to obtain light with a polarization plane identical with that of the extraordinary light emitted from the polarization separator element 34. Where the extraordinary light emitted from the polarization separator element 34 is caused to pass through the half-wave plate, it is possible to obtain light with a polarization plane identical with that of the ordinary light (Therefore, the polarization plane coincidence control element 34a may be inserted either on the ordinary light side or the extraordinary light side).

A Faraday rotator 10-1 variably controls the polarization angle of the extraordinary light emitted from the polarization separator element 34 and of the ordinary light emitted from the polarization separator element 34 and having a polarization plane thereof made to coincide with that of the extraordinary light (In FIG. 27, permanent magnets are omitted to avoid complexity of illustration).

The permanent magnets produce a saturation magnetic field H1 parallel with the traveling direction of the light, indicated inside the block of a Faraday element 11-1, and an electromagnet 12-1 produces a magnetic field H2 perpendicular to the traveling direction of the light, also indicated inside the block of the Faraday element 11-1.

With the magnetic field H1 generated by the permanent magnets, the magnetic field H2 is applied by the electromagnet 12-1 in a direction perpendicular to the magnetic field H1, whereupon the combined magnetic field is directed along the diagonal of a rectangle formed by the vectors of the magnetic fields H1 and H2. However, since the saturation magnetic field strength of the Faraday element 11-1 is independent of the direction of the magnetic field and is constant, the combined magnetic field strength is equal to the strength of the magnetic field H1 generated by the permanent magnets. Accordingly, a component of the combined magnetic field in the direction of the magnetic field H1 is smaller than the saturation magnetic field H1 applied by the permanent magnets.

The angle of polarization rotation caused in the Faraday element 11-1 is determined by the magnetic field strength in the traveling direction of the light. Because of the application of the magnetic field H2, the component of the actual combined magnetic field strength in the direction of the magnetic field H1 is smaller than the saturation magnetic field H1 as mentioned above, and therefore, the polarization rotation angle varies. The magnetic field H2 is controlled by the current passed through the coil of the electromagnet 12-1, and accordingly, the polarization rotation angle is also controlled by the current passed through the coil of the electromagnet 12-1.

A wavelength-dependent transmittance characteristic varying element 35 comprises a substrate 35*a* made of a transparent material such as glass, and a multilayer dielectric thin film 35*b* composed of multiple dielectric thin layers with different refractive indices formed on the substrate 35*a*.

A typical dielectric thin film with different refractive indices includes silicon dioxide ($SiO_2$) and titanium dioxide ($TiO_2$). Titanium dioxide has a higher refractive index than silicon dioxide.

When light is incident on the multilayer dielectric thin film 35*b*, the transmittance of the light through the multilayer dielectric thin film varies depending on the magnitudes of a P-polarization component and S-polarization component of the light, that is, the angles of polarization. Consequently, the transmittance of light, that is, the gain or loss of the light, varies depending on the polarization angles.

P-polarized light and S-polarized light will be briefly explained. In the foregoing, the ordinary light is defined as light vibrating in a direction perpendicular to the plane containing the crystal axis X1 of the parallel rutile plate, while the extraordinary light is defined as light vibrating in a direction parallel to the same plane. The P-polarized light and the S-polarized light are defined with reference to the surface of the multilayer dielectric thin film 35*b*.

Specifically, the P-polarized light is defined as light polarized in parallel to a plane perpendicular to the surface of the multilayer dielectric thin film 35*b* and containing the traveling direction (optical axis) of light, and the S-polarized light is defined as light polarized perpendicularly to the same plane.

The multilayer dielectric thin film 35*b* shows different transmittances for the P-polarized light and S-polarized light, and also the transmittances of the P-polarized light and S-polarized light exhibit considerably conspicuous wavelength characteristics over a wide wavelength region. Namely, the polarization angle of the light emitted from the polarization separator element 34 and of the light whose polarization plane has been changed by the polarization plane coincidence control element 34*a* so as to coincide with that of the light emitted from the polarization separator element 34 is variably controlled by the Faraday rotator 10-1, so that the P- and S-polarization components incident on the multilayer dielectric thin film 35*b* can be variably controlled, whereby the transmittance of light through the multilayer dielectric thin film 35*b* can be variably controlled.

A Faraday rotator 10-2 rotates the polarization angle of the extraordinary light emitted from the polarization separator element 34 and of the ordinary light emitted from the polarization separator element and having a polarization plane thereof made to coincide with that of the extraordinary light, by the same angle but in a direction opposite to that in which the polarization angle was rotated by the Faraday rotator 10-1 (Permanent magnets are omitted from FIG. 27).

The permanent magnets produce a magnetic field H1*r* which is opposite in direction to the magnetic field H1 parallel with the traveling direction of the light, as indicated in the block of a Faraday element 11-2, and which has a magnetic field strength equal to that of the magnetic field H1. An electromagnet 12-2 produces a magnetic field H2*r* which is opposite in direction to the magnetic field H2, as indicated in the block of the Faraday element 11-2 in FIG. 27, and which has a magnetic field strength equal to that of the magnetic field H2.

With the magnetic field H1*r* applied, the magnetic field H2*r* is applied by the electromagnet 12-2 in a direction perpendicular to the magnetic field H1*r*, whereupon the combined magnetic field is directed along the diagonal of a rectangle formed by the vectors of the magnetic fields H1*r* and H2*r*.

However, since the saturation magnetic field strength of the Faraday element 11-2 is independent of the direction of the magnetic field and is constant, the actual combined magnetic field strength is smaller than the magnetic field strength corresponding to the length of the diagonal and is equal to the strength of the magnetic field H1*r*. Accordingly, a component of the combined magnetic field in the direction of the magnetic field H1*r* is smaller than the saturation magnetic field H1*r* applied by the permanent magnets.

The angle of polarization rotation caused in the Faraday element is determined by the magnetic field strength in the traveling direction of the light. Because of the application of the magnetic field H2*r*, the component of the actual combined magnetic field strength in the direction of the magnetic field H1*r* is smaller than the saturation magnetic field H1*r* as mentioned above, and therefore, the polarization rotation angle varies.

As is clear from the above, change of the magnetic field strength in the traveling direction of the light, caused in the Faraday rotator 10-2 by the application of the magnetic field H2*r*, is opposite in direction to the change of the magnetic field strength in the traveling direction of the light caused in the Faraday rotator 10-1 by the application of the magnetic field H2.

Consequently, the two beams of light, which have been rotated in the Faraday rotator 10-1, can be rotated by the Faraday rotator 10-2 in the opposite direction by the same rotation angle, whereby the light beams can be restored to the polarized state identical with that of the light incident on the Faraday element.

A polarization plane restoration element 36 is identical with the polarization plane coincidence control element 34*a*. In the example shown in FIG. 27, however, the polarization plane of the ordinary light emitted from the polarization separator element 34 is made to coincide with that of the extraordinary light by the polarization plane coincidence control element 34a. Accordingly, the polarization plane restoration element 36 is inserted on the side of the extraordinary light emitted from the polarization separator element 34 so that the polarization plane of the light which has passed through the polarization plane restoration element 36 may be different by 90 degrees from that of the light which has not passed through the element 36.

To simply obtain a difference of 90 degrees between the polarization plane of light passing through the polarization plane restoration element 36 and that of light not passing through the element 36, the polarization plane restoration element 36 may be inserted on the side of the ordinary light emerging from the polarization separator element 34. However, in order to make the polarization mode dispersions of the two beams of light identical with each other, that is, to make the optical path lengths of the two beams of light equal to each other, the polarization plane restoration element 36 should preferably be inserted on that side of light on which the polarization plane coincidence control element 34a is not inserted at the emission side of the polarization separator element 34.

A phase difference control element 37 compensates for a phase difference between the P-polarized light and the S-polarized light caused in the wavelength-dependent transmittance characteristic varying element 35. A polarization combiner element 38 is identical with the polarization separator element 34. In the polarization combiner element 38, light emerging from the polarization plane restoration element 36 and polarized identically with ordinary light of the polarization combiner element 38 travels straight, while light not passed through the polarization plane restoration element 36 and polarized identically with extraordinary light of the polarization combiner element 38 is refracted and then travels straight. Accordingly, as far as the polarization combiner element 38 and the polarization separator element 34 are made of the same material and have the same dimensions, the light polarized identically with the ordinary light of the polarization combiner element 38 and the light polarized identically with the extraordinary light of the element 38 reach the same point on the plane of the polarization combiner element 38 opposite to the incidence plane. Namely, the light beams separated by the polarization separator element 34 are combined into the original polarized state by the polarization combiner element 38.

The reason for using the phase difference control element 37 will be now explained. A nonnegligible phase difference between the P-polarized light and the S-polarized light is often caused in the wavelength-dependent transmittance characteristic varying element 35. Thus, if the polarization plane of one of the two beams of light is simply rotated by 90 degrees in the polarization plane restoration element 36, ordinary light mixed with extraordinary light and extraordinary light mixed with ordinary light are emitted, and if such light beams are directly combined, a loss is caused and the loss caused has wavelength dependency. The phase difference control element is used to avoid these inconveniences. The position where the phase difference control element 37 is inserted is not limited to the one illustrated in FIG. 27.

A collimator system 30a includes a ferrule 31a, a collimating lens 33a and a lens holder 32a for firmly holding the collimating lens 33a, and couples the parallel beam emitted from the polarization combiner element 38 to an output optical fiber C1a.

The output optical fiber C1a serves as an optical fiber for the output of the variable optical equalizer 3.

The operation of the variable optical equalizer will be summarized. Incident light is separated into ordinary light and extraordinary light by the polarization separator element 34, and after the polarization planes of the ordinary light and extraordinary light are made to coincide with each other by the polarization plane coincidence control element 34a, the polarization of the light beams is rotated by the Faraday rotator 10-1, the resulting light beams being supplied to the wavelength-dependent transmittance characteristic varying element 35. The phase difference between the two beams of light emitted from the wavelength-dependent transmittance characteristic varying means 35 is compensated for, and after the light beams are restored to the original polarized state, the ordinary light and the extraordinary light are combined.

The polarization separator element 34 separates incident light into ordinary light and extraordinary light, in order to determine the relationship between the P-polarized light and the S-polarized light in the wavelength-dependent transmittance characteristic varying element 35 and thereby to set the criterion for the wavelength-dependent transmittance characteristic. If the input optical signal is made to enter the wavelength-dependent transmittance characteristic varying element 35 without using the polarization separator element 34, then it is difficult to control the wavelength-dependent transmittance characteristic, because the relationship of the incident polarized light with the P-polarized light and S-polarized light in the element 35 is unidentified. Moreover, if the polarization of incident light changes, then it is impossible to control the wavelength-dependent transmittance characteristic.

Also, the phase difference between the P-polarized light and S-polarized light caused in the wavelength-dependent transmittance characteristic varying element 35 is compensated for, and therefore, the wavelength-dependent transmittance characteristic of the element 35 is opposite to the gain deviation characteristic of an optical fiber amplifier. Further, the variable optical equalizer 3 with the arrangement shown in FIG. 27 has a feature that the transmittance thereof can be variably controlled by the wavelength-dependent transmittance characteristic varying element 35. It is therefore possible to obtain a variable optical equalizer which is capable of adaptive equalization even in cases where the gain of an optical fiber amplifier fluctuates due to fluctuation of the input level of the optical fiber amplifier or fluctuation of the output power of a pumping laser diode.

Figure 28:
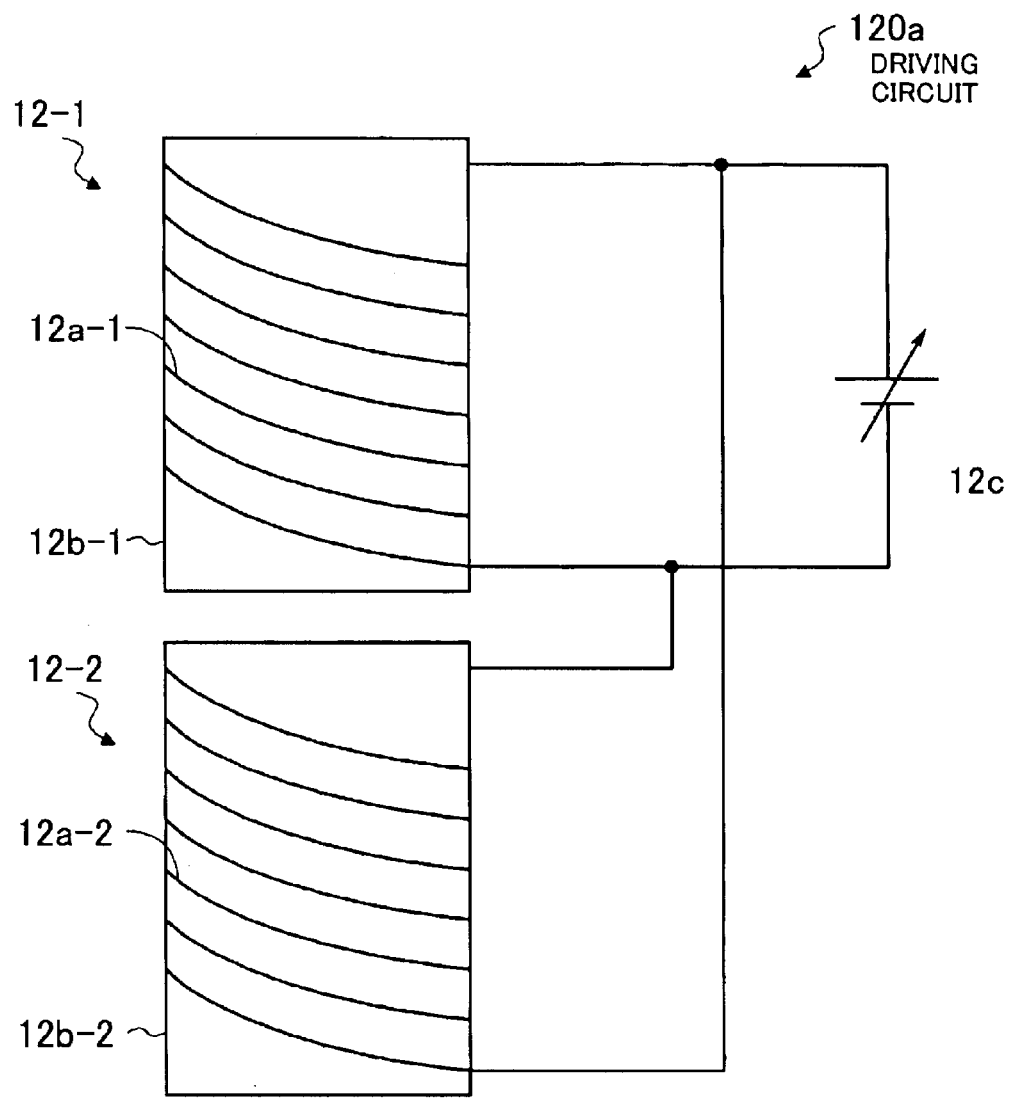
FIG. 28 is a diagram illustrating a driving circuit for electromagnets of Faraday rotators applied to the variable optical equalizer.

A driving circuit applied to the variable optical equalizer 3 will be now described. FIG. 28 illustrates a driving circuit for the Faraday rotators 10 applied to the variable optical equalizer 3. The driving circuit 120a includes a coil 12a-1 and a magnetic core 12b-1 constituting the electromagnet 12-1, a coil 12a-2 and a magnetic core 12b-2 constituting the electromagnet 12-2, and a variable voltage source 12c (of which the output voltage has no temperature coefficient).

In the variable optical equalizer 3 of FIG. 27, the rotation angles that the first and second Faraday rotators 10-1 and 10-2 impart to the transmitting light must have the same absolute value and opposite directions, as mentioned above, and accordingly, electric current is caused to flow through the coils 12a-1 and 12a-2 in opposite directions. The principle of improvement in the temperature-dependent Faraday rotation angle characteristic of the Faraday rotators 10 achieved using the driving circuit 120a is the same as that explained above with reference to the driving circuit 120 with the arrangement shown in FIG. 9; therefore, detailed description thereof is omitted.

Figure 29:
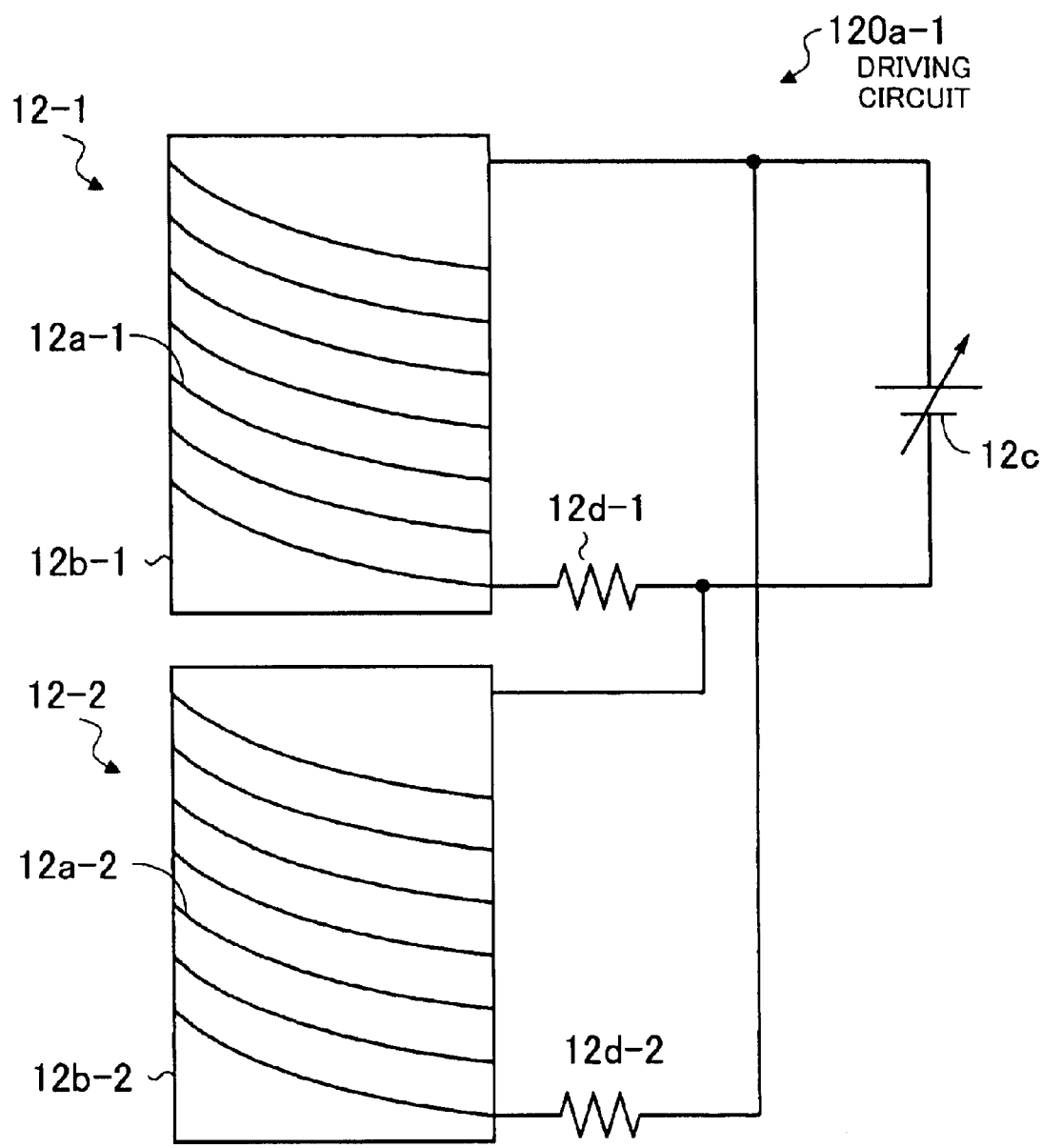
FIG. 29 is a diagram illustrating a driving circuit for the electromagnets of the Faraday rotators applied to the variable optical equalizer.

FIG. 29 illustrates another driving circuit for the Faraday rotators 10 applied to the variable optical equalizer 3. The driving circuit 120a-1 includes a coil 12a-1 and a magnetic core 12b-1 constituting the electromagnet 12-1, a coil 12a-2 and a magnetic core 12b-2 constituting the electromagnet 12-2, series resistors 12d-1 and 12d-2 and a variable voltage source 12c (whose output voltage has no temperature coefficient).

It should be noted here that, in the variable optical equalizer 3 of FIG. 27, the rotation angles which the first and second Faraday rotators 10-1 and 10-2 impart to the transmitting light must have the same absolute value and opposite directions, and accordingly, electric current is caused to flow through the coils 12a-1 and 12a-2 in opposite directions. The principle of improvement in the temperature-dependent Faraday rotation angle characteristic of the Faraday rotators 10 achieved using the driving circuit 120a-1 is the same as that explained above with reference to the driving circuit 120-1 with the arrangement shown in FIG. 14; therefore, detailed description thereof is omitted.

Figure 30:
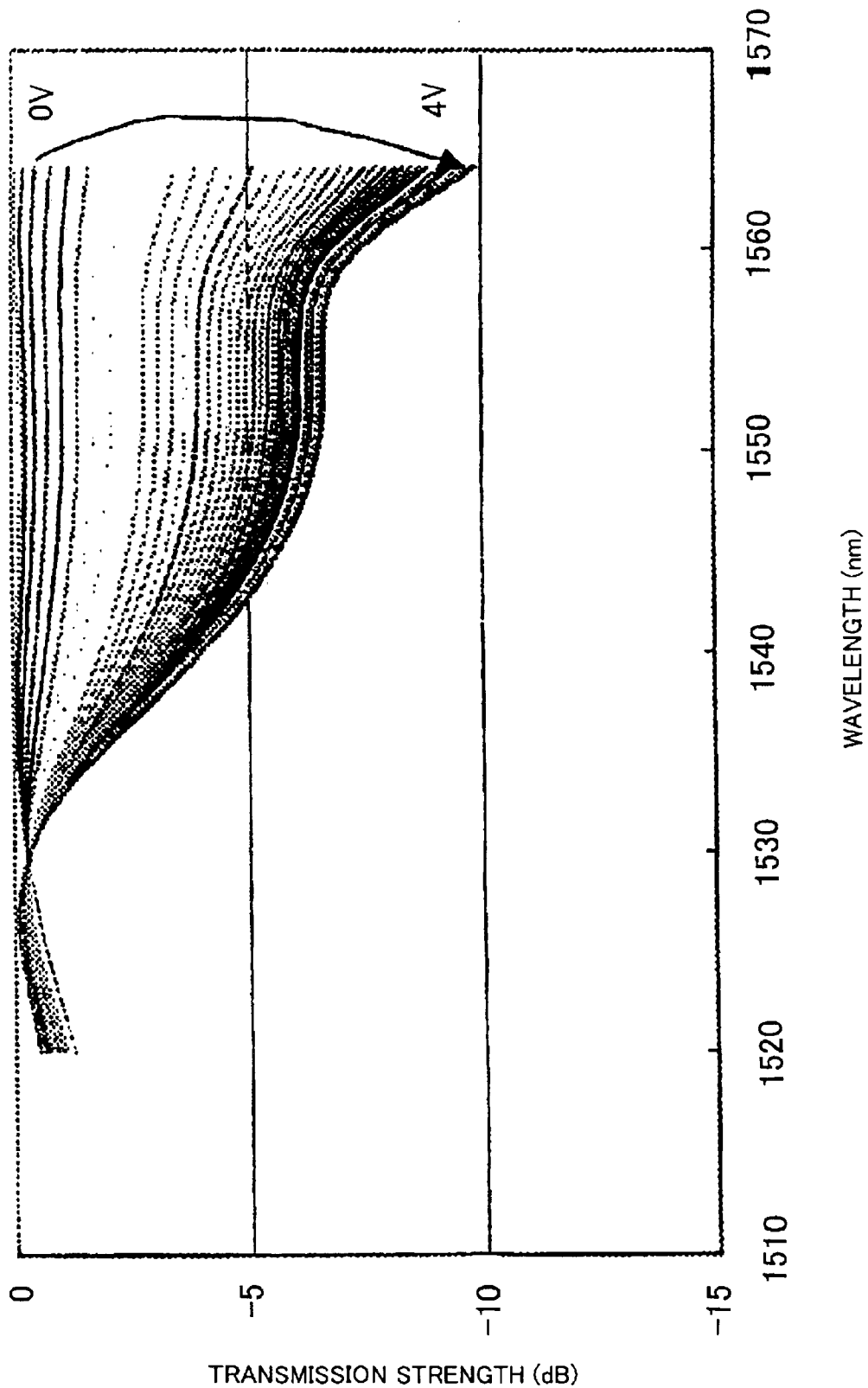
FIG. 30 is a graph showing transmission strength characteristics of the variable optical equalizer to which the Faraday rotators are applied.

FIG. 30 illustrates a transmission strength characteristic of the variable optical equalizer 3 to which the Faraday rotators 10 were applied. The vertical axis indicates transmission strength (dB) of light, the horizontal axis indicates wavelength (nm), and the parameter is the voltage (V) of the voltage source. The illustrated data was obtained using the driving circuit 120a.

As shown in FIG. 30, by changing the voltage of the voltage source 12c from 0 volts to 4 volts, it is possible to vary the transmission strength by approximately 10 dB from 0 dB in a wavelength region of from 1530 nm to something over 1560 nm.

Figure 31:
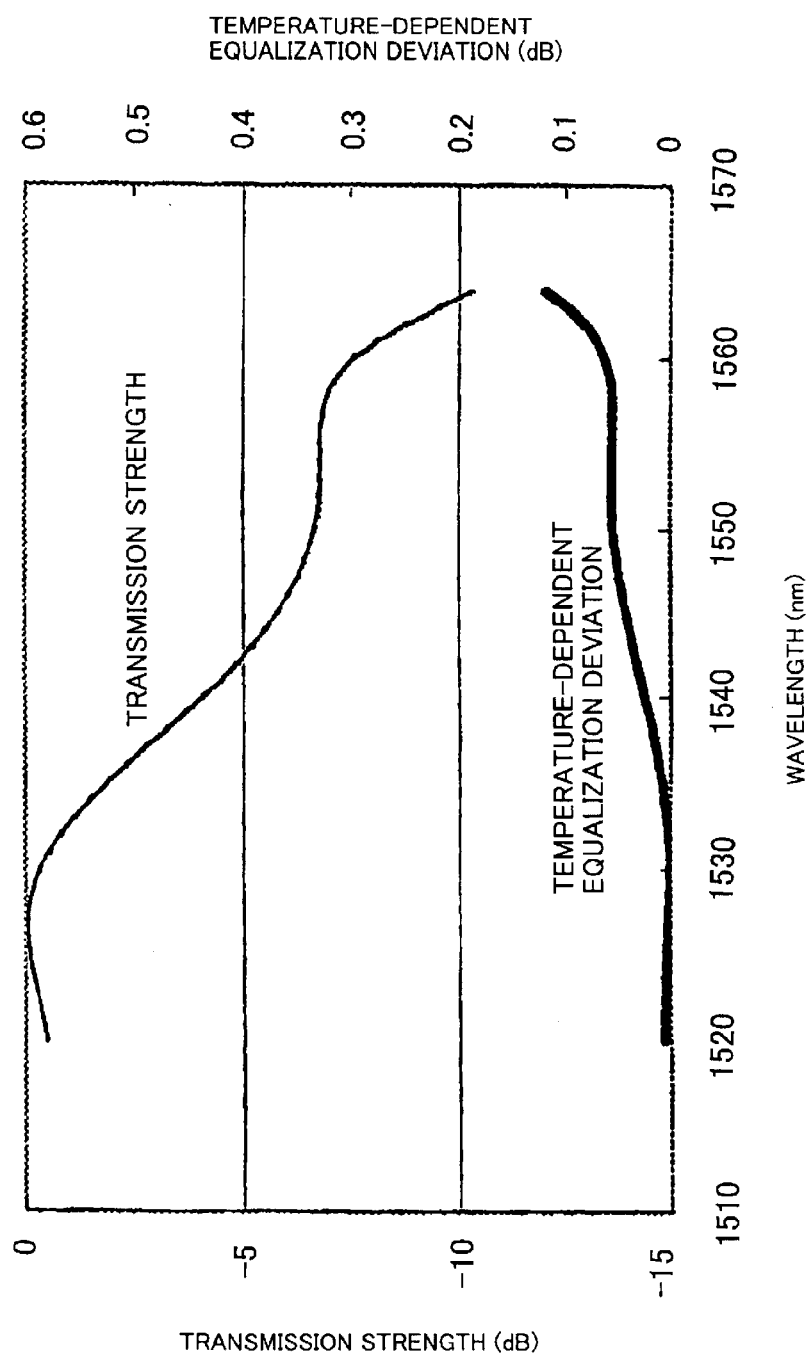
FIG. 31 is a graph showing a temperature characteristic and temperature-dependent equalization deviation of the variable optical equalizer to which the Faraday rotators according to the present invention are applied.
Figure 32:
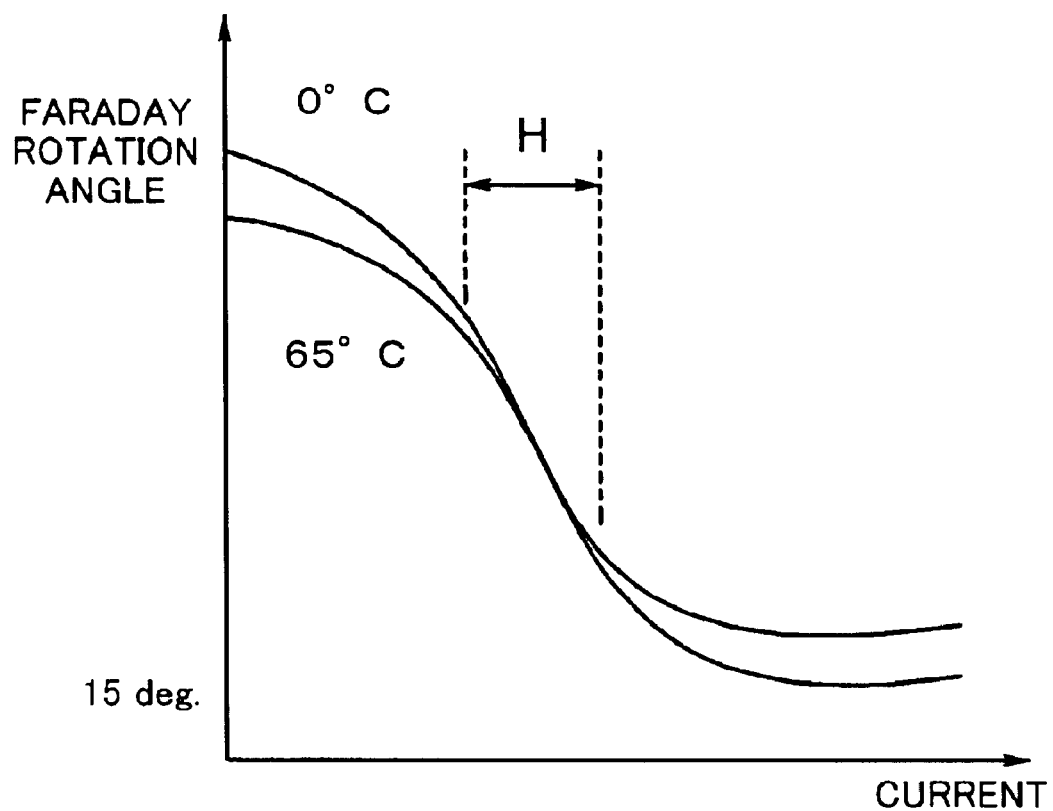
FIG. 32 is a graph showing Faraday rotation angles of a conventional Faraday rotator in which a temperature-dependent Faraday rotation angle characteristic is canceled out by a temperature-dependent magnetic anisotropy characteristic.
Figure 33:
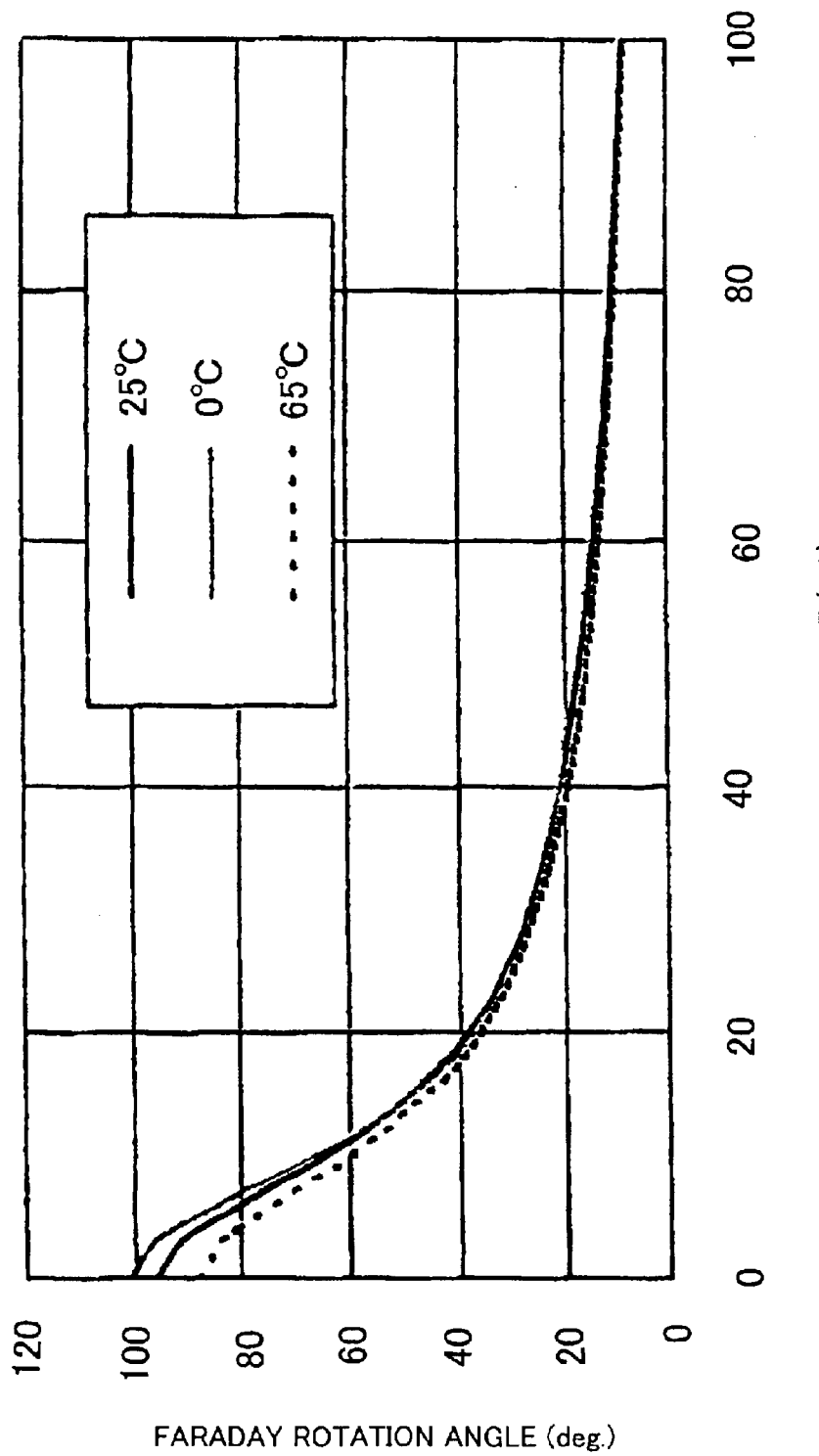
FIG. 33 is a graph showing temperature-dependent Faraday rotation angle characteristics of the conventional Faraday rotator.

FIG. 31 illustrates temperature characteristics and temperature-dependent equalization deviation of the variable optical equalizer 3 to which the Faraday rotators 10 were applied. The left-hand vertical axis indicates transmission strength of light, the unit being dB, the right-hand vertical axis indicates temperature-dependent equalization deviation, the unit being dB, and the horizontal axis indicates wavelength of light, the unit being nm. The illustrated data was obtained using the driving circuit 120a.

The data of transmission strength indicates transmission strengths at a voltage of 4 volts as shown in FIG. 30, and as illustrated, the transmission strengths measured at temperatures of 0° C., 25° C. and 65° C. overlap one another. The temperature-dependent equalization deviation represents a fluctuation value of the transmission strength at a voltage of 4 volts within the temperature range of 0° C. to 65° C.

As shown in FIG. 31, the variable optical equalizer 3 to which the Faraday rotators 10 of the present invention were applied shows a temperature-dependent equalization deviation of 0.1 dB or less, proving that the temperature characteristic is significantly improved compared with the conventional variable optical equalizer.

Namely, by using the driving circuit 120a with the arrangement shown in FIG. 28, a Faraday element and a variable optical equalizer 3, both showing an excellent temperature characteristic as to the Faraday rotation angle, could be obtained. Although the results obtained using the arrangement shown in FIG. 29 are not illustrated, similar advantageous effects can be achieved also by the arrangement of FIG. 29, since the arrangements shown in FIGS. 28 and 29 are mere combinations of the respective arrangements shown in FIGS. 9 and 14.

Also, no specific description is given herein with respect to an example of applying the driving circuit 120-2, which uses the coil current compensation technique based on the arrangement shown in FIG. 20, to the variable optical equalizer 3. However, since similar advantageous effects can be obtained with the arrangement of FIG. 14 as well as with the arrangement of FIG. 20, similar advantageous effects can be achieved also in the case where the coil current compensation technique based on the arrangement shown in FIG. 20 is applied to the variable optical equalizer.

As described above, the present invention provides the Faraday rotator 10 having an excellent temperature characteristic as to the Faraday rotation angle, as well as the variable optical attenuator 2, the optical shutter and the variable optical equalizer 3 to each of which the Faraday rotator 10 is applied and which thus have an excellent temperature characteristic.

In the Faraday rotator of the present invention, as described above, the Faraday rotation is caused by the first magnetic field applied to the magneto-optical crystal, and the Faraday rotation angle is controlled by the second magnetic field over an entire variable strength range of the second magnetic field, wherein the magneto-optical crystal is positioned in such a manner that the direction of the combined magnetic field of the first and second magnetic fields, except for the direction of the first magnetic field, is variable intermediately between the easy and hard magnetization axes of the magneto-optical crystal. This makes it possible to suppress the temperature characteristic over a wide range of Faraday rotation angle, whereby the temperature-dependent Faraday rotation angle characteristic of the Faraday rotator and the quality thereof can be improved.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A Faraday rotator for rotating a polarization plane of light transmitting therethrough by a magnetic field,
   wherein Faraday rotation is caused by a first magnetic field applied to a magneto-optical crystal of the Faraday rotator, a Faraday rotation angle is controlled by a second magnetic field over an entire variable strength range of the second magnetic field, and the magneto-optical crystal is positioned in such a manner that a direction of a combined magnetic field of the first and second magnetic fields, except for a direction of the first magnetic field, is variable intermediately between an easy magnetization axis and hard magnetization axis of the magneto-optical crystal.

2. The Faraday rotator according to claim 1, wherein the Faraday rotator is associated with a driving circuit, the driving circuit comprising an electromagnet including a magnetic core having a coil wound thereon and adapted to generate the second magnetic field, a voltage source whose output voltage has no temperature coefficient and a series resistor connected in series with the voltage source, or comprising the electromagnet, a current source whose output current has no temperature coefficient and a parallel resistor connected in parallel with the current source.

3. The Faraday rotator according to claim 2, wherein the coil comprises a wire made of copper or copper compound.

4. The Faraday rotator according to claim 2, wherein the series resistor or the parallel resistor comprises a resistor made of Nichrome.

5. The Faraday rotator according to claim 2, wherein the series resistor or the parallel resistor comprises a variable resistor.

6. The Faraday rotator according to claim 2, wherein the series resistor has a resistance of zero or the parallel resistor has a resistance of infinity.

7. A variable optical attenuator for variably controlling a level of an optical signal, comprising:
   a polarizer made of a birefringent crystal and arranged on an incoming side of the optical signal;
   an analyzer made of a birefringent crystal and arranged on an outgoing side of the optical signal; and
   a Faraday rotator inserted between the polarizer and the analyzer, wherein Faraday rotation is caused by a first magnetic field applied to a magneto-optical crystal of the Faraday rotator, a Faraday rotation angle is controlled by a second magnetic field over an entire variable strength range of the second magnetic field, and the magneto-optical crystal is positioned in such a manner that a direction of a combined magnetic field of the first and second magnetic fields, except for a direction of the first magnetic field, is variable intermediately between an easy magnetization axis and hard magnetization axis of the magneto-optical crystal.

8. The variable optical attenuator according to claim 7, wherein the Faraday rotator is associated with a driving circuit, the driving circuit comprising an electromagnet including a magnetic core having a coil wound thereon and adapted to generate the second magnetic field, a voltage source whose output voltage has no temperature coefficient and a series resistor connected in series with the voltage source, or comprising the electromagnet, a current source whose output current has no temperature coefficient and a parallel resistor connected in parallel with the current source.

9. A variable optical attenuator for variably controlling a level of an optical signal, comprising:
   a polarizer made of a birefringent crystal and arranged on an incoming side of the optical signal;
   a reflector element for reflecting the optical signal; and
   a Faraday rotator inserted between the polarizer and the reflector element, wherein Faraday rotation is caused by a first magnetic field applied to a magneto-optical crystal of the Faraday rotator, a Faraday rotation angle is controlled by a second magnetic field over an entire variable strength range of the second magnetic field, and the magneto-optical crystal is positioned in such a manner that a direction of a combined magnetic field of the first and second magnetic fields, except for a direction of the first magnetic field, is variable intermediately between an easy magnetization axis and hard magnetization axis of the magneto-optical crystal.

10. The variable optical attenuator according to claim 9, wherein the Faraday rotator is associated with a driving circuit, the driving circuit comprising an electromagnet including a magnetic core having a coil wound thereon and adapted to generate the second magnetic field, a voltage source whose output voltage has no temperature coefficient and a series resistor connected in series with the voltage source, or comprising the electromagnet, a current source whose output current has no temperature coefficient and a parallel resistor connected in parallel with the current source.

11. An optical shutter for shutting down an optical output, comprising:
   a polarizer made of a birefringent crystal and arranged on an incoming side of an optical signal;
   an analyzer made of a birefringent crystal and arranged on an outgoing side of the optical signal;
   a Faraday rotator inserted between the polarizer and the analyzer, wherein Faraday rotation is caused by a first magnetic field applied to a magneto-optical crystal of the Faraday rotator, a Faraday rotation angle is controlled by a second magnetic field over an entire variable strength range of the second magnetic field, and the magneto-optical crystal is positioned in such a manner that a direction of a combined magnetic field of the first and second magnetic fields, except for a direction of the first magnetic field, is variable intermediately between an easy magnetization axis and hard magnetization axis of the magneto-optical crystal; and
   a driving circuit for switching a current value thereof between a value at which an amount of optical attenuation is at a minimum and a value at which the amount of optical attenuation is at a maximum.

12. The optical shutter according to claim 11, wherein the driving circuit comprises an electromagnet including a magnetic core having a coil wound thereon and adapted to generate the second magnetic field, a voltage source whose output voltage has no temperature coefficient and a series resistor connected in series with the voltage source, or comprises the electromagnet, a current source whose output current has no temperature coefficient and a parallel resistor connected in parallel with the current source.

13. An optical shutter for shutting down an optical output, comprising:
   a polarizer made of a birefringent crystal and arranged on an incoming side of an optical signal;
   a reflector element for reflecting the optical signal;
   a Faraday rotator inserted between the polarizer and the reflector element, wherein Faraday rotation is caused by a first magnetic field applied to a magneto-optical crystal of the Faraday rotator, a Faraday rotation angle is controlled by a second magnetic field over an entire variable strength range of the second magnetic field, and the magneto-optical crystal is positioned in such a manner that a direction of a combined magnetic field of the first and second magnetic fields, except for a direction of the first magnetic field, is variable intermediately between an easy magnetization axis and hard magnetization axis of the magneto-optical crystal; and
   a driving circuit for switching a current value thereof between a value at which an amount of optical attenuation is at a minimum and a value at which the amount of optical attenuation is at a maximum.

14. The optical shutter according to claim 13, wherein the driving circuit comprises an electromagnet including a magnetic core having a coil wound thereon and adapted to generate the second magnetic field, a voltage source whose output voltage has no temperature coefficient and a series resistor connected in series with the voltage source, or comprises the electromagnet, a current source whose output current has no temperature coefficient and a parallel resistor connected in parallel with the current source.

15. A variable optical equalizer for equalizing a gain, comprising:
   a polarization separator element for separating input light into ordinary light and extraordinary light;
   a polarization plane coincidence control element for causing polarization planes of the two separated beams of light to coincide with each other;
   a first Faraday rotator for rotating a polarization angle of the two beams of light whose polarization planes have been made to coincide with each other, wherein Faraday rotation is caused by a first magnetic field applied to a magneto-optical crystal of the first Faraday rotator, a Faraday rotation angle is controlled by a second magnetic field over an entire variable strength range of the second magnetic field, and the magneto-optical crystal is positioned in such a manner that a direction of a combined magnetic field of the first and second magnetic fields, except for a direction of the first magnetic field, is variable intermediately between an easy magnetization axis and hard magnetization axis of the magneto-optical crystal;

a wavelength-dependent transmittance characteristic varying element for imparting a wavelength-dependent transmittance characteristic corresponding to the rotation of the polarization angle;

a second Faraday rotator for causing a rotation of the polarization angle which is opposite in direction to the rotation of the polarization angle caused by the first Faraday rotator and which has an absolute value equal to that of the rotation of the polarization angle caused by the first Faraday rotator, wherein Faraday rotation is caused by a first magnetic field applied to a magneto-optical crystal of the second Faraday rotator, a Faraday rotation angle is controlled by a second magnetic field over an entire variable strength range of the second magnetic field, and the magneto-optical crystal is positioned in such a manner that a direction of a combined magnetic field of the first and second magnetic fields, except for a direction of the first magnetic field, is variable intermediately between an easy magnetization axis and hard magnetization axis of the magneto-optical crystal;

a phase difference control element for compensating for a phase difference between P-polarized light and S-polarized light caused in the wavelength-dependent transmittance characteristic varying element; and a polarization plane restoration element for combining the ordinary light and the extraordinary light.

16. The variable optical equalizer according to claim 15, wherein the first and second Faraday rotators are each associated with a driving circuit, the driving circuit comprising an electromagnet including a magnetic core having a coil wound thereon and adapted to generate the second magnetic field, a voltage source whose output voltage has no temperature coefficient and a series resistor connected in series with the voltage source, or comprising the electromagnet, a current source whose output current has no temperature coefficient and a parallel resistor connected in parallel with the current source.

* * * * *